United States Patent
Dougherty et al.

(10) Patent No.: US 11,434,400 B2
(45) Date of Patent: *Sep. 6, 2022

(54) ASSEMBLY COMPONENTS COMPRISING CURABLE COMPOSITIONS CONTAINING ACETOACETYLATED RESINS

(71) Applicant: Eastman Chemical Company, Kingsport, TN (US)

(72) Inventors: Shawn Marie Dougherty, Kingsport, TN (US); Terri Roxanne Carvagno, Church Hill, TN (US); Monika Karin Wiedmann Boggs, Blountville, TN (US); Christopher Harlan Burk, Gray, TN (US); Nick Allen Collins, Fall Branch, TN (US); Thauming Kuo, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 404 days.

This patent is subject to a terminal disclaimer.

(21) Appl. No.: 16/705,377

(22) Filed: Dec. 6, 2019

(65) Prior Publication Data

US 2020/0181312 A1 Jun. 11, 2020

Related U.S. Application Data

(60) Provisional application No. 62/777,876, filed on Dec. 11, 2018, provisional application No. 62/777,865, (Continued)

(51) Int. Cl.
| | |
|---|---|
| C09J 167/02 | (2006.01) |
| C09J 171/00 | (2006.01) |
| C08G 63/87 | (2006.01) |
| C08G 63/91 | (2006.01) |
| C09D 167/02 | (2006.01) |
| C09D 7/20 | (2018.01) |
| C08G 12/00 | (2006.01) |
| C09D 161/20 | (2006.01) |
| C09J 5/00 | (2006.01) |
| C09J 161/20 | (2006.01) |
| C09D 7/65 | (2018.01) |
| C09J 11/08 | (2006.01) |
| C08L 67/03 | (2006.01) |
| C09J 167/03 | (2006.01) |
| C08J 3/24 | (2006.01) |
| C08J 7/043 | (2020.01) |
| C08J 5/18 | (2006.01) |
| C09D 167/00 | (2006.01) |
| C09D 175/08 | (2006.01) |
| C08G 63/00 | (2006.01) |
| C08K 3/013 | (2018.01) |
| C08K 5/00 | (2006.01) |

(Continued)

(52) U.S. Cl.
CPC ............ *C09J 167/02* (2013.01); *C08G 12/00* (2013.01); *C08G 63/005* (2013.01); *C08G 63/87* (2013.01); *C08G 63/916* (2013.01); *C08J 3/24* (2013.01); *C08J 5/18* (2013.01); *C08J 7/043* (2020.01); *C08L 67/03* (2013.01); *C09D 7/20* (2018.01); *C09D 7/65* (2018.01); *C09D 161/20* (2013.01); *C09D 167/00* (2013.01); *C09D 167/02* (2013.01); *C09D 175/08* (2013.01); *C09J 5/00* (2013.01); *C09J 11/08* (2013.01); *C09J 161/20* (2013.01); *C09J 167/03* (2013.01); *C09J 171/00* (2013.01); *C08J 2323/06* (2013.01); *C08J 2323/12* (2013.01); *C08J 2367/02* (2013.01); *C08K 3/013* (2018.01); *C08K 5/005* (2013.01); *C08K 5/0016* (2013.01); *C08K 5/0025* (2013.01); *C08K 5/0066* (2013.01); *C08K 5/07* (2013.01); *C08K 5/18* (2013.01); *C08K 5/3462* (2013.01); *C09J 2461/00* (2013.01); *C09J 2467/00* (2013.01)

(58) Field of Classification Search
None
See application file for complete search history.

(56) References Cited

U.S. PATENT DOCUMENTS

| 4,071,578 A | 1/1978 | Lasher |
| 4,708,821 A | 11/1987 | Shimokawa et al. |
| | (Continued) | |

FOREIGN PATENT DOCUMENTS

| DE | 196 20 351 A1 | 11/1997 |
| EP | 0 161 697 A1 | 11/1985 |
| | (Continued) | |

OTHER PUBLICATIONS

Co-pending U.S. Appl. No. 15/621,323, filed Jun. 13, 2017; Kuo et al.

(Continued)

*Primary Examiner* — Christopher M Rodd
(74) *Attorney, Agent, or Firm* — C. Stuart Everett

(57) ABSTRACT

This invention relates to an assembly component comprising at least one substrate coated with at least one curable composition comprising:
I. a first component (I) comprising a resin having at least one functional group selected from the group consisting of β-ketoester and malonate functional groups,
II. a second component (II) comprising at least one curing agent having at least one aldehyde functional group, and
III. a third component (III) comprising at least one compound having amine functionality, salts thereof, or combinations thereof.

19 Claims, No Drawings

Related U.S. Application Data filed on Dec. 11, 2018, provisional application No. 62/777,871, filed on Dec. 11, 2018, provisional application No. 62/900,939, filed on Sep. 16, 2019, provisional application No. 62/916,503, filed on Oct. 17, 2019, provisional application No. 62/777,880, filed on Dec. 11, 2018.

(51) Int. Cl.
    *C08K 5/07*     (2006.01)
    *C08K 5/3462*   (2006.01)
    *C08K 5/18*     (2006.01)

(56) References Cited

U.S. PATENT DOCUMENTS

| | | | |
|---|---|---|---|
| 5,288,804 | A | 2/1994 | Kim et al. |
| 5,426,148 | A | 6/1995 | Tucker |
| 5,453,464 | A | 9/1995 | Witzeman et al. |
| 5,693,705 | A | 12/1997 | Kubo et al. |
| 6,117,492 | A | 9/2000 | Goldstein et al. |
| 6,177,514 | B1 | 1/2001 | Pathak et al. |
| 6,521,716 | B1 | 2/2003 | Leake |
| 6,683,132 | B1 | 1/2004 | Schick et al. |
| 8,653,174 | B2 | 2/2014 | Anderson et al. |
| 8,664,333 | B2 | 3/2014 | Shibutani et al. |
| 8,962,725 | B2 | 2/2015 | Brinkhuis et al. |
| 9,181,452 | B2 | 11/2015 | Brinkhuis et al. |
| 9,181,453 | B2 | 11/2015 | Brinkhuis et al. |
| 9,260,626 | B2 | 2/2016 | Brinkhuis et al. |
| 9,284,423 | B2 | 3/2016 | Brinkhuis et al. |
| 9,534,081 | B2 | 1/2017 | Brinkhuis et al. |
| 9,587,138 | B2 | 3/2017 | Brinkhuis et al. |
| 9,599,602 | B2 | 3/2017 | Kevil et al. |
| 10,563,040 | B2 | 2/2020 | Kuo et al. |
| 11,261,359 | B2 | 3/2022 | Boggs et al. |
| 2002/0040093 | A1 | 4/2002 | Hobel et al. |
| 2002/0161162 | A1 | 10/2002 | Kumar et al. |
| 2003/0060655 | A1 | 3/2003 | Hayashi et al. |
| 2003/0195304 | A1 | 10/2003 | Kuo et al. |
| 2003/0195305 | A1 | 10/2003 | Kuo et al. |
| 2005/0081994 | A1 | 4/2005 | Beckley et al. |
| 2007/0048337 | A1* | 3/2007 | Arthur ............... A61K 9/06 424/484 |
| 2008/0135060 | A1 | 6/2008 | Kuo et al. |
| 2009/0253865 | A1 | 10/2009 | Shibutani et al. |
| 2010/0204401 | A1 | 8/2010 | Marsh et al. |
| 2011/0015343 | A1 | 1/2011 | Jones et al. |
| 2012/0220676 | A1 | 8/2012 | Moens |
| 2013/0036939 | A1 | 2/2013 | Webster et al. |
| 2013/0233739 | A1 | 9/2013 | Zhao et al. |
| 2015/0024195 | A1* | 1/2015 | Bammel ............. C09D 133/04 428/341 |
| 2016/0068707 | A1 | 3/2016 | Drijfhout |
| 2016/0115345 | A1 | 4/2016 | Kuo et al. |
| 2016/0115347 | A1 | 4/2016 | Kuo et al. |
| 2016/0137877 | A1 | 5/2016 | Kuo et al. |
| 2016/0297994 | A1 | 10/2016 | Kuo et al. |
| 2017/0275492 | A1 | 9/2017 | Zhou et al. |
| 2018/0251656 | A1 | 9/2018 | Geodegebuure et al. |
| 2020/0140693 | A1 | 5/2020 | Gessner et al. |
| 2020/0181311 | A1 | 6/2020 | Carvagno et al. |
| 2020/0181312 | A1 | 6/2020 | Dougherty et al. |
| 2020/0181324 | A1 | 6/2020 | Dougherty et al. |
| 2020/0181395 | A1 | 6/2020 | Dougherty et al. |
| 2020/0181465 | A1 | 6/2020 | Kuo et al. |

FOREIGN PATENT DOCUMENTS

| | | | |
|---|---|---|---|
| EP | 0 687 716 | A1 | 12/1995 |
| EP | 1 435 383 | A1 | 7/2004 |
| GB | 1 154 725 | A | 6/1969 |
| JP | S56 5847 | A | 1/1981 |
| JP | 3284984 | A | 12/1991 |
| JP | H07331133 | A | 12/1995 |
| JP | H11310723 | A | 11/1999 |
| JP | 3386577 | A | 3/2003 |
| WO | WO 96/41833 | A1 | 12/1996 |
| WO | 2017/186899 | A1 | 11/2017 |

OTHER PUBLICATIONS

Office Action dated Feb. 25, 2019 received in co-pending U.S. Appl. No. 15/621,323.
Office Action dated Jul. 15, 2019 received in co-pending U.S. Appl. No. 15/621,323.
Notice of Allowance dated Oct. 24, 2019 received in co-pending U.S. Appl. No. 15/621,232.
Co-pending U.S. Appl. No. 16/705,331, filed Dec. 6, 2019; Kuo et al.
Co-pending U.S. Appl. No. 16/705,338, filed Dec. 6, 2019; Carvagno et al.
Co-pending U.S. Appl. No. 16/705,345, filed Dec. 6, 2019; Dougherty et al.
Co-pending U.S. Appl. No. 16/705,351, filed Dec. 6, 2019; Dougherty et al.
Co-pending U.S. Appl. No. 16/705,365, filed Dec. 6, 2019; Boggs et al.
Co-pending U.S. Appl. No. 16/705,394, filed Dec. 6, 2019; Collins et al.
Co-pending U.S. Appl. No. 16/705,324, filed Dec. 6, 2019; Kuo et al.
ASTM D1003; Standard Test Method for Haze and Luminous Transmittance of Transparent Plastics.
ASTM D2578; Standard Test Method for Wetting Tension of Polyethylene and Polypropylene Films.
ASTM D3236; Standard Test Method for Apparent Viscosity of Hot Melt Adhesives and Coating Materials.
ASTM D3985; Standard Test Method for Oxygen Gas Transmission Rate Through Plastic Film and Sheeting Using a Coulometric Sensor.
ASTM D4366; Standard Test Method for Hardness of Organic Coatings by Pendulum Damping Tests.
ASTM D4752-10; Standard Practice for Measuring MEK Resistance of Ethyl Silicate (Inorganic) Zinc-Rich Primers by Solvent Rub.
ASTM D5402; Standard Practice for Assessing the Solvent Resistance of Organic Coatings Using Solvent Rubs.
ASTM D6493-11; Standard Test Methods for Softening Point of Hydrocarbon Resins and Rosin Based Resins by Automated Ring-and-Ball Apparatus.
ASTM D7253-16; Standard Test Method for Polyurethane Raw Materials: Determination of Acidity as Acid Number for Polyether Polyols.
ASTM D974; Standard Test Method for Acid and Base Number By Color-Indicator Titration.
ASTM E222-17; Standard Test Methods for Hydroxyl Groups Using Acetic Anhydride Acetylation.
ASTM F1249; Standard Test Method for Water Vapor Transmission Rate Through Plastic Film and Sheeting Using a Modulated Infrared Sensor.
ASTM F2622; Standard Test Method for Oxygen Gas Transmission Rate Through Plastic Film and Sheeting Using Various Sensors.
ASTM G155; Standard Practice for Operating Xenon Arc Light Apparatus for Exposure of Non-Metallic Materials.
Blank et al.; "Delayed (Latent) Catalysis in Coatings;" www.researchgate.net/publication/228420884.
Brinkhuis et al.; "Taming the Michael Addition reaction;" European Coatings Journal; 05; 2015; pp. 34-40.
Dow Coating Materials; "Advances in 2K ISO-Free[1] Urethane Coating Technology;" May 19, 2015; pp. 1-30.
Invitation to Pay Additional Fees dated Aug. 23, 2018 received in International Application No. PCT/US2018/036237.
Noomen; "Applications of Michael addition chemistry in coatings technology"; Progress in Organic Coatings; 32; (1997); pp. 137-142.

(56) References Cited

OTHER PUBLICATIONS

Notification of Transmittal of the International Search Report and the Written Opinion of the International Searching Authority dated Aug. 24, 2018 for International Application No. PCT/US2018/036244.
Notification of Transmittal of the International Search Report and the Written Opinion of the International Searching Authority dated Nov. 6, 2018 for International Application No. PCT/US2018/036237.
Notification of Transmittal of the International Search Report and the Written Opinion of the International Searching Authority dated Feb. 24, 2020 for International Application No. PCT/US2018/060816.
Notification of Transmittal of the International Search Report and the Written Opinion of the International Searching Authority dated Feb. 25, 2020 for International Application No. PCT/US19/64868.
Notification of Transmittal of the International Search Report and the Written Opinion of the International Searching Authority dated Apr. 7, 2020 for International Application No. PCT/US19/64870.
Wicks et al.; "Chapter 13—Polyester Resins"; Organic Coatings Science and Technology; 2nd ed.; pp. 246-257; Wiley, New York, 1999.
Witzeman et al.; "Comparison of Methods for the Preparation of Acetoacetylated Coating Resins"; Journal of Coatings Technology; vol. 62; No. 789; pp. 101-112 (1990).
Yamamoto et al.; "Iridium-Catalyzed Oxidative Methyl Esterification of Primary Alcohols and Diols with Methanol;" Journal of Organic Chemistry; vol. 76; No. 8; Apr. 15, 2011; pp. 2937-2941.
Office Action dated Mar. 29, 2022 received in co-pending U.S. Appl. No. 16/705,331; Now U.S. Publication No. 2020-0181465; Kuo et al.
Office Action dated Apr. 1, 2022 received in co-pending U.S. Appl. No. 16/705,345.
Office Action dated Feb. 22, 2022 received in co-pending U.S. Appl. No. 16/705,351.
USPTO Office Action dated Jun. 9, 2022 received in co-pending U.S. Appl. No. 16/705,394.
USPTO Office Action dated May 11, 2022 received in U.S. Appl. No. 16/705,324.
"Photogenerated Base in Polymer Curing & Imaging: Radiation-induce Crosslinking via a Knoevenagel Reaction" authored by Urankar et al. and published in Polymer Preprints (1994) 35, 933-934.
Notification of Transmittal of the International Search Report and the Written Opinion of the International Searching Authority dated Mar. 20, 2020 for International Application No. PCT/US2019/064872.
Notification of Transmittal of the International Search Report and the Written Opinion of the International Searching Authority dated Mar. 20, 2020 for International Application No. PCT/US2019/064878.
Notification of Transmittal of the International Search Report and the Written Opinion of the International Searching Authority dated Mar. 20, 2020 for International Application No. PCT/US2019/064883.
Notification of Transmittal of the International Search Report and the Written Opinion of the International Searching Authority dated Mar. 20, 2020 for International Application No. PCT/US2019/064893.
Co-pending U.S. Appl. No. 17/309,118, filed Apr. 27, 2021; Kuo et al.
Co-pending U.S. Appl. No. 17/309,121, filed Apr. 27, 2021; Kuo et al.
Office Action dated Mar. 17, 2022 received in co-pending U.S. Appl. No. 16/705,338.
Non-Final Office Communication dated Jun. 9, 2021 received in U.S. Appl. No. 16/705,365.
Notice of Allowance and Fee(s) Due dated Oct. 22, 2021 received in U.S. Appl. No. 16/705,365.
Office Communication dated Jun. 14, 2021 received in U.S. Appl. No. 16/705,324.
Office Communication dated Jan. 7, 2022 received in U.S. Appl. No. 16/705,324.
Notification of Transmittal of the International Search Report and the Written Opinion of the International Searching Authority dated Jun. 2, 2020 for International Application No. PCT/US2019/064876.

* cited by examiner

ASSEMBLY COMPONENTS COMPRISING CURABLE COMPOSITIONS CONTAINING ACETOACETYLATED RESINS

CROSS-REFERENCE TO RELATED APPLICATIONS

This application claims the benefit of U.S. Provisional Application Nos. 62/777,876, 62/777,865, 62/777,871, 62/777,880 all filed Dec. 11, 2018; 62/900,939 filed Sep. 16, 2019; and 62/916,503 filed Oct. 17, 2019 under 35 U.S.C. § 119(e)(1); the entire contents of the provisional applications are hereby incorporated by reference.

FIELD OF THE INVENTION

The present invention relates to assembly components comprising at least one substrate coated with at least one curable composition further comprising resins having β-ketoester group(s), compounds having aldehyde functionality isomers thereof, and primary amines or secondary amines or their salts and/or mixtures of such amines, having improved properties.

BACKGROUND OF THE INVENTION

Reactive compositions based on isocyanate crosslinkers are widely used for coating and adhesive applications. Such systems are curable at room temperature or low temperatures (e.g. <100° C.) and are capable of providing the desirable properties for a variety of applications. However, there have been increasing concerns associated with the production and the use of isocyanate compounds and formulations based on isocyanates.

Compositions based on isocyanate crosslinkers frequently require reaction with moisture to form the crosslinked composition. If a solvent-based system is used due to application equipment or other reasons, it is desirable that trace moisture in the solvent will not initiate curing or crosslinking of the curable composition and thus will not reduce the pot life of the curable composition.

Commercially, it is desirable that the articles of manufacture comprising assembly components further comprise curable compositions that do not: generate by-products during curing that can be detrimental to bond formation or product quality, have volatility, cause defects, have adhesion failure, and/or have unpleasant odor.

In addition, there is a need in commerce for articles of manufacture comprising assembly components that comprise curable compositions having a combination of two or more of the following properties: isocyanate free, curable at low temperatures, good thermal and/or UV stability, good green strength, and good adhesion to substrates typically bonded or coated with isocyanate-containing systems. It is also desirable to have curable composition(s) for application to assembly parts or to assembly part substrates that can be applied and/or cured below about 100° C. while providing suitable adhesion at service temperatures up to 130° C.

SUMMARY OF THE INVENTION

In view of the above commercial shortcomings in the art, the present disclosure addresses the need for properties in assembly components further comprising curable compositions which include one or more of the following properties: (1) a system that cures and that is isocyanate free, (2) curable at low temperatures (e.g. <100° C.), (3) suitable adhesion at service temperatures up to 130° C., (4) good adhesion to substrates typically bonded or coated with isocyanate-containing systems, (5) no Volatile Components, e.g., Volatile Organic Components (VOCs), or has low Volatile Components, e.g., VOCs, released before, during, and/or after curing, (6) does not generate by-products during curing that can be detrimental to film formation or bond quality, (7) reduces defects, (8) has more pleasant odor, less odor, or is odorless, (9) can contain low or no moisture, (10) can be used with moisture-impermeable substrates such as artificial leather, (11) under certain conditions, can be a crosslinking system, (12) can provide more controlled curing, (13) good thermal stability and/or UV stability, (14) good chemical resistance, (15) good mechanical properties, for example, tensile strength, elongation at break, impact strength, and/or Young's modulus, (16) good aging resistance or stability, (17) can provide improved green strength, (18) can provide a usable working life for many applications and/or (19) can provide longer pot life [in some instances, the pot life can be extended by controlling the reaction of the components (controlled cure)].

The compositions useful in this invention can provide desirable properties for a variety of applications. In certain embodiments, the compositions useful in this invention are suitable for applications in the adhesives area, for example, automotive adhesives, structural adhesives, wood adhesives, consumer goods adhesives, and laminating adhesives, and applications in the coatings area, for example, automotive, industrial maintenance, marine craft, field-applied coatings, and furniture.

For the ease of reference but not intending to be limiting in any way, certain aspects of the disclosure are numbered consecutively, as follows In aspect 1 of the invention, there is provided an assembly component comprising at least one substrate coated with at least one curable composition comprising:
I. a first component (I) comprising a resin having at least one functional group selected from the group consisting of β-ketoester and malonate functional groups,
II. a second component (II) comprising at least one curing agent having at least one aldehyde functional group, and
III. a third component (III) comprising at least one compound having amine functionality, salts thereof, or combinations thereof.

In aspect 2 of the invention, there is provided an assembly component of aspect 1 wherein the resin is either an amorphous polyester, a semi-crystalline polyester, or a polyether, or a combination thereof.

In aspect 3 of the invention, there is provided an assembly component of aspects 1 or 2 wherein said polyester is an acetoacetate functional polyester comprising the residues of
a. a hydroxyl component comprising:
   i. at least one diol in an amount ranging from 0 to 100 mole % or 50 to 100 mole %, based on the total moles of (i) and (ii) equaling 100 mole %; and
   ii. at least one polyol in an amount ranging from 0 to 100 mole % or 0 to 50 mole %, based on the total moles of (i) and (ii) equaling 100 mole %;
b. at least one carboxyl component comprising a polycarboxylic acid compound, a derivative of a polycarboxylic acid compound, or a combination thereof; and
c. at least one compound selected from an alkyl acetoacetate, a diketene, or a combination thereof.

In aspect 4 of the invention, there is provided an assembly component of any of aspects 1-3 which contains layering with multiple substrates wherein at least one said curable composition is layered between at least two of said substrates and is subsequently cured.

In aspect 5 of the invention, there is provided an assembly component of any of aspects 1-4 comprising at least one substrate selected from at least one of the following: elastomeric material, a composite material, a paper material, a laminate structure, a fabric material, a glass material, a foamed material, a metal, a mesh material, a wood material, a particle board material, an oriented strand board (OSB) material, a leather material, a synthetic leather material, a vinyl material, poly(acrylonitrile butadiene styrene), polypropylene, glass filled polypropylene, talc filled polypropylene, impact-modified polypropylene, polycarbonate, polycarbonate-poly(acrylonitrile butadiene styrene) blends, urethane elastomers, thermoplastic polyolefin compounds, pigmented thermoplastic polyolefin compounds, filled thermoplastic polyolefin compounds, rubber-modified thermoplastic polyolefin compounds, a primed or painted material, or combinations thereof.

In aspect 6 of the invention, there is provided an assembly component of any of aspects 1-5 wherein said curable composition, upon curing, releases essentially no volatile organic compounds, no volatile organic compounds, less than 5 weight % of volatile organic compounds, less than 4 weight % volatile organic compounds, less than 3 weight % volatile organic compounds, less than 2 weight % volatile organic compounds, or less than 1 weight % of volatile organic compounds; based on the total weight of the composition.

In aspect 7 of the invention, there is provided an assembly component of any of aspects 1-6 wherein the curable composition is either solventless or contains at least one organic solvent.

In aspect 8 of the invention, there is provided an assembly component of any of aspects 1-7 wherein the curable composition maintains at least 50%, or at least 80% of 180 degree peel strength after aging at 80° C. for seven days as measured according to ISO 8510-2-2006 Part 2 at 5 mm/sec.

In aspect 9 of the invention, there is provided an assembly component of any of aspects 1-8 wherein the curable composition has a 180 degree peel strength of at least 8.9 N/25 mm (2 lb/in), or at least 13.3 N/25 mm (3 lb/in), or at least 17.8 N/25 mm (4 lb/in), or at least 22.25 N/25 mm (5 lb/in), according to ISO 8510-2-2006 Part 2 at 5 mm/sec.

In aspect 10 of the invention, there is provided an assembly component of any of aspects 1-9 wherein said at least one amine has primary amine functionality or at least one amine has secondary amine functionality.

In aspect 11 of the invention, there is provided an assembly component of any of aspects 1-10 wherein said at least one primary or at least one secondary amine are selected from at least one of: piperidine; piperazine; morpholine; pyrrolidine; ethylenediamine; diethylenetriamine; triethylenetetramine or isomers thereof; tetraethylenepentamine or isomers thereof; 2,2,4-trimethylhexamethylenediamine; 1,2-diaminopropane; 1,3-diaminopropane; 1-ethyl-1,3-propanediamine; 2,2-dimethylpropylenediamine; 1,4-diaminobutane; 2-methylpentamethylenediamine; 1,6-hexanediamine; 1,7-diaminoheptane; 1,8-diaminooctane; 1,9-diaminononane; 1,12-diaminododecane; 4-azaheptamethylenediamine; N,N-bis(3-aminopropyl)butate-1,4-diamine; N,N-bis(3-aminopropyl)ethylenediamine; 2,4-toluenediamine; 2,6-toluenediamine; 3-dimethylaminopropylamine; 3-diethylaminopropylamine; 3,3'-iminobispropylamine; 1,2-diaminocyclohexane; 1,3-diaminocyclohexane; 1,4-diamino-2,5-diethylcyclohexane; 1,4-diamino-3,6-diethylcyclohexane; 1,2-diamino-4-ethylcyclohexane; 1,2-diamino-4-cyclohexylcyclohexane; isophorone diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3-bis(aminomethyl)cyclohexane; 1,4-bis(aminomethyl)cyclohexane; 1-cyclohexyl-3,4-diamino-cyclohexane; m-xylylenediamine and its hydrogenation products; p-xylylenediamine and its hydrogenation products; 4,4'-methylenedianiline; 2,4-bis(p-aminobenzyl)aniline; diethyltoluenediamine; m-phenylenediamine; 1,2,4-triazole; alanine; proline; 1,4,8,11-tetraazacyclotetradecane; diphenylethylenediamine; 2,2,4,4-tetramethylcyclobutane-1,3-diamine; 2,2-dimethylpropane-1,3-diamine; 2,3-dimethylbutane-2,3-diamine; 1,2-diaminocyclopentane; 1,2,2-trimethylcyclopentane-1,3-diamine; 1,7,7-trimethylbicyclo[2.2.1]heptane-2,3-diamine; dioctyl amine; diisopropylamine; and polyetheramines; or any isomers or combinations thereof.

In aspect 12 of the invention, there is provided an assembly component of any of aspects 1-11 at least one said amine is selected from the group consisting of triethylenetetramine, 3-dimethylaminopropyl amine, 2-methylpentamethylenediamine, hexamethylene diamine, piperidine, piperazine, 1,4,8,11-tetraazacyclotetradecane, pyrrolidine, or mixtures thereof.

In aspect 13 of the invention, there is provided an assembly component of any of aspects 1-12 wherein at least one aldehyde of said composition is selected from at least one of 1,3-cyclohexanedicarboxaldehyde; 1,4-cyclohexanedicarboxaldehyde; mixtures of 1,3- and 1,4-cyclohexanedicarboxaldehyde; 2,6-norbornanedicarboxaldehyde; 2,5-norbornanedicarboxaldehyde; cyclododecane-1,4,8-tricarbaldehyde; 3-(4-formylcyclohexyl)propanal; tricyclodecane dialdehyde; o-phthalaldehyde; terephthalaldehyde; isophthalaldehyde; cyclopentane-1,3-dicarbaldehyde; cyclopenta-3,5-diene-1,3-dicarbaldehyde; glutaraldehyde; 5-(hydroxymethyl)furan-2-carbaldehyde; benzenedipropanol; or any isomers thereof; or combinations thereof.

In aspect 14 of the invention, there is provided an assembly component of any of aspects 1-13 wherein the equivalent ratio of the acetoacetate (AcAc) functional group in the resin to the aldehyde functional group in the composition is from about 4 to about 0.25, or from about 3 to about 0.5, or from about 2.5 to about 0.25, or from about 2.5 to about 0.5, or from about 2.5 to about 0.6, or from about 2 to about 0.25, or from about 2 to about 0.5, or from about 2 to about 0.6, or from about 1.2 to about 0.8.

In aspect 15 of the invention, there is provided an assembly component of any of aspects 1-14 wherein Component (I) comprises residues of at least one polyol component such as 1,1,1-trimethylol propane, 1,1,1-trimethylolethane, glycerin, pentaerythritol, erythritol, threitol, or dipentaerythritol.

In aspect 16 of the invention, there is provided an assembly component of any of aspects 1-15 wherein the polyester comprises residues of at least one diol selected from the group consisting of 2,2-dimethyl-1,3-propanediol, 2-methyl-1,3-propanediol, tricyclodecanedimethanol, 2-butyl-2-ethyl-1,3-propanediol, 1,4-butanediol, 1,6-hexanediol, 1,2-cyclohexanedimethanol, 1,3-cyclohexanedimethanol, 1,4-cyclohexanedimethanol, 2,2,4-dimethyl-1,3-pentanediol, hydroxypivalyl hydroxypivalate, 2,2,4,4-tetramethylcyclobutane-1,3-diol, ethylene glycol, diethylene glycol, triethylene glycol, polyethylene glycol or combinations thereof.

In aspect 17 of the invention, there is provided an assembly component of any of aspects 1-16 wherein the polyester comprises at least one carboxyl component selected from the group consisting of adipic acid, isophthalic acid (or dimethyl isophthalate), terephthalic acid, dimethylterephthalate, 1,4-cyclohexanedicarboxylic acid, 1,3-cyclohexanedicarboxylic acid, tetrahydrophthalic anhydride, tetrahydrophthalic acid, hexahydrophthalic acid, hexahydrophthalic anhydride, maleic anhydride, succinic anhydride, phthalic acid, and phthalic anhydride, or mixtures thereof.

In aspect 18 of the invention, there is provided an assembly component of any of aspects 1-17 wherein said Component (I) has a number average molecular weight of less than 30,000 g/mol.

In aspect 19 of the invention, there is provided a process for preparing any of the assembly components of aspects 1-18 comprising
a. applying the curable composition to at least one surface of a substrate,
b. contacting the surface(s) of said substrate(s) to be adhered to each other, and
c. curing said curable composition.

In aspect 20 of the invention, there is provided any of the assembly components of aspects 1-18 or prepared by the process of aspect 19 wherein the curable composition is an adhesive composition or a coating composition.

In aspect 21 of the invention, there is provided any of the assembly components of aspects 1-18 or prepared by the process of aspect 19 wherein the curable composition is a reactive adhesive composition.

In aspect 22 of the invention, there is provided any of the assembly components aspects 20 or 21 wherein the curable adhesive composition is then cured.

In aspect 23 of the invention, there is provided an assembly component of any of aspects 1-18 or 20-22 or prepared by the process of aspect 19 which comprises or is at least one of the following:
an adhesive, a laminate or a laminated part, a tape, a coating, a sealant, a flexible or non-flexible film, a foam, a potting compound, a disposable hygiene article, a fiberglass reinforced plastic, a compound, an assembly part, a motor vehicle molded part, a motor vehicle extruded part, a motor vehicle assembly component, a furniture part, fabric, a woven textile, a nonwoven, a film multilayer.

In aspect 24 of the invention, there is provided an assembly component of aspect 23 wherein the adhesive is selected from at least one of the following: automotive interior adhesive, flexible laminating adhesive, rigid laminating adhesive, assembly adhesive, nonwoven adhesive, tape adhesive, structural adhesive, hygiene nonwoven construction adhesive, hygiene elastic attachment adhesive, home repair adhesive, industrial adhesive, construction adhesive, furniture adhesive, medical adhesive, contact adhesive, hot melt adhesive, solvent-based adhesive, packaging adhesive, product assembly adhesive, woodworking adhesive, flooring adhesive, automotive assembly adhesive, assembly part adhesive, structural adhesive, pressure sensitive adhesive, pressure sensitive adhesive tape, pressure sensitive adhesive protective film, laminating adhesive, packaging adhesive, flexible film adhesive, hygiene core integrity adhesive, and solvent-based adhesives.

In aspect 25 of the invention, there is provided an assembly component of aspect 23 wherein said composite is selected from at least one of a polyester composite, a glass composite, or a wood-plastic composite.

In aspect 26 of the invention, there is provided an assembly component of aspect 23 wherein said compound is selected from at least one of an extruded compound, a polyacrylic blended compound, a potting compound, a rubber compound, a sheet molding compound or a dough molding compound.

Compositions based on such acetoacetyl-functionalized Component (I) compounds are especially suitable for low-temperature curing adhesive applications without the use of isocyanates. The compositions useful in the invention comprising primary and/or secondary amines offer several property improvements including but not limited to curability and good thermal stability. The primary and/or secondary amines useful in the invention can act as catalyst and/or activating agent for the compositions useful in the invention.

Additionally, the compositions useful in the invention do not require moisture, so they can be used with a variety of substrates as described herein including but not limited to moisture-impermeable substrates such as artificial leather.

Unpredictably, the compositions useful in this invention have a good combination of properties including but not limited to good thermal stability, the ability to cure and/or crosslink, good cure rate, good green strength, good peel strength, and ability to adhere to various substrates.

DETAILED DESCRIPTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifications and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to "a polyester," "a dicarboxylic acid", "a residue" is synonymous with "at least one" or "one or more" polyesters, dicarboxylic acids, or residues and is thus intended to refer to both a single or plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified.

It has been discovered that polyesters having moieties containing activated methylene or methine groups, such as those of β-ketoesters, have properties including but not limited to one or more of the following properties: (1) a system that cures and that is isocyanate free, (2) curable at low temperatures (e.g. <100°), (3) suitable adhesion at service temperatures up to 130°, (4) good adhesion to substrates typically bonded or coated with isocyanate-containing systems, (5) no Volatile Components, e.g., Volatile Organic Components (VOCs), or has low Volatile Components, e.g., VOCs, released before, during, and/or after curing, (6) does not generate by-products during curing that can be detrimental to film formation or bond quality, (7) reduces defects, (8) has more pleasant odor, less odor, or is odorless, (9) can contain low or no moisture, (10) can be used with moisture-impermeable substrates such as artificial leather, (11) under certain conditions, can be a crosslinking system, (12) can provide more controlled curing, (13) good thermal stability and/or UV stability, (14) good chemical resistance, (15) good mechanical properties, for example, tensile strength, elongation at break, and/or Young's modulus, (16) good aging resistance or stability, (17) can provide improved green strength, (18) can provide a usable working life for many applications and/or (19) can provide longer pot life [in some instances, the pot life can be extended by controlling the reaction of the components (controlled cure)].

The compositions are beneficial for assembly components as well as other end-uses.

In one embodiment of the invention, there is provided at least one assembly component comprising at least one substrate coated with at least one curable composition comprising: (I) a first component having at least one or at least two or more functional groups selected from the group consisting of β-ketoester and malonate functional groups; (II) a second component having at least one or at least two aldehyde functional groups, or isomers thereof, or combinations thereof; and (ill) a third component comprising an activating agent or at least one catalyst such as a basic catalyst.

In one embodiment of the invention, there is provided at least one assembly component comprising at least one substrate coated with at least one curable composition comprising: (I) a first component having at least one or at least two or more functional groups selected from the group consisting of β-ketoester and malonate functional groups; (II) a second component having at least one or at least two aldehyde functional groups, or isomers thereof, or combinations thereof; and (III) a third component comprising at least one amine, salts thereof, or combinations thereof.

In one embodiment of the invention, there is provided there is provided at least one assembly component comprising at least one substrate coated with at least one curable composition comprising: (I) a first component having at least one or at least two or more functional groups selected from the group consisting of β-ketoester and malonate functional groups; (II) a second component having at least one or at least two aldehyde functional groups, or isomers thereof, or combinations thereof; and (III) a third component comprising at least one primary amine and/or at least one secondary amine, salts thereof, or combinations thereof.

In one embodiment of the invention, there is provided at least one assembly component comprising at least one substrate coated with at least one curable composition comprising:

I. a first component comprising at least one amorphous or semi-crystalline polyester or at least one polyether having at least one or at least two functional groups selected from the group consisting of β-ketoester and malonate functional groups, II. a second component comprising at least one or at least two aldehyde functional groups, or isomers thereof, or combinations thereof, and III. a third component comprising at least one primary amine and/or at least one secondary amine, salts thereof, or combinations thereof.

In one embodiment of the invention, there is provided at least one assembly component comprising at least one substrate coated with at least one curable composition comprising:

I. a first component comprising at least one amorphous or semi-crystalline polyester or at least one polyether having at least two functional groups selected from the group consisting of β-ketoester and malonate groups, II. a second component comprising at least two aldehyde functional groups, or isomers thereof, or combinations thereof, and III. a third component comprising at least one primary amine and/or at least one secondary amine, salts thereof, or combinations thereof.

In one embodiment of the invention, there are provided at least one assembly component comprising at least one substrate coated with at least one curable composition comprising: at least one polyester which is an acetoacetate functional polyester comprising the residues of a. a hydroxyl component comprising:

i. at least one diol in an amount ranging from 0 to 100 mole % or 50 to 100 mole %, based on the total moles of (i) and (ii) equaling 100 mole %; and ii. at least one polyol in an amount ranging from 0 to 100 mole % or 0 to 50 mole %, based on the total moles of (i) and (ii) equaling 100 mole %;

b. at least one carboxyl component comprising a polycarboxylic acid compound, a derivative of a polycarboxylic acid compound, or a combination thereof; and c. at least one compound selected from an alkyl acetoacetate, a diketene, or a combination thereof.

The β-ketoester groups are represented by Formula 1, wherein R is a branched or straight chain, saturated or unsaturated alkyl, alicyclic, or aromatic group; R' is a hydrogen or a branched or straight chain, saturated or unsaturated alkyl, alicyclic, or aromatic group.

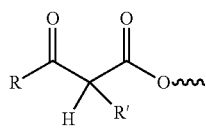

1

The equivalent ratio of the β-ketoacetate functional groups in the resin(s) of Component (I) to the aldehyde functional groups in the composition is defined as the ratio of the equivalents of β-ketoacetate functional groups or acetoacetate (AcAc) functional groups in the polyester to the equivalents of aldehyde functional groups in the composition. For example, the equivalents of the AcAc functional group in a sample of 100 g AcAc polyester with AcAc number of 120 mgKOH/g can be calculated by the formula: equivalents of AcAc polyester=100×120/56100=0.21; whereas the equivalents of the aldehyde functional group in a sample of 0.10 moles of a dialdehyde is equal to 0.10× 2=0.20. Thus, the equivalent ratio is equal to 0.21/0.20=1.05.

In one embodiment, the equivalent ratio of the acetoacetate functional group in the polyester to the aldehyde functional group in Component (II) (i.e. eq. of acetoacetate/ eq. of aldehyde) can be from about 4 to about 0.25; or from about 4 to about 0.5; or from about 3 to about 0.5; or from about 3 to about 0.25; or from about 2 to about 0.25; or from about 2 to about 0.5; or from about 1.5 to about 0.5; or from about 1.3 to about 0.7; or from about 1.2 to about 0.8; or from about 1.1 to about 0.9; or from about 1.05 to about 0.95; or from about 2 to about 1; or from about 2 to about 1.05; or from about 1 to about 0.5; or from about 1 to about 0.1; or from about 1 to about 0.25.

In one embodiment, the equivalent ratio of the acetoacetate functional group in the polyester to the aldehyde functional group in Component (II) (i.e. eq. of acetoacetate/ eq. of aldehyde) can be from about 2 to about 0.25; or from about 2 to about 0.5; or from about 1.5 to about 0.5; or from about 1.3 to about 0.7; or from about 1.2 to about 0.8; or from about 1.1 to about 0.9; or from about 1.05 to about 0.95.

In one embodiment of the invention, there is provided compositions useful in the invention wherein the equivalent ratio of the acetoacetate (AcAc) functional group of Component (I) to the aldehyde functional group is from 5:1 to 1:3, or 5:1 to 1:2, or 5:1 to 1:1; or 1:4 to 4:1; or 1:2 to 1:0.8; or 1:0.3 to 1:1.2; or 1:0.5 to 1:1.2; or 1:0.7 to 1:1.3; or 1:0.9 to 1:1.1; or 1.2:0.8.

The polyesters useful in the invention can contain two or more β-ketoester groups, represented by Formula 2, wherein Z is a polyester residue, R is an alkyl group, R' is hydrogen or an alkyl group and n represents the average number of β-ketoester groups per polymer chain and is an average of at least 2. In one embodiment, the β-ketoester group is acetoacetate (AcAc), and the polyester is an acetoacetate-functional polyester.

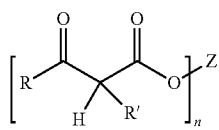

2

The acetoacetate-functional polyester may be prepared by reacting a polyester resin containing hydroxyl groups, for example, a polyester having a hydroxyl number of at least 5 mg KOH/g, in one embodiment, about 30 to 200 mg KOH/g, with diketene or a compound having the β-ketoester moiety such as t-butylacetoacetate (tBAA). Various methods for the preparation of acetoacetylated polyester coating resins have been described by Witzeman et al. in the Journal of Coatings Technology, Vol. 62, No. 789, pp. 101-112 (1990). A reaction mixture can include: (a) from about 50 to about 95 weight %, or from about 60 to about 99 weight %, or from about 65 to about 95 weight %, or from about 70 to about 95 weight %, or from about 50 to about 90 weight %, or from about 60 to about 90 weight %, or from about 65 to about 90 weight %, or from about 70 to about 90 weight %, or from about 70 to about 85 weight %, or from about 70 to about 80 weight %, of hydroxyl-functional polyester; and (b) residues of alkyl acetoacetate, diketene, or combinations thereof, in an amount ranging from about 5 to about 65 weight %; or from about 5 to about 50 weight %; or from about 5 to about 40 weight %; or from about 5 to about 35 weight %, or from about 5 to about 30 weight %; or from about 10 to about 50 weight %; or from about 10 to about 40 weight %; or from about 10 to about 35 weight %; or from about 10 to about 30 weight %; or from about 15 to about 30 weight %; or from about 20 to about 30 weight %; based on the total weight percentages of (a) and (b) equaling 100 weight %.

In one embodiment of the invention, there are provided compositions useful in this invention wherein the residues of alkyl acetoacetate, diketene, or combinations thereof are present in an amount ranging from about 15 to about 30 weight %.

In one embodiment of the invention, there are provided compositions useful in this invention wherein the diol component (a)(i) is present in an amount ranging from about 35 to about 100; or from about 30 to about 95; or from about 35 to about 95; or from about 50 to about 95; or from about 50 to about 100; or from about 60 to about 100; or from about 60 to about 95; or from about 60 to about 90; or from about 60 to about 80; or from about 70 to 90; or from about 70 to 86; or from about 70 to 80 mole %; and the polyol component (a)(ii) is present in an amount ranging from about from about 0 to about 65; or from about 5 to about 65; or from 0 to about 50; or from about 5 to about 50; or from about 10 to about 50; or from about 0 to about 40; or from about 5 to about 40; or from about 10 to about 40; or from about 5 to about 30; or from about 10 to about 30; or from about 15 to about 30; or from about 14 to about 30; or from about 20 to 30 mole %; or from about 5 to about 15 mole %; wherein the total mole % of (a)(i) (diol component) and (a)(ii) (polyol component) equals 100 mole %.

In one embodiment of the invention, there are provided compositions useful in the invention wherein the polyester is an acetoacetate functional polyester comprising the residues of a. a hydroxyl component comprising:
  i. at least one diol in an amount ranging from about 60 to about 90 mole %, based on the total moles of (i) and (ii); and
  ii. a polyol in an amount ranging from about 10 to about 40 mole %, based on the total moles of (i) and (ii);
b. at least one carboxyl component comprising a polycarboxylic acid compound, a derivative of polycarboxylic acid compound, or a combination thereof; and
c. at least one compound selected from an alkyl acetoacetate, a diketene, or a combination thereof in an amount ranging from about 5 to about 65 weight %, based on the total weight of (a), (b), and (c).

In one embodiment of the invention, there are provided compositions useful in this invention comprising residues of alkyl acetoacetate, diketene, or combinations thereof, in an amount ranging from about 5 to about 65 weight %; or from about 5 to about 50 weight %; or from about 5 to about 40 weight %; or from about 5 to about 35 weight %, or from about 5 to about 30 weight %; or from about 10 to about 50 weight %; or from about 10 to about 40 weight %; or from about 10 to about 35 weight %, or from about 10 to about 30 weight %, based on the total weight percentages of (a), (b), and (c) equaling 100 weight %.

In one embodiment of the invention, there are provided compositions useful in this invention comprising residues of at least one polyol component such as 1,1,1-trimethylolpropane, 1,1,1-trimethylolethane, glycerin, pentaerythritol, erythritol, threitol, dipentaerythritol, sorbitol, and the like or combinations thereof.

In one embodiment of the invention, there are provided compositions useful in this invention comprising residues of at least one polyol component selected from 1,1,1-trimethylolpropane, pentaerythritol or combinations thereof.

In one embodiment of the invention, there are provided compositions useful in this invention wherein the polyol component comprises from 0.01 to 50 mole %; or from 0.01 to 45 mole %; or from 5 to 50 mole %; or from 10 to 50 mole %; or from 5 to 40 mole %; or from 10 to 40 mole %; or from 15 to 40 mole %; or from 5 to 35 mole %; or from 10 to 35 mole %; or from 15 to 35 mole %; or from 5 to 30 mole %; or from 10 to 30 mole %; or from 15 to 30 mole % of polyol residues based on the total mole percentages of the diol component and the polyol component equaling 100 mole %.

The hydroxyl functional polyester that is used to prepare acetoacetate polyesters useful in the invention is typically synthesized by reacting a hydroxyl compound, for example, a diol or triol, with a carboxyl compound, for example, a dicarboxylic acid. Examples of hydroxyl compounds include diols such as 2,2-dimethyl-1,3-propanediol (neopentyl glycol), 2-methyl-1,3-propanediol (MPD), tricyclodecanedimethanol, 2-butyl-2-ethyl-1,3-propanediol, 1,4-butanediol, 1,6-hexanediol (HD), 1,2-cyclohexanedimethanol, 1,3-cyclohexanedimethanol, 1,4-cyclohexanedimethanol (CHDM), 2,2,4-trimethyl-1,3-pentanediol, hydroxypivalyl hydroxypivalate, 2,2,4,4-tetramethylcyclobutane-1,3-diol (TMCD), ethylene glycol, diethylene triethylene glycol, polyethylene glycol (PEG), or combinations thereof.

In one embodiment of the invention, there are provided compositions useful in the invention wherein the polyesters can comprise residues of at least one diol component selected from the group consisting of neopentyl glycol, 2-methyl-1,3-propanediol, 1,6-hexanediol, 1,4-cyclohexanedimethanol, 2,2,4,4-tetramethylcyclobutane-1,3-diol, or combinations thereof.

In one embodiment of the invention, there are provided compositions useful in the invention wherein the polyesters can comprise 2-methyl-1,3-propanediol residues.

In one embodiment of the invention, there are provided compositions useful in the invention wherein the polyesters can comprise from 0 to 90 mole %; or from 5 to 90 mole %; or from 10 to 90 mole %; 0 to 80 mole %; or from 5 to 80 mole %; or from 10 to 80 mole %; or from 15 to 80 mole %; or from 20 to 80 mole %; or from 25 to 80 mole %; or from 35 to 80 mole %; or from 0 to 70 mole %; or from 5 to 70 mole %; or from 10 to 70 mole %; or from 15 to 70 mole %; or from 20 to 70 mole %; or from 25 to 70 mole %; or from 35 to 70 mole % of 2-methyl-1,3-propanediol residues, based on the total mole percentages of the diol component and the polyol component equaling 100 mole %.

In one embodiment of the invention, there are provided compositions useful in the invention wherein the polyesters can comprise from 5 to 40 mole %; or from 5 to 35 mole %; or from 5 to 30 mole % of 2-methyl-1,3-propanediol residues.

In one embodiment of the invention, there are provided compositions useful in the invention wherein the polyesters can comprise neopentyl glycol residues. In one embodiment of the invention, there are provided compositions useful in the invention wherein the polyester does not comprise neopentyl glycol residues.

In one embodiment of the invention, there are provided compositions useful in the invention wherein the polyesters can comprise from 0 to 50 mole %; or from 0 to 45 mole %; or from 0.01 to 50 mole %; or from 0.01 to 45 mole %; or from 5 to 35 mole %; or from 20 to 50 mole %; or from 20 to 45 mole %; or from 25 to 50 mole %; or from 25 to 45 mole %; or from 30 to 45 mole % of neopentyl glycol residues.

In one embodiment of the invention, there are provided compositions useful in the invention wherein the polyesters can comprise a total of 70 mole % of 2-methyl-1,3-propanediol residues and neopentyl glycol residues, based on a total mole percentage of the dial component and the polyol component equaling 100 mole % of the hydroxyl component.

In one embodiment of the invention, there are provided compositions useful in the invention wherein the polyesters can comprise residues of 1,4-cyclohexanedimethanol.

In one embodiment of the invention, there are provided compositions useful in the invention wherein the polyesters can comprise from 15 to 85 mole %; or from 20 to 80 mole %; or from 35 to 80 mole %; or from 40 to 75 mole %; or from 60 to 85 mole %; or from 65 to 80 mole %; or from 60 to 75 mole % of 1,4-cyclohexanedimethanol residues.

In one embodiment of the invention, there are provided compositions useful in the invention wherein the polyesters can comprise 1,6-hexanediol residues.

In one embodiment of the invention, there are provided compositions useful in the invention wherein the polyesters can comprise from 5 to 95 mole %; or from 5 to 85 mole %; or from 5 to 40 or from 15 to 85 mole %; or from 35 to 85 mole/0; or from 55 to 85 mole % of 1,6-hexanediol residues.

In one embodiment of the invention, there are provided compositions useful in the invention wherein the polyesters can comprise from 0 to 85 mole % 1,6-hexanediol residues, and/or from 0 to 85 mole % of 1,4-cyclohexanedimethanol residues.

In one embodiment of the invention, there are provided compositions useful in the invention wherein the polyesters can comprise residues of 1,6-hexanediol and 1,4-cyclohexanedimethanol.

In one embodiment of the invention, there are provided compositions useful in the invention wherein the polyesters can comprise from 5 to 40 mole % 1,6-hexanediol residues and from 40 to 75 mole % of 1,4-cyclohexanedimethanol residues.

In one embodiment of the invention, the diol can be 2,2,4,4-tetraalkylcyclobutane-1,3-diol (TACD). Examples of TACD include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, and 2,2,4,4-tetra-n-butylcyclobutane-1,3-diol. In one embodiment, the TACD can be TMCD.

In one embodiment of the invention, there are provided compositions useful in the invention wherein the polyesters can comprise residues of 2,2,4,4-tetramethyl-1,3-cyclobutanediol in the amount of 20 to 50 mole %; or 20 to 40 mole %; or 20 to 35 mole %; or 20 to 30 mole %; or 30 to 50; or 25 to 50 mole %; or 25 to 45 mole %; or 25 to 40 mole %; or 25 to 35 mole %; or 30 to 50 mole %; or 30 to 45 mole %; or 35 to 45 mole %.

In one embodiment of the invention, there are provided compositions useful in the invention wherein the polyester does not comprise 2-methyl-1,3-propanediol residues.

The carboxyl compound can be a polycarboxylic acid compound, a derivative of polycarboxylic acid compound, or a combination thereof. Suitable polycarboxylic acid compounds can include compounds having at least two carboxylic acid groups. In one embodiment, the polycarboxylic acid compound comprises a dicarboxylic acid compound having two carboxylic acid groups, derivatives thereof, or combinations thereof, capable of forming an ester linkage with a polyhydroxyl component. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride. In another embodiment, the polycarboxylic acid compound comprises a tricarboxylic acid or anhydride, for example, trimellitic acid or trimellitic anhydride.

Examples of dicarboxylic acids that can be used include but are not limited to aliphatic dicarboxylic acids, alicyclic dicarboxylic acids, aromatic dicarboxylic acids, derivatives of each, or mixtures of two or more of these acids. Thus, suitable dicarboxylic acids include, but are not limited to, isophthalic acid (or dimethyl isophthalate), terephthalic acid (or dimethyl terephthalate), phthalic acid, phthalic anhydride, 1,4-cyclohexane-dicarboxylic acid, 1,3-cyclohexanedicarboxylic acid, tetrahydrophthalic anhydride, tetrachlorophthalic anhydride, dodecanedioic acid, sebacic acid, azelaic acid, maleic acid or anhydride, fumaric acid, succinic anhydride, succinic acid, adipic acid, 2,6-naphthalenedicarboxylic acid, glutaric acid, itaconic acid, tetrahydrophthalic anhydride, tetrahydrophthalic acid, hexahydrophthalic acid or anhydride, and their derivatives, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

In one embodiment of the invention, there are provided compositions useful in the invention wherein the polyesters can comprise at least one carboxyl component selected from the group consisting of adipic acid, isophthalic acid (or dimethyl isophthalate), terephthalic acid, dimethyl terephthalate, 1,4-cyclohexanedicarboxylic acid, 1,3-cyclohexanedicarboxylic acid, tetrahydrophthalic anhydride, tetrahydrophthalic acid, hexahydrophthalic acid, hexahydrophthalic anhydride, maleic anhydride, succinic anhydride, phthalic acid, and phthalic anhydride, or mixtures thereof.

In one embodiment of the invention, there are provided compositions useful in the invention wherein the polyesters can comprise at least one carboxyl component selected from the group consisting of adipic acid and isophthalic acid, or combinations thereof.

In one embodiment of the invention, there are provided compositions useful in the invention wherein the polyesters can comprise at least one carboxylic acid component further comprising from 0 mole % to 100 mole % adipic acid and from 0 mole % to 100 mole % isophthalic acid; or from 50 mole % to 100 mole % adipic acid and from 0 mole % to 50 mole % isophthalic acid; based on the total mole % of the carboxylic acid component equaling 100 mole %.

In one embodiment of the invention, there are provided compositions useful in the invention wherein the polyesters can comprise (a) a dicarboxylic acid component comprising 50 to 100 mole % adipic acid, 0 to 50 mole % isophthalic acid; and (b) at least one polyol comprising residues of 5 to 40, or 10 to 40, or 10 to 30 mole % of 1,1,1-trimethylolpropane, pentaerythritol or combinations thereof, (c) the diol component comprises residues of 0 to 90 mole % 2-methyl-1,3-propanediol, and 0 to 50 mole % neopentyl glycol, (d) optionally, 1,6-hexanediol, and (e) optionally, 1,4-cyclohexanedimethanol; based on the total mole % of the dicarboxylic acid component equaling 100 mole % and the total mole % of the polyol and diol components equaling 100 mole %.

In one embodiment of the invention, there are provided compositions useful in the invention wherein the polyesters can comprise (a) a dicarboxylic acid component comprising 50 to 100 mole % adipic acid and 0 to 50 mole % isophthalic acid; and (b) at least one polyol comprising residues of 5 to 40 mole %, 10 to 40 mole %, or 10 to 30 mole % 1,1,1-trimethylolpropane, pentaerythritol or combinations thereof, (c) the diol component comprises residues of from 0 to 90 mole % 2-methyl-1,3-propanediol, and from 0 to 50 mole % neopentyl glycol, (d) from 5 to 85; or from 5 to 40; or from 15 to 85; or from 35 to 85; or from 55 to 85 mole % 1,6-hexanediol, and/or (e) from 15 to 85; or from 20 to 80; or from 35 to 80; or from 40 to 75; or from 60 to 85; or from 65 to 80; or from 60 to 75 mole % of 1,4-cyclohexanedimethanol.

In one embodiment of the invention, there are provided compositions useful in the invention wherein either or both of Components (I) and (II) comprise at least one aromatic group. For example, the diacid of the polyesters can comprise either isophthalic acid or terephthalic acid and/or the aldehyde can be terephthalaldehyde.

In one embodiment of the invention, there are provided compositions useful in the invention wherein diol component (a)(i) of the polyester contains only oxygen, carbon, and hydrogen.

In one embodiment of the invention, there are provided compositions useful in the invention wherein diol component (a)(i) of the polyester does not have any carbonyl groups (—CO—).

In one embodiment of the invention, there are provided compositions useful in the invention wherein diol component (a)(i) of the polyester does not contain ether groups.

In one embodiment of the invention, there are provided compositions useful in this invention comprising at least one polyether functionalized with acetoacetate groups, a polyester functionalized with acetoacetate groups, or combinations thereof.

In one embodiment of the invention, there are provided compositions useful in the invention wherein the polyether can be selected from at least one poly(alkylene glycol).

In one embodiment of the invention, there are provided compositions useful in the invention wherein at least one poly(alkylene glycol) can be selected from at least one of unsubstituted poly(alkylene glycol)s having alkylene chains of 1 to 4 carbon atoms, substituted or unsubstituted poly(alkylene glycol)s having alkylene chains of at least 4 carbon atoms or less than 10 carbon atoms.

In one embodiment of the invention, there are provided compositions useful in the invention wherein the poly(alkylene glycol)s can be selected from poly(ethylene glycol), polypropylene glycol), poly(tetramethylene glycol), poly(pentamethylene glycol), poly(hexamethylene glycol), poly(heptamethylene glycol), or poly(octamethylene glycol).

In one embodiment of the invention, there are provided compositions useful in the invention wherein the poly(alkylene glycols can be selected from poly(ethylene glycol), polypropylene glycol) and poly(tetramethylene glycol).

Almost any number of repeating units may be used, however, in one embodiment, the poly(alkylene glycols can have number average molecular weights in the range of about 500 to 5,000. Suitable poly(alkylene glycols) can have a variety of suitable end groups, including but not limited to hydroxyl, epoxy, methyl, and the like. Preferred end groups can be methyl and hydroxyl.

In one embodiment of the invention, there are provided compositions useful in the invention wherein at least one polyether can be branched. For example, glycerol or sucrose may be included to increase branching, such as in propoxylated glycerol and propoxylated sucrose.

In one embodiment of the invention, there are provided compositions useful in the invention wherein the branching agents can be 1,1,1-trimethylolpropane, 1,1,1-trimethylolethane, glycerin, sorbitol, pentaerythritol, triisocyanates, sucrose, and/or aliphatic or aromatic glycols, or mixtures thereof.

The amount of polyether useful in the invention can vary as long as it can be formed into the desired article.

In one embodiment of the invention, there are provided compositions useful in the invention wherein Component (I) contains from 100% or less, or 0.01 to 100%, or 0.01 to 80%, or 0.01 to 65%, or 0.01 to 25%, or 20 to 100%, or 20 to 80%, or 20 to 65%, or 5 to 25'%, or 20 to 80%, or 30 to 100%, or 30 to 80%, or 30 to 65%, or 40 to 100%, or 40 to 80%, or 40 to 65%, or 35 to 65%, or 35 to 54%, or 50 to 100%, or 50 to 80%, or 50 to 100%, or 50 to 80%, or 60 to 100%, or 60 to 80%, by weight of acetoacetylated polyether, based on the total weight percentage of Component (I) equaling 100 weight %. The remaining weight percentages can be any polymer or copolymer, for example, polyesters, polyurethanes, or polycarbonates (acetoacetylated or not).

In one embodiment of the invention, there are provided compositions useful in the invention wherein the polyethers comprise at least one polyalkylene oxide.

In one embodiment of the invention, there are provided compositions useful in the invention wherein at least one polyalkylene oxide can be selected from linear poly(ethylene oxide), linear poly(propylene oxide), linear copolymers of poly(ethylene oxide) and poly(propylene oxide), linear poly(1,3-trimethylene oxide), and linear poly(1,4-tetramethylene oxide).

In one embodiment of the invention, there are provided compositions useful in this invention comprising poly(alkylene glycol) copolymers. The copolymers may be alternating, random, segmented, block, graft, or branched.

In one embodiment of the invention, there are provided compositions useful in the invention wherein the polyether can be selected from poly(ethylene glycol)-ran-poly(propylene glycol), poly(ethylene glycol)-block-poly(propylene glycol)-block-poly(ethylene glycol) and poly(propylene glycol)-block-poly(ethylene glycol)-block-poly(propylene glycol).

In one embodiment of the invention, there are provided compositions useful in the invention wherein the polyether is a block copolymer where a poly(propylene glycol) is first initiated with a polyhydric alcohol and is then endcapped with ethylene oxide.

The polyether condensation product may be prepared using methods known in the art. For example, a polyether condensation product may be formed by reacting polyethylene glycol with tetramethyl cyclopentane-1,2,3,4-tetracarboxylate. This is a general method that may be used to prepare other polyether condensation products useful in the invention.

The condensation product of the polyethers can be produced by reacting at least one core molecule having more than one carboxylic acid group with a sufficient amount of at least one polyether terminated with hydroxy groups to produce an esterified polyether with an average of more than two hydroxy end groups. Suitable core molecules include, but are not limited to oxalic acid, malonic acid, succinic acid, glutaric acid, adipic acid, tetrahydrophthalic anhydride, tetrahydrophthalic acid, hexahydrophthalic acid or anhydride, benzenedicarboxylic acid, benzenetricarboxylic acid, benzenetetracarboxylic acid, cyclohexanetricarboxylic acid, cyclopentanetetracarboxylic acid, adamantanetetracarboxylic acid, biphenyltetracarboxylic acid, benzophenonetetracarboxylic acid, propanetricarboxylic acid, butanetetracarboxylic acid, and mixtures thereof.

In addition to poly(alkylene glycol)s, polyethers comprising polymeric ethers derived from cyclic ether monomers can be used. For example, poly(2,3-dihydrofurandiyl), prepared by cationic polymerization of 2,3-dihydrofuran, can be incorporated into an oxygen scavenging composition in the same fashion as the above-mentioned poly(alkylene glycol)s.

In one embodiment of the invention, there are provided compositions comprising blends of at least one acetoacetylated polyether resin and/or at least one acetoacetylated polyester resin and optionally, other polymers.

In one embodiment of the invention, there are provided compositions useful in this invention comprising from 100% or less, or 0.01 to 100%, or 0.01 to 80%, or 0.01 to 65%, or 0.01 to 25%, or 20 to 100%, or 20 to 80%, or 20 to 65%, or 5 to 25%, or 20 to 80%, or 30 to 100%, or 30 to 80%, or 30 to 65%, or 40 to 100%, or 40 to 80%, or 40 to 65%, or 35 to 65%, or 35 to 54%, or 50 to 100%, or 50 to 80%, or 50 to 100%, or 50 to 80%, or 60 to 100%, or 60 to 80% by weight of acetoacetylated polyesters of the invention wherein the remaining weight percentages of the resin in Component (I) can be any polymer or copolymer, for example, polyethers, polyurethanes, or polycarbonates, (acetoacetylated or not), based on the total weight percentage of Component (I) equaling 100 weight %.

In one embodiment of the invention, there are provided compositions useful in the invention wherein the alkyl acetoacetate of Component (I) of the invention can be selected from acetoacetate, methyl acetoacetate, ethyl acetoacetate, n-propyl acetoacetate, isopropyl acetoacetate, n-butyl acetoacetate, isobutyl acetoacetate, t-amyl acetoacetate, diisopropyl carbinol acetoacetate, or mixtures thereof.

The hydroxyl number of the hydroxyl functional resin used to make the curable acetoacetate functional polyester resins of Component (I) can be within a range of from 0 to 300 mg KOH/g. Suitable ranges of hydroxyl number can include from 0 to 300, or from 100 to 300, or from 120 to 300, or from 120 to 200, or from 140 to 200, or from 150 to 170 mg KOH/g.

In one embodiment, the hydroxyl number of the hydroxyl functional resin used to make Component (I) or compositions useful in the invention can be at least 5, or at least 30, or at least 50, or at least 80, or from 30 to 200; or from 50 to 150 mg KOH/g.

In one embodiment of the invention, there are provided compositions useful in the invention wherein the acid number of Component (I) or the compositions useful in the invention can be from 0 to about 14, or from 0 to about 13, or from 0 to about 12, or from 0 to about 11, or from 0 to about 10, or from 0 to about 9, or from 0 to about 8, or from 0 to about 7, or from 0 to about 6, or from 0 to 5 or from 0 to about 4, or from 0 to about 3, or from 0 to about 2, or from 0 to about 1, or from 0.01 to about 15, or from 0.01 to about 14, or from 0.01 to about 13, or from 0.01 to about 12, or from 0.01 to about 11, or from 0.01 to about 10, or from 0.01 to about 9, or from 0.01 to about 8, or from 0.01 to about 7, or from 0.01 to about 6, or from 0.01 to 5 or from 0.01 to about 4, or from 0.01 to about 3, or from 0.01 to about 2, or from 0.01 to about 1.5, or from 0.01 to about 1, or from 0.50 to about 15, or from 0.50 to about 14, or from 0.50 to about 13, or from 0.50 to about 12, or from 0.50 to about 11, or from 0.50 to about 10, or from 0.50 to about 9, or from 0.50 to about 8, or from 0.50 to about 7, or from 0.50 to about 6, or from 0.50 to 5 or from 0.50 to about 4, or from 0.50 to about 3, or from 0.50 to about 2, or from 0.50 to about 1.5, or from 0.25 to about 1.25 mg KOH/g, with or without addition of neutralizing agents. In one embodiment, the acid number can be from 0.01 to about 2, or from 0.01 to about 1.5 mg KOH/g, without addition of neutralizing agents.

In one embodiment, Component (I) or compositions useful in the invention can have an acid number of 0 to 15, or 0 to 10, or less than 10, or 0 to 5, or less than 5, or less than 2, or less than 1.5 mg KOH/g, with and/or without neutralizing agents being added to the composition.

In one embodiment of the invention, there are provided compositions useful in the invention wherein the polyester has an acid number of less than about 10 mg KOH/g as measured according to ASTM Method 07253-16.

The acid number as referred to herein was measured by using a procedure based on ASTM 07253-16 entitled "Standard Test Method for Polyurethane Raw Materials: Determination of Acidity as Acid Number for Polyether Polyols," and hydroxyl number was measured using a procedure based on ASTM E222-17 entitled "Standard Test Methods for Hydroxyl Groups Using Acetic Anhydride."

In one embodiment of the invention, there are provided compositions useful in the invention wherein Component (I), e.g., acetoacetate functional polyester, acetoacetate functional polyether, or blends thereof can have a glass transition temperature (Tg) of about −85° C. to about 150° C.; or about −85° C. to about 130° C.; or about −85° C. to about 120° C.; or about −85° C. to about 110° C.; or about −85° C. to about 100° C.; or about −85° C. to about 80° C.; or about −85° C. to about 70° C.; or about −85° C. to about 60° C.; or about −85° C. to about 50° C.; or about −85° C. to about 40° C.; or about −85° C. to about 30° C.; or about −85° C. to about 20° C.; or about −85° C. to about 10° C.; or about −85° C. to about 0° C.; or about −85° C. to about −10° C.; or about −85° C. to about −20° C.; or about −85° C. to about −25° C.; or about −85° C. to about 30° C.; or about −85° C. to about 60° C.; or about −85° C. to about 50° C.; or about −85° C. to about 40° C.; or about −85° C. to about 30° C.; or about −85° C. to about 20° C.; or about −85° C. to about 10° C.; or about −85° C. to about 0° C.; or about −85° C. to about −10° C.; or about −85° C. to about −20° C.; or about −85° C. to about −25° C.; or about −85° C. to about −30° C.; or about −70° C. to about 60° C.; or about −70° C. to about 50° C.; or about −70° C. to about 40° C.; or about −70° C. to about 30° C.; or about −70° C. to about 20° C.; or about −70° C. to about 10° C.; or about −70° C. to about −5° C.; or about −70° C. to about 0° C.; or about −70° C. to about −10° C.; or about −70° C. to about −20° C.; or about −70° C. to about −25° C.; or about −70° C. to about −30° C.; or about −65° C. to about 60°; or about −65° C. to about 50° C.; or about −65° C. to about 40° C.; or about −65° C. to about 30° C.; or about −65° C. to about 25° C.; or about −65° C. to about 20° C. or about −65° C. to about 10° C.; or about −65° C. to about 0° C.; or about −65° C. to about −10° C.; or about −65° C. to about −20° C.; or about −65° C. to about −25° C.; or about −65° C. to about −30° C.; or about −45° C. to about 60° C.; or about −45° C. to about 50° C.; or about −45° C. to about 40° C.; or about −45° C. to about 30° C.; or about −45° C. to about 25° C.; or about −45° C. to about 20° C. or about −45° C. to about 10° C.; or about −45° C. to about 0° C.; or about −45° C. to about −10° C.; or about −45° C. to about −20° C.; or about −45 to about −25° C.; or about −45° C. to about −30° C. As used herein, "Tg" and/or "melting point" is determined using a Q2000 differential scanning calorimeter (DSC) from TA Instruments, New Castle, Del., US, at a scan rate of 20° C./min.

In one embodiment of the invention, there are provided compositions useful in the invention wherein Component (I) can have a Tg of from about −85° C. to about −10° C.; or about −70° C. to about 50° C.; or about −70° C. to about 20° C.; or about −70° C. to about −10° C.; or about −70° C. to about −20° C.; or from about −65° C. to about 40° C.; or from about −65° C. to about 25° C.; or from about −65° C. to about −20° C.; or from about −65° C. to about −25° C.; or from about −10° C. to about 50° C.; or from about −45° C. to about −10° C.; or from about −45° C. to about −25° C.; or from about −10° C. to about 50° C.; or from about −45° C. to about −10° C.; or from about −45° C. to about −25° C.

In one embodiment of the invention, there are provided compositions useful in the invention wherein Component (I) can have a Tg of from about −70° C. to about 50° C.; or from about −70° C. to about 20° C.; or from about −70° C. to about −10° C.; or from about −45° C. to about −10° C.; or from about −70° C. to about −20° C.; or from about −60° C. to about −25° C. Depending on the applications, the uncured polyesters, polyethers and/or polyester/polyester blends can have high or low Tg's.

In one embodiment of this invention, there are provided compositions useful in the invention wherein Component (I) can have a melting point from about 10 to about 150° C., or from about 10 to 100° C., or from about 10 to 80° C., or from about 10 to 75° C., or from about 10 to 60° C., or from 15 to about 150° C., or from about 15 to 100° C., or from about 15 to 80° C., or from about 15 to 75° C., or from about 25 to 60° C., or from 25 to about 150° C., or from 25 to about 100° C., or from 25 to about 80° C., or from about 25 to 75° C., or from about 25 to 60° C.

The number average molecular weight (Mn) of Component (I) useful in the present invention can be from 500 to 100,000; or from 700 to 50,000; or from 700 to 40,000; or from 700 to 30,000; or from 700 to 25,000; or from 700 to 20,000; or from 700 to 15,000; or from 700 to 10,000; or from 700 to 9,000; or from 700 to 8,000; or from 700 to 7,000; or from 1000 to 6,000; or from 700 to 5,000; or from 700 to 4,000; or from 700 to 3500; or from 1,000 to 50,000; or from 1,000 to 40,000; or from 1,000 to 30,000; or from 1,000 to 25,000; or from 1,000 to 20,000; or from 1000 to 15,000; or from 1000 to 10,000; or from 1000 to 9,000; or from 1000 to 8,000; or from 1000 to 7,000; or from 1000 to 6,000; or from 1000 to 5,000; or from 1000 to 4,000; or from 1200 to 3500; or from 1500-4000; or from 1500 to 3500; or from 1500 to 3000; or from 1500 to 2500; or from 1400 to 3000; or from 1400 to 2500; or from 500-6000 g/mol.

In one embodiment of the invention, there are provided compositions useful in the invention wherein Component (I) can have a number average molecular weight (Mn) from 1000-6000 g/mol; or 1000-5000 g/mol; or 1500-4000 g/mol; or 1400-3000 g/mol; or 1400-2500 g/mol; or 1500 to 3500 g/mol; or 1500 to 3000 g/mol; or 1500 to 2500 g/mol; or 500-6000 g/mol; or 1000-6000 g/mol. The polyesters can be linear or branched. The polyesters can be amorphous or semi-crystalline. The Mn is measured by gel permeation chromatography (GPC) using polystyrene equivalent molecular weight.

In this invention, viscosity can be reported as Brookfield viscosity or complex viscosity. Brookfield viscosity can be measured using a Brookfield viscometer as described in ASTM D3236 "Apparent Viscosity of Hot Melt Adhesives and Coating Materials." Complex viscosity can be measured by a Discovery Hybrid Rheometer (DHR). In one embodiment of the invention, for example, for solventless compositions, complex viscosity can be measured in centipoise (cP) at or above 25° C. by a Discovery Hybrid Rheometer (DHR), T.A. Instruments.

For cured or uncured compositions, Brookfield and/or complex viscosity measurements can be reported in centipoise (cP) units. In various embodiments, Component (I) of the invention and/or the curable (pre-cured) compositions useful in the invention, for example, adhesive compositions, can exhibit a Brookfield viscosity or a complex viscosity in the range of 5 to 700,000 cP, or 5 to 300,000 cP, or 300 to 200,000 cP, or 300 to 150,000 cP, or 300 to 100,000 cP, or 500 to 200,000 cP, or 500 to 150,000 cP, or 500 to 100,000 cP, or 500 to 90,000 cP, or 500 to 80,000 cP, or 500 to 50,000 cP, or 500 to 45,000 cP, or 500 to 40,000 cP, or 500 to 35,000 cP, or less than 30,000 cP, or 500 to 30,000 cP, or 500 to 25,000 cP, or 500 to 20,000 cP, or 500 to 15,000 cP, or 500 to 10,000 cP, or 500 to less than 10,000 cP, or 500 to 8,000 cP or 500 to 5,000 cP, or 500 to 3,000 cP, or 1000 to 100,000 cP, or 1000 to 90,000 cP, or 1000 to 80,000 cP, or 1000 to 50,000 cP, or 1000 to 45,000 cP, or 1000 to 40,000 cP, or 1000 to 35,000 cP, or 1000 to 30,000 cP, or 1000 to 25,000 cP, or 1000 to 20,000 cP, or 1000 to 15,000 cP, or 1000 to 10,000 cP, or 1000 to less than 10,000 cP, or 1000 to 8,000 cP or 1000 to 5,000 cP, or 1000 to 3,000, or 5000 to 90,000 cP, or 5000 to 80,000 cP, or 5000 to 50,000 cP, or 5000 to 45,000 cP, or 5000 to 40,000 cP, or 5000 to 35,000 cP, or 5000 to 30,000 cP, or 5000 to 25,000 cP, or 5000 to 20,000 cP, or 5000 to 15,000 cP, or 5000 to 10,000 cP, or 5000 to less than 10,000 cP, or 5000 to 8,000 cP, or 10,000 to 90,000 cP, or 10,000 to 80,000 cP, or 10,000 to 50,000 cP, or 10,000 to 45,000 cP, or 10,000 to 40,000 cP, or 10,000 to 35,000 cP, or 15,000 to 90,000 cP, or 15.000 to 80,000 cP, or 15,000 to 50,000 cP, or 15,000 to 45,000 cP, or 15,000 to 40,000 cP, or 15,000 to 35,000 cP, or 20,000 to 90,000 cP, or 20,000 to 80,000 cP, or 20,000 to 50,000 cP, or 20,000 to 45,000 cP, or 20,000 to 40,000 cP, or 20,000 to 35,000 cP, or 25,000 to 90,000 cP, or 25,000 to 80,000 cP, or 25,000 to 50,000 cP, or 25,000 to 45,000 cP, or 25,000 to 40,000 cP, or 25,000 to 35,000, or 30,000 to 90,000 cP, or 30,000 to 80,000 cP, or 30,000 to 50,000 cP, or 30,000 to 45,000 cP, or 30,000 to 40,000 cP, or 35,000 to 90,000 cP, or 35,000 to 80,000 cP, or 35,000 to 50,000 cP, or 35,000 to 45,000 cP, or 35,000 to 40,000 cP, at application temperature, or at room temperature, or at 50° C. or less, or at 45° C. or less, or at 40° C. or less. The desired viscosity of the final composition will depend upon the application and can be adjusted for the application.

In one embodiment of the invention, there are provided compositions useful in the invention wherein the Brookfield viscosity (or the complex viscosity) of Component (I) or any of the compositions useful in the invention is less than 700,000 centipoise, or less than 300,000 centipoise, or from 500 to 300,000 centipoise, or less than 100,000 centipoise, or less than 80,000 centipoise, or less than 30,000 centipoise, or less than 20,000 centipoise, or less than 10,000 centipoise, or less than 5,000 centipoise, or from 500 to 30,000 centipoise, or from 4500 centipoise or less, or from 2500 centipoise or less, or from 2000 centipoise or less, or 1000 centipoise or less, at application temperature, or at room temperature, or at 50° C. or less, or at 45° C. or less, or at 40° C. or less.

In one embodiment of the invention, there are provided compositions useful in the invention wherein the Brookfield viscosity (or the complex viscosity) of Component (I) or the compositions useful in the invention is less than 300,000 centipoise, or from 500 to 300,000 centipoise, or less than 30,000 centipoise, or from 500 to 30,000 centipoise, at application temperature, or at room temperature, or at 50° C. or less, or at 45° C. or less, or at 40° C. or less.

In one embodiment of the invention, there are provided compositions useful in the invention wherein the Brookfield viscosity (or the complex viscosity) of Component (I) or the curable compositions useful in the invention is from 500 cP or less, or 100 cP or less, or 50 cP or less, or from 1 to 100 cP, or from 1 to 50 cP, or from 10 to 50 cP, at application temperature, or at room temperature, or at 50° C. or less, or at 45° C. or less, or at 40° C. or less.

In one embodiment of the invention, there is provided curable compositions useful in the invention, e.g., solventless compositions, wherein the Brookfield viscosity (or the complex viscosity) of Component (I) or any of the compositions useful in the invention is from 5 to 5,000 cP, or 5000 cP or less, or 4500 cP or less, or 2500 cP or less, or 2000 cP or less, or 1500 cP or less, or 1000 cP or less, at application temperature, or at room temperature, or at 50° C. or less, or at 45° C. or less, or at 40° C. or less.

In other embodiments, the curable adhesive compositions useful in the invention may exhibit a ring and ball softening point in the range of −10 to 180° C.

In one embodiment of the invention, there are provided compositions useful in this invention comprising an adduct having two or more β-ketoacetate functional groups selected from 2-methyl-1,3-propanediol diacetoacetate; neopentyl glycol diacetoacetate; 2,2,4,4-tetramethylcyclobutane-1,3-diol diacetoacetate; or trimethylolpropane triacetoacetate. These adducts can function as reactive diluents to reduce the viscosity of the curable formulations, especially those of solventless formulations for extending their pot life and/or for modifying the functionality of the β-ketoester functional groups available for curing agents.

In one embodiment of the invention, there are provided compositions useful in this invention comprising an adduct having two or more β-ketoacetate functional groups selected from 2-methyl-1,3-propanediol diacetoacetate, 2,2,4,4-tetramethylcyclobutane-1,3-diol diacetoacetate; neopentyl glycol diacetoacetate, and trimethylolpropane triacetoacetate.

In one embodiment of the invention, there are provided compositions useful in the invention wherein at least one basic catalyst or activating agent can be selected from the group consisting of primary and/or secondary amines (primary amines are defined herein as comprising primary amine functionality and secondary amines are defined herein as comprising secondary amine functionality), salts thereof and/or mixtures thereof, including but not limited to aliphatic, cycloaliphatic, aliphatic-aromatic, and/or aromatic amines. For example, in one embodiment, the definition of a primary amine does not exclude an amine having both primary amine functionality and tertiary amine functionality. Salts of the amines can include but are not limited to their carboxylate, phosphate, sulfate, and/or hydrochloride salts. The salt of the amine can be prepared by any method known in the art including but not limited to preparation in situ by addition of the corresponding acid and amine and/or preparation separately by pre-reacting amine and acid and adding as a single component as a catalyst to the curable composition.

In one embodiment of the invention, there are provided compositions useful in the invention wherein said at least one amine can be selected from 01-020 aliphatic amines, 01-020 cycloaliphatic amines, or combinations thereof.

In one embodiment of the invention, there are provided compositions useful in the invention wherein at least one amine comprises at least one primary and/or secondary functionality, including but not limited to at least one of: piperidine; piperazine; morpholine, pyrrolidine; ethylenediamine; diethylenetriamine; triethylenetetramine (TETA) or isomers thereof; tetraethylenepentamine or isomers thereof; 2,4,4-trimethylhexamethylenediamine; 1,2-diaminopropane; 1,3-diaminopropane: 1-ethyl-1,3-propanediamine; 2,2-dimethylpropylenediamine; 1,4-diaminobutane; 2-methylpentamethylenediamine (MPMDA, trade name Dytek™ A); 1,6-hexanediamine; 1,7-diaminoheptane; 1,8-diaminooctane; 1,9-diaminononane; 1,12-diaminododecane; 4-azaheptamethylenediamine; N,N-bis(3-aminopropyl)butane-1,4-diamine; N,N-bis(3-aminopropyl)ethylenediamine; 2,4-toluenediarnine; 2,6-toluenediamine; 3-dimethylarninopropylarnine (DMAPA); 3-diethylaminopropylamine; 3,3'-iminobispropylamine; 1,2-diaminocyclohexane; 1,3-diaminocyclohexane; 1,4-diamino-2,5-diethylcyclohexane; 1,4-diamino-3,6-diethylcyclohexane; 1,2-diamino-4-ethylcyclohexane; 1,2-diamino-4-cyclohexylcyclohexane; isophorone diamine (IPDA); norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylrnethane; 3-amino-1-(4-aminocyclohexyl)propane; 1,3-bis(aminomethyl)cyclohexane; 1,4-bis(aminomethyl)cyclohexane; 1-cyclohexyl-3,4-diamino-cyclohexane; m-xylylenediamine and its hydrogenation products; p-xylylenediamine and its hydrogenation products; 4,4'-methylenedianiline; 2,4-bis(p-aminobenzyl) aniline; diethyltoluenediamine; m-phenylenediamine; 1,2,4-triazole; alanine; proline; 1,4,8,11-tetraazacyclotetradecane (cyclam); diphenylethylenediamine; 2,2,4,4-tetramethylcyclobutane-1,3-diamine; 2,2-dimethylpropane-1,3-diamine; 2,3-dimethylbutane-2,3-diamine; 1,2-diaminocyclopentane; 1,2,2-trimethylcyclopentane-1,3-diamine; 1,7,7-trimethylbicyclo[2.2.1]heptane-2,3-diamine; dioctyl amine; diisopropylamine; and/or polyetheramines such as JEFFAMINE® D-230, D-400, D-2000, and T-403 amines, or any isomers thereof or any combinations thereof.

In one embodiment of the invention, there are provided compositions useful in the invention wherein the amine comprises primary amine functionality and can be selected from at least one of: ethylenediamine; diethylenetriamine; triethylenetetramine (TETA) or isomers thereof; tetraethylenepentamine or isomers thereof; 3-dimethylaminopropylamine; 3-diethylaminopropylamine; 2,2,4-trimethylhexamethylenediamine; 1,2-diaminopropane; 1,3-diaminopropane; 2,2-dimethylpropylenediamine; 1,4-diaminobutane; 2-methylpentarnethylenediamine (MPMDA, trade name Dytek™ A); 1,6-hexanediamine; 1,7-diaminoheptane; 1,8-diaminooctane; 1,9-diaminononane; 1,12-diaminododecane; 4-azaheptamethylenediamine; N,N-bis(3-aminopropyl)butane-1,4-diamine; N,N-bis(3-aminopropyl)ethylenediamine; 2,4-toluenediarnine; 2,6-toluenediamine; 3,3'-iminobispropylamine; 1,2-diaminocyclohexane; 1,3-diaminocyclohexane; 1,4-diamino-2,5-diethylcyclohexane; 1,4-diamino-3,6-diethylcyclohexane; 1,2-diamino-4-ethylcyclohexane; 1,2-diamino-4-cyclohexylcyclohexane; isophorone diamine (IPDA); norbornanediarnine; 4,4'-diaminodicyclohexylrnethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3-bis(aminomethyl)cyclohexane; 1,4-bis(aminomethyl)cyclohexane; 1-cyclohexyl-3,4-diamino-cyclohexane; xylylenediamine and its hydrogenation products; p-xylylenediamine and its hydrogenation products; 4,4'-methylenedianiline; 2,4-bis(p-aminobenzyl)aniline; diethyltoluenediamine; m-phenylenediamine, or any isomers thereof or combinations thereof.

In one embodiment, the amines useful in the compositions useful in the invention having primary amine functionality can comprise aminosilanes including but not limited to the following: 3-(dimethoxymethylsilyl)propylamine; 4-amino-3,3-dimethylbutyl trimethoxysilane; 4-amino-3,3-dimethylbutylmethyl dimethoxysilane; 3-aminopropylmethyl diethoxysilane; N-(2-aminoethyl)-3-aminopropyl trimethoxysilane; N-(2-aminoethyl)-3-aminopropyl triethoxysilane; (3-trimethoxysilylpropyl)diethylenetriamine; 3-(1,3-dimethylbutylidene)aminopropyltriethoxysilane; 3-(2-aminoethylamino)propyldimethoxymethylsilane; 3-(2,8,9-trioxa-5-aza-1-sila-bicyclo[3.3.3]undec-1-yl)-propylamine; trimethoxysilylpropylamine; and triethoxysilylpropylamine.

In one embodiment of the invention, amines having primary amine functionality can comprise any specifically listed herein or any combination(s) thereof.

In one embodiment of the invention, there are provided compositions useful in the invention wherein at least one amine can be selected from the group consisting of triethylenetetramine (TETA) including isomers thereof, 3-dimethylaminopropyl amine, 2-methylpentamethylenediamine, hexamethylene diamine (HMDA), piperidine, piperazine, 1,4,8,11-tetraazacyclotetradecane (cyclam), pyrrolidine, or combinations thereof.

In one embodiment of the invention, there are provided compositions useful in the invention wherein at least one amine can be selected from the group consisting of triethylenetetramine (TETA) or isomers 2-methylpentamethylenediamine, hexamethylene diamine (HMDA), piperidine, piperazine, 1,4,8,11-tetraazacyclotetradecane (cyclam), pyrrolidine, or combinations thereof.

In one embodiment of the invention, there are provided compositions useful in the invention wherein at least one amine has secondary amine functionality.

In one embodiment of the invention, there are provided compositions useful in the invention wherein at least one amine can be selected from the group consisting of piperidine, piperazine, triethylenetetramine (TETA) or isomers thereof, 2-methylpentamethylenediamine, hexamethylene diamine (HMDA) or combinations thereof.

In one embodiment of the invention, there are provided compositions useful in the invention wherein said at least one amine can be selected from sterically hindered C1-C20 dialkyl amines, such as diisopropylamine.

In one embodiment of the invention, there are provided compositions useful in the invention wherein said at least one amine can be selected from C1-C20 dialkyl amines such as diisopropylamine and dioctylamine.

In one embodiment of the invention, there are provided compositions useful in the invention wherein monoethylamine and/or amines having only tertiary amine functionality, i.e., no primary or secondary amine functionality, are excluded.

In one embodiment of the invention, there are provided compositions useful in the invention wherein amines having any tertiary amine functionality and/or monoethylamine are excluded.

In one embodiment of the invention, there are provided compositions useful in the invention wherein the amine is a solid or a liquid.

In one embodiment of the invention, there are provided compositions useful in the invention wherein at least one amine and/or any reaction product thereof is present in the amount of up to 25 parts per hundred (phr) based on the total weight of Component (I), the resin.

The compositions of the present invention can comprise one or more base catalysts of Component (III) selected from at least one amine, including but not limited to amines having primary and/or secondary amine functionality, salts thereof and/or mixtures thereof, in an amount ranging from 0.10 to 10, 0.10 to 9.0, 0.10 to 8.0, 0.10 to 7.0, 0.10 to 6.0, 0.10 to 5.0, 0.10 to 4.0, 0.10 to 3.0, 0.10 to 2.0, 0.10 to 1.0, 0.20 to 10, 0.20 to 9.0, 0.20 to 8.0, 0.20 to 7.0, 0.20 to 6.0, 0.20 to 5.0, 0.20 to 4.0, 0.20 to 3.0, 0.20 to 2.0, 0.20 to 1.0, 0.30 to 10, 0.30 to 9.0, 0.30 to 8.0, 0.30 to 7.0, 0.30 to 6.0, 0.30 to 5.0, 0.30 to 4.0, 0.30 to 3.0, 0.30 to 2.0, 0.30 to 1.0, 0.40 to 10, 0.40 to 9.0, 0.40 to 8.0, 0.40 to 7.0, 0.40 to 6.0, 0.40 to 5.0, 0.40 to 4.0, 0.40 to 3.0, 0.40 to 2.0, 0.40 to 1.0, 0.50 to 10, 0.50 to 9.0, 0.50 to 8.0, 0.50 to 7.0, 0.50 to 6.0, 0.50 to 5.0, 0.50 to 4.0, 0.50 to 3.0, 0.50 to 2.0, 0.50 to 1.0, 1.0 to 10, 1.0 to 9.0, 1.0 to 8.0, 1.0 to 7.0, 1.0 to 6.0, 1.0 to 5.0, 1.0 to 4.0, 1.0 to 3.0, or 1.0 to 2.0 phr, based on the total weight of Component (I), the resin.

In one embodiment of this invention, there are provided compositions useful in this invention comprising one or more base catalysts selected from at least one amine, including but not limited to primary and/or secondary amines, salts thereof and/or mixtures thereof, in an amount ranging from 0.1 to 15 phr, or 0.1 to 10 phr, or from 0.10 to 3 phr, or 0.5 to 10 phr, or 0.5 to 10 phr, or 0.5 to 10 phr, or 0.1 to 10 phr, or 0.1 to 3 phr, or 0.1 to 1.5 phr, or 3 to 10 phr, or 1 to 9 phr, or 0.2 to 7 phr, or 0.3 to 6 phr, or 0.5 to 5 phr, or 0.5 to 3 phr, or 0.5 to 2 phr, or 1 to 10 phr, or 1 to 3 phr, or 1 to 2 phr, or 1 to 1.5 phr or 0.5 to 1.5 phr, based on the total weight of Component (I), the resin.

In one embodiment of this invention, there are provided compositions useful in the invention wherein the amine and/or reaction product thereof is present in an amount ranging from 0.5 to 10 phr, 3 to 10 phr, 1 to 9 phr, 0.5 to 5 phr, or 1 to 1.5 phr based on the total weight of Component (I), the resin and depending on the application.

In one embodiment of this invention, there are provided compositions useful in the invention wherein the amine and/or reaction product thereof is present in an amount ranging from 0.5 to 10 phr, or 0.5 to 5 phr, or 0.5 to 4.5 phr based on the total weight of Component (I), the resin.

In one embodiment of this invention, there are provided compositions useful in the invention wherein the amine is present in an amount ranging from 0.5 to 4.5, or 0.5 to 4.0, or 0.5 to 3.5, or 0.5 to 3.0, or 0.5 to 2.5, or 0.5 to 2.0, or 0.5 to 1.5, or 0.5 to 1.0 phr, based on the total weight of Component (I), the resin.

In one embodiment of the invention, there are provided compositions where the curing agent with aldehyde functional groups can be either Component (II), or the product where component (II) has been first combined with either Component (I) or Component (III).

In one embodiment of the invention, there are provided compositions useful in the invention wherein the curing agent comprises an aliphatic, or aromatic, di- or polyaldehyde or mixtures thereof. In one embodiment, the curing agent (II) can be a small molecule or an adduct having one or more aldehyde functional groups or two or more aldehyde functional groups.

The aldehydes useful in the invention can be selected from at least one of 1,3-cyclohexanedicarboxaldehyde (1,3-CHDAL); 1,4-cyclohexanedicarboxaldehyde (1,4-CHDAL); mixtures of 1,3- and 1,4-CHDAL, such as Paraloid Edge XL-195 available from The Dow Chemical Company, Midland, Mich., US; 2,6-norbornanedicarboxaldehyde; 2,5-norbornanedicarboxaldehyde; cyclododecane-1,4,8-tricarbaldehyde; 3-(4-formylcyclohexyl)propanal; tricyclodecane dialdehyde (TCDDAL); o-phthalaldehyde; terephthalaldehyde (TPAL); isophthalaldehyde; cyclopentane-1,3-dicarbaldehyde; cyclopenta-3,5-diene-1,3-dicarbaldehyde; glutaraldehyde; methylfurfural; furfural; or 5-(hydroxymethyl)furan-2-carbaldehyde; benzenedipropanol; or any isomers thereof; or mixtures thereof.

In one embodiment of the invention, the aldehyde useful in the invention can be selected from at least one of 1,3-cyclohexanedicarboxaldehyde (1,3-CHDAL); 1,4-cyclohexanedicarboxaldehyde (1,4-CHDAL); mixtures of 1,3- and 1,4-CHDAL, such as Paraloid Edge XL-195 available from The Dow Chemical Company; 2,6-norbornanedicarboxaldehyde; terephthalaldehyde, isophthalaldehyde, orthophthalaldehyde, cyclopenta-3,5-diene-1,3-dicarbaldehyde and tricyclodecane dialdehyde, or any isomers thereof or any combinations thereof.

In one embodiment of the invention, the aldehyde useful in the invention can be selected from at least one of mixtures of 1,3- and 1,4-CHDAL, terephthalaldehyde, orthophthalaldehyde, and tricyclodecane dialdehyde, or any isomers thereof or any combinations thereof.

In one embodiment of the invention, there are provided compositions useful in the invention wherein monoaldehydes are excluded from the scope of this invention.

In one embodiment, at least one semi-crystalline polyester resin can be used. In one embodiment, the semi-crystalline polyester resin can possess enough crystalline character to give the material a sharp melting point rather than slowly softening when heated. The semi-crystalline polyester resin can be a solid, a waxy or a semi-solid material at room temperature with a melting point, for example, from 10 to 100°, or for example, from 15 to 75° C., or for example, from 25 to 65° C.

The glass transition temperature (Tg) of the semi-crystalline polyesters useful in the invention can be from −70 to 20° C., or from −60 to 0° C., or from −50 to −20° C., or in any subsets of the ranges mentioned herein for the polyesters useful in the invention.

The semi-crystalline polyester resins, like the other polyesters useful herein, can have a number average molecular weight (Mn) from 1000-5000 g/mol, or from 1500-4000 g/mol.

In this invention, "curing" means to develop at least one strength property and/or increase in the average molecular weight (either Mn or Mw) of the composition(s) of the invention, for example, an adhesive composition or a coating composition, by chemical reaction. "Curing agent"

means a substance or mixture of substances that reacts with resin during a curing reaction. "Curing temperature" means the temperature to which at least one composition(s) of the invention or an article of manufacture containing at least one composition(s) of the invention is subjected to cure the composition. "Curing time" means the period of time for curing of the composition(s) of the invention to occur, whether or not they cure at room temperature, and whether or not they are subjected to application of thermal energy; radiation, e.g., microwave, ultraviolet, or infrared radiation; ultrasonic waves; pressure; moisture; pH change; or other sources of activation; or any other variables. "Curable" means capable of curing.

In one embodiment of the invention, there are provided compositions useful in this invention comprising essentially no solvent or which is solventless (except for where solvents can be added, in some embodiments, to the final composition to adjust the viscosity). By the terms "solventless" or "comprising essentially no solvent", it is meant that solvent could be present in an amount of from 0 to 5 weight % or from 0 to 2 weight %, based on the total weight of the composition.

In one embodiment of the invention, there are provided compositions useful in the invention wherein Components (I)-(III) are mixed or reacted without the presence of solvent.

In one embodiment of the invention, there are provided compositions useful in the invention wherein Components (I)-(III) are mixed or reacted in the presence of solvent.

The curable compositions useful in the invention may be essentially solvent free, solvent-less or solvent-based. In one embodiment, the solvent-based compositions useful in the invention comprises an organic solvent. Suitable organic solvents include ethyl acetate, butyl acetate, xylene, ketones (for example, acetone, methyl amyl ketone and methyl ethyl ketone), 2-butoxyethanol, ethyl-3-ethoxypropionate, toluene, butanol, cyclopentanone, cyclohexanone, ethanol, and other volatile inert solvents typically used in adhesives. In one embodiment, the solvents useful in the invention are ethyl acetate, butyl acetate, xylene, methyl amyl ketone, methyl ethyl ketone, acetone, ethanol, and toluene.

In one embodiment of the invention, there are provided compositions useful in the invention which contain one or more organic solvents selected from the group comprising ethyl acetate, butyl acetate, xylene, methyl amyl ketone, methyl ethyl ketone, ethanol, acetone, methanol and toluene.

In one embodiment of the invention, there are provided compositions useful in the invention wherein at least one solvent can be selected from ethyl acetate, butyl acetate, ethanol and acetone, or combinations thereof.

In one embodiment of the invention, there are provided compositions useful in the invention wherein at least one solvent can be selected from ethyl acetate, butyl acetate, or combinations thereof.

In one embodiment of the invention, there is provided compositions useful in this invention comprising at least one solvent which is not an ether or polyether and/or which does not contain ether groups. In one embodiment of this invention, the curable compositions useful in this invention do not contain solvents or residual amounts of solvents such as ethylene glycol and/or ether-containing compounds, for example, dimethyl ether, ethylene glycol diethyl ether, diethylene glycol dimethyl ether, or diethylene glycol diethyl ether.

In one embodiment of the invention, there are provided compositions useful in the invention wherein said organic solvents are used to reduce the viscosity of the adhesive composition.

In one embodiment of the invention, there are provided compositions useful in the invention wherein said adducts having two or more β-ketoester functional groups described herein are used as reactive diluents to reduce the viscosity of the curable compositions and/or to reduce the solvent content.

The amount of solvents (excluding water) can range from 0% to 75%, 5% to 75%, 10% to 75%, 15% to 75%, 20% to 75%, 25% to 75%, 30% to 75%, 35% to 75%, 40% to 70%, 0% to 70%, 5% to 70%, 10% to 70%, 15% to 70%, 20% to 70%, 25% to 70%, 30% to 70%, 35% to 70%, 40% to 70%, 0% to 65%, 5% to 65%, 10% to 65%, 15% to 65%, 20% to 65%, 25% to 65%, 30% to 65%, 35% to 65%, 40% to 65%, 0% to 60%, 5% to 60%, 10% to 60%, 15% to 60%, 20% to 60%, 25% to 60%, 30% to 60%, 35% to 60%, 40% to 60%, 0% to 55%, 5% to 55%, 10% to 55%, 15% to 55%, 20% to 55%, 25% to 55%, 30% to 55%, 35% to 55%, 40% to 55%, 0% to 50%, 5% to 50%, 10% to 50%, 15% to 50%, 20% to 50%, 25% to 50%, 30% to 50%, 35% to 50%, 40% to 50%, 0% to 45%, 5% to 45%, 10% to 45%, 15% to 45%, 20% to 45%, 25% to 45%, 0% to 40%, 5% to 40%, 10% to 40%, 15% to 40%, 20% to 40%, 25% to 40%, or 0% to 5% by weight based on the total weight of the composition equaling 100 weight %.

In one embodiment, the amount of solvents (excluding water) can range from 20 to 65%, or 20 to 55%, or 20 to 50%, or 25 to 45%, or 40 to 60%, or 25 to 55%, or 25 to 60%, by weight based on the total weight of the composition equaling 100 weight %. The percentage by weight of solids (based on the total weight of the composition equaling 100 weight %) is the remainder of the weight % of the composition that does not comprise solvent(s). Therefore, the percentage by weight of solids based on the total weight of the composition equaling 100 weight % would be, for example, 20% to 100%, 20% to 95%, 20% to 90%, 20% to 85%, 20% to 80%, 20% to 75%, 20% to 70%, 25% to 100%, 25% to 98%, 25% to 95%, 25% to 90%, 25% to 85%, 25% to 80%, 25% to 75%, 25% to 70%, 30% to 100%, 30% to 95%, 30% to 90%, 30% to 85%, 30% to 80%, 30% to 75%, 30% to 70%, 35% to 100%, 35% to 95%, 35% to 90%, 35% to 85%, 35% to 80%, 35% to 75%, 35% to 70%, 40% to 100%, 40% to 95%, 40% to 90%, 40% to 85%, 40% to 80%, 40% to 75%, 40% to 70%, 50% to 100%, 50% to 95%, 50% to 90%, 50% to 85%, 50% to 80%, 50% to 75%, 50% to 70%, 50% to 65%, 50% to 60%, 55% to 100%, 55% to 95%, 55% to 90%, 55% to 85%, 55% to 80%, 55% to 75%, 55% to 70%, 55% to 65%, 60% to 100%, 60% to 95%, 60% to 90%, 60% to 85%, 60% to 80%, 60% to 75%, 60% to 70%, 95% to 99.99%, or 98% to 99.99%.

The term "excluding water" means that water is not added as a solvent but moisture and/or water can be formed during the curing process.

In one embodiment of this invention, the curable compositions useful in the invention can be water-free, and/or moisture-free, and/or can comprise substantially no water, and/or can contain essentially no water, or can contain one of the following percentages of water: 0 to 20 weight %, 0 to 19 weight %, 0 to 18 weight %, 0 to 17 weight %, 0 to 16 weight %, 0 to 15 weight %, 0 to 14 weight %, 0 to 13 weight %, 0 to 12 weight %, 0 to 11 weight %, 0 to 10 weight %, 0 to 9 weight %, 0 to 8 weight %, 0 to 7 weight %, 0 to 6 weight %, 0 to 5 weight %, 0 to 4 weight %, 0 to 3 weight %, 0 to 2 weight %, 0 to 1 weight %, 0.01 to 20 weight %, 0.01 to 19 weight %, 0.01 to 18 weight %, 0.01 to 17 weight %, 0.01 to 16 weight %, 0.01 to 15 weight %, 0.01 to 14 weight %, 0.01 to 13 weight %, 0.01 to 12 weight %, 0.01 to 11 weight %, 0.01 to 10 weight %, 0.01 to 9 weight %, 0.01 to 8 weight %, 0.01 to 7 weight %, 0.01 to 6 weight %, 0.01 to 5 weight %, 0.01 to 4 weight %, 0.01 to 3 weight %, 0.01 to 2 weight %, or 0.01 to 1 weight %, based on the total weight of the composition. The term "substantially water free" means that no more than 0.01 to 2 weight % water could be present prior to the curing reaction.

In one embodiment of the invention, there are provided composition(s) useful in the invention wherein the solids content is from 25 to 100, or from 25 to 98, or from 25 to 95, or from 35 to 80, or from 35 to 75, or from 40 to 60, or from 45 to 60, or from 40 to 65, or from 45 to 65, or from 50 to 80, or from 55 to 75% by weight solids.

In one embodiment of the invention, there are provided composition(s) useful in the invention wherein the solids content is from 25 to 80, or from 30 to 80, or from 35 to 80, or from 35 to 75, or from 30 to 65, or from 30 to 60, or from 40 to 60, or from 45 to 60, or from 40 to 65, or from 45 to 65, or from 50 to 80, or from 55 to 75% by weight solids.

In one embodiment of the invention, there are provided composition(s) useful in the invention wherein the solids content is from 25 to 100% by weight solids, 25 to 95% by weight solids, or 95% by weight solids or greater, or 100% by weight solids.

In one embodiment of the invention, there are provided composition(s) useful in the invention wherein the solids content of the composition is from 35 to 75% by weight solids.

In some cases, the composition(s) useful in the invention can be a liquid composition in water or solvent, applied to a surface and dried or permitted to dry, while, in other embodiments, the composition may be at or near 100 percent solids. In one embodiment of this invention, there are provided curable compositions which, upon curing, can release essentially no Volatile Components, e.g., Volatile Organic Components (VOCs), or has low Volatile Components, e.g., VOCs, released before, during, and/or after curing; or less than 5 weight %, less than 4 weight %, less than 3 weight %, less than 2 weight %, or less than 1 weight % VOCs; based on the total weight of the composition.

In one embodiment of this invention, there are provided curable compositions which, upon curing, can release essentially no gases or no gases.

In one embodiment of the invention, the compositions useful in the invention can further comprise at least one compound selected from waxes; paraffins; rosins; rosin ester resins; tackifier resins; polyester resins; polyol resins; or acrylics, the acrylics having a number average molecular weight of from about 2,000 to 15,000 g/mol and a Tg of from about 40° C. to 130° C.; or mixtures thereof.

In one embodiment of the invention, there are provided compositions useful in the invention, which are used at, or above, or near its glass transition temperature.

In one embodiment of the invention, there are provided cured compositions useful in the invention wherein ΔT is the difference between the temperature at use and the glass transition temperature (Tg) of the cured composition, and ΔT is from −30 to 60° C. or from −30 to 10° C.

In one embodiment of the invention, there are provided cured compositions useful in the invention that maintain at least 50%, or at least 80% of 180 degree peel strength after aging at 80° C. for seven days as measured according to ISO 8510-2-2006 Part 2 at 5 mm/sec.

In one embodiment of the invention, there are provided cured compositions useful in the invention having a 180 degree peel strength of at least 8.9 N/25 mm (2 lb/in), or at least 13.3 N/25 mm (3 lb/in), or at least 17.8 N/25 mm (4 lb/in), or at least 22.25 N/25 mm (5 lb/in), according to ISO 8510-2-2006 Part 2 at 5 mm/sec.

In one embodiment of the invention, there are provided cured compositions useful in the invention having a T-peel strength of at least 100 Win as measured according to ASTM F904-16 "Standard Test Method for Comparison of Bond Strength or Ply Adhesion of Similar Laminates Made from Flexible Materials" when cured for one week at room temperature. In some embodiments, the T-peel strength measured as noted can be at least 100 g/in, or at least 150 g/inin, or at least 200 g/inin, or at least 250 g/in, or at least 300 g/in, or at least 350 g/n, or at least 400 g/in, or at least 500 g/in.

In one embodiment of the invention, there are provided cured compositions useful in the invention having a T-peel strength of at least 120 g/in as measured according to ASTM F904-16 "Standard Test Method for Comparison of Bond Strength or Ply Adhesion of Similar Laminates Made from Flexible Materials" when aged for eight weeks at room temperature.

In one embodiment of the invention, there are provided cured compositions useful in the invention having a T-peel strength of at least 120 g/in as measured according to ASTM F904-16 "Standard Test Method for Comparison of Bond Strength or Ply Adhesion of Similar Laminates Made from Flexible Materials" when aged for four weeks, or eight weeks, at room temperature.

In one embodiment of the invention, there are provided cured compositions useful in the invention having a T-peel strength of at least 150 g/in as measured according to ASTM F904-16 "Standard Test Method for Comparison of Bond Strength or Ply Adhesion of Similar Laminates Made from Flexible Materials" when aged for three weeks at 40° C.

In one embodiment of the invention, there are provided cured compositions useful in the invention having a T-peel strength loss of less than 20% as measured according to ASTM F904-16 "Standard Test Method for Comparison of Bond Strength or Ply Adhesion of Similar Laminates Made from Flexible Materials" when aged at 40° C. for three weeks, or at 80° C. for one week.

In one embodiment of the invention, there are provided cured compositions useful in the invention having a T-peel strength loss of less than 20% as measured according to ASTM F904-16 "Standard Test Method for Comparison of Bond Strength or Ply Adhesion of Similar Laminates Made from Flexible Materials" for the time period from having been aged for one week to having been aged for four weeks at room temperature.

In one embodiment of the invention, there are provided compositions useful in the invention wherein the peak tensile strength was retained or increased when first aged for one week at room temperature and then at 80° C. for one week. In one embodiment of the invention, there are provided compositions useful in the invention having a peak tensile strength of from 0.1 to 60 MPa, from 0.1 to 50 MPa, from 0.1 to 45 MPa, from 0.1 to 40 MPa, from 0.1 to 35 MPa, from 0.1 to 30 MPa, or from 0.1 to 25 MPa, as measured according to ASTM D638 when aged for one week at room temperature.

In one embodiment of the invention, there are provided compositions useful in the invention having a peak tensile strength of from 0.1 to 60 MPa, from 0.1 to 50 MPa, from 0.1 to 45 MPa, from 0.1 to 40 MPa, from 0.1 to 35 MPa, from 0.1 to 30 MPa, or from 0.1 to 25 MPa, as measured according to ASTM D638 when first aged for one week at room temperature and then at 80° C. for one week.

In one embodiment of the invention, there are provided compositions useful in the invention having an elongation at break of from 1 to 560%, or from 1 to 350%, or from 1 to 300%, or from 10 to 400%, or from 10 to 350%, or from 10 to 325%, or from 10 to 300%, or from 25 to 400%, or from 25 to 350%, or from 25 to 325%, or from 25 to 300%, or from 50 to 400%, or from 50 to 350%, or from 50 to 325%, or from 50 to 300%, as measured according to ASTM 0638 when aged for one week at room temperature.

In one embodiment of the invention, there are provided compositions useful in the invention having a Young's modulus of from 0.1 to 5000 MPa, or from 0.1 to 4500 MPa, or from 0.1 to 4000 MPa, or from 0.1 to 3500 MPa, or from 0.1 to 3000 MPa, or from 0.1 to 2500 MPa, or from 0.1 to 2000 MPa as measured according to ASTM D638 when aged for one week at room temperature.

In one embodiment of the invention, the compositions useful in the invention can have one or more of any of the properties described herein, in any combination.

In one embodiment of the invention, there are provided compositions useful in the invention that are capable of curing, being curable, having been cured, or having reached a gelation point. At the gelation point, a loose network of crosslinks are formed across the material and the gel or gelation point can be measured as either (1) the point when the storage modulus (G') and the loss modulus (G") crossed, or (2) when the tan delta became independent of frequency, each method by rotational rheometry using a Discovery Hybrid Rheometer 3 (DHR), T.A. Instruments.

As used herein, storage modulus is a measure of elastic response of a material. It measures the stored energy. Loss modulus is a measure of viscous response of a material. It measures the energy dissipated as heat. Tan delta, a measure of damping, is the ratio of loss modulus to the storage modulus, G"/G'. These properties can be used to evaluate compositions for stability at storage and spray conditions, gelation process, and thermal stability.

In one embodiment of the invention, there are provided compositions useful in the invention having a gelation point, or that cures, at or above 25° C. as measured by a Discovery Hybrid Rheometer (DHR), T.A. Instruments.

"Pot life" herein means period of time during which a multi-part composition can be used after mixing the components. "Working life" means the time period that a composition is available to be applied to at least one substrate and to be capable of forming a bond.

Pot life measurements can include various methods such as: (1) the time from the initial viscosity (when components have been all combined) to the time of doubling of viscosity; (2) reaching a particular viscosity value above which the composition can no longer be used in a given application or application method; (3) reaching a viscosity so high that the curable composition can no longer be molded or applied to a substrate, depending on the particular application and its requirements; or (4) for solvent-based compositions, reaching a viscosity of 24 seconds using a #2 Zahn cup following ASTM Method D4212 at room temperature.

In one embodiment of the invention, various factors can influence pot life including, but not limited to, choice of and/or amount of Components (I), (II), and/or (III), choice of solvent and concentration of the formulation in the solvent. Extended pot life can provide the user with more flexibility in efficiently applying the curable compositions useful in the invention. In certain embodiments of the invention, extended pot life of the compositions is provided.

In some embodiments and using any of the pot life measurement methods described herein, the compositions useful in the invention can have a very adequate pot life ranging from minutes, to hours, to days. In some embodiments and using any of the pot life measurement described herein, the pot life of the compositions useful in the invention can be 5 minutes or more; or 10 minutes or more; or 25 minutes or more. Independently, in some embodiments, pot life can be 7 days or less; or 1 day or less; or 8 hours or less; or 2 hours or less; or 30 minutes or less.

In one embodiment of the invention, there are provided compositions useful in the invention having a gelation point at or above 25° C. of 2 minutes or greater, or one-half hour or greater, or 1 hour or greater.

In one embodiment of the invention, there are provided compositions useful in the invention wherein Component (I) comprises at least one polyester or polyether, which is semi-crystalline at or below 80° C., or below 65° C., or below 50° C., or below 40° C., or below 35° C., whether or not it is present in a blend with at least one non-crystalline resin and wherein said blend is viscous or a solid.

In one embodiment of the invention, there are provided compositions useful in the invention wherein Component (I) is a solid, waxy, or a semi-solid material at room temperature.

In one embodiment of this invention, there are provided compositions useful in the invention wherein: (a) Components (I), (II) and (III) are combined in any order; or (b) Component (II) is first combined with Component (III); or (c) Components (I) and (II) are combined first; or (d) Component (III) is first combined with Component (I).

In one embodiment of this invention, there are provided compositions useful in the invention wherein Component (III) is first combined with Component (I) and the product thereof is then combined with Component (II). In this embodiment, the amine can have primary amine functionality and/or secondary amine functionality. In this embodiment, there are provided compositions useful in the invention wherein the amine has primary amine functionality.

In one embodiment of the invention, there are provided compositions useful in the invention wherein Components (I), (II), and (III) are combined together simultaneously in the same vessel.

In one embodiment of the invention, there are provided compositions useful in the invention wherein said composition is cured at 20° C. or higher in six days or less, and optionally, then post-cured at or above 20° C.

The compositions useful in the invention can comprise at least one additive selected from the group consisting of tackifiers, plasticizers, fillers, waxes, pigments, stabilizers, antioxidants, adhesion promoters, flame retardants, conductive agents, rheology modifiers and mixtures thereof, and the process of preparing the curable compositions useful in the invention may comprise an additional step of blending in one or more of these additives.

In various embodiments, the compositions useful in the invention can comprise at least 0.1, 0.5, 1, 2, or 3 and/or not more than 5 weight percent of at least one antioxidant, based on the total weight of the composition equaling 100 weight %.

One or more fillers, such as but not limited to talc, carbon black, calcium carbonate, titanium dioxide and zinc oxide, may be incorporated into the curable compositions useful in the invention. In various embodiments, the adhesives of the invention can comprise at least 1, 5, 10, 20, 30, or 40 and/or not more than 80, 70, 60, 55, 50 or 45 weight percent of at least one filler, based on the total weight of the compositions equaling 100 weight %. Moreover, the adhesives of the invention can comprise in the range of 1 to 80, 5 to 70, 10 to 60, 20 to 55, 30 to 50, or 40 to 45 weight percent of at least one filler, based on the total weight of the compositions equaling 100 weight %.

Further, in some embodiments, the compositions useful in the invention may exclude one or more additives typically found in conventional compositions. For example, in some cases, the adhesive formed using the compositions useful in the invention can be used as a pressure sensitive adhesive (e.g., tapes and labels) and nonwoven adhesive applications without addition of oils or plasticizers that can possibly volatilize, migrate, or be extracted. For example, in some cases, adhesive compositions of the present invention can include not more than about 2, not more than about 1.5, not more than about 1, not more than about 0.5, not more than about 0.25, not more than about 0.1, or not more than about 0.05 weight percent of one or more oils or plasticizers, based on the total weight of the adhesive composition equaling 100 weight %.

In one embodiment of the invention, there are provided compositions useful in the invention wherein the composition does not contain: a polyvinyl alcohol, or a polyvinyl polymer, or a poly vinyl acetate polymer.

In one embodiment of the invention, there are provided compositions useful in the invention wherein neutralizing agents are not added to the composition after the polymerization reaction. In another embodiment of the invention, there are provided compositions useful in the invention wherein neutralizing agents can be added to the composition after the polymerization reaction.

Neutralizing agents can include but are not limited to primary amines, secondary amines, tertiary amines, and ammonia as well as any other neutralizing agent known in the art, for example, for water dispersible or water dispersed microgel compositions.

In one embodiment of the invention, there are provided compositions useful in the invention wherein the composition can contain residues of amine, formed from the use of at least one primary or at least one secondary amine, that may be incorporated into the composition during curing. The primary and/or secondary amines or amine salts useful in this invention can be used as catalysts or activating agents for the reaction of the β-ketoacetate (AcAc) group of Component (I) with the aldehyde functional groups of Component (II) and not as a neutralizing agent.

In one embodiment of the invention, there are provided compositions useful in the invention wherein the polyester resin is not an alkyd polyester resin and/or is not a polyester resin containing alkyd residues and/or fatty acid residues.

In one embodiment of the invention, there are provided compositions useful in the invention which are not thermosetting compositions.

In one embodiment of the invention, there are provided compositions useful in the invention which are not thermosetting compositions.

In one embodiment of the invention, the compositions useful in this invention does not contain compounds containing polysaccharide groups and/or oxidized polysaccharides having aldehyde functional groups.

In one embodiment of the invention, there are provided compositions useful in the invention wherein curing occurs between β-ketoacetate (AcAc) functional Component (I) and the aldehyde functionality, forming carbon-carbon bonds.

In one embodiment of the invention, there are provided compositions that can be cured at low temperatures (e.g. <80° C.).

In one embodiment of the invention, there are provided compositions that can be cured at room temperature, or 10° C. to 130° C., or 20° C. to 130° C., or 20° C. to 120° C. or 20° C. to 115° C., or 20° C. to 110° C., or 20° C. to 105° C., or 20° C. to 100° C., or 20° C. to 90° C., or 20° C. to 80° C., or 20° C. to 70° C., or 30° C. to 130° C., or 30° C. to 120° C., or 30° C. to 115° C., or 30° C. to 110° C., or 30° C. to 105° C., or 30° C. to 100° C., or 30° C. to 90° C., or 30° C. to 80° C., or 30° C. to 70° C., or 40° C. to 130° C., or 40° C. to 120° C., or 40° C. to 115° C., or 40° C. to 110° C., or 40° C. to 105° C., or 40° C. to 100° C., or 40° C. to 90° C., or 40° C. to 80° C., or 40° C. to 70° C., or 50° C. to 130° C., or 50° C. to 120° C., or 50° C. to 115° C., or 50° C. to 110° C., or 50° C. to 105° C. or 50° C. to 100° C., or 50° C. to 90° C., or 50° C. to or 60° C. to 130° C., 60° C. to 120° C. or 60° C. to 115° C., or 60° C. to 110° C., or 60° C. to 105° C., or 60° C. to 100° C., or 60° C. to 90° C., or 60° C. to 80° C., or 70° C. to 130° C., 70° C. to 120° C., or 70° C. to 115° C., or 70° C. to 110° C., or 70° C. to 105° C., or 70° C. to 100° C., or 60° C. to 90° C., or 70° C. to 80° C. or 80° C. to 130° C., 80° C. to 120° C., or 80° C. to 115° C., or 80° C. to 110° C., or 80° C. to 105° C., or 80° C. to 100° C., or 80° C. to 90° C., or 90° C. to 130° C., 90° C. to 120° C., or 90° C. to 115° C., or 90° C. to 110° C., or 90° C. to 105° C., or 90° C. to 100° C., or 100° C. to 130° C., 100° C. to 120° C., or 100° C. to 115° C. or 10° C. to 30° C.

In another embodiment of the invention, there are provided compositions useful in the invention wherein, after curing, the compositions useful in the invention can be processed or used at temperatures of up to 130° C., or up to 120° C., or up to 115° C., or up to 110° C., or up to 105° C., or up to 100° C., or up to 95° C., or up to 90° C., or up to 85° C., or up to 80° C., or up to 75° C. At these temperatures, the compositions useful in the invention can maintain suitable adhesion or bond strength for the particular application. "Suitable adhesion or bond strength" can include but is not limited to any adhesion or bond strength values/measures contained herein or that are known to one of ordinary skill in the art for the particular application.

In one embodiment of this invention, the compositions useful in the invention are not water-dispersible polyester microgel compositions.

In one embodiment of the invention, acrylates are not blended with the acetoacetylated Component (I) of the invention/and or the compositions useful in the invention.

The curable adhesive compositions useful in the invention can react at an ambient temperature in the presence of a base catalyst. In a so-called 2K system, it can be advantageous to mix two components of the composition shortly before use, to prevent the composition from premature reaction and becoming useless. In one embodiment of the present invention, the mixing of two components first does not result in significant reactions in the absence of a catalyst. Thus, the acetoacetylated resin and the curing agent may be mixed and stored until the mixture is ready to be used. The base catalyst can then be added shortly before use.

In one embodiment of the invention, there are provided compositions useful in the invention wherein said Component (III) comprises at least one primary amine or at least one secondary amine, salts thereof, or mixtures thereof.

In one embodiment of the invention, there are provided compositions useful in the invention wherein said amine is a solid.

In one embodiment of the invention, there are provided compositions useful in the invention wherein at least one curing agent of Component (II) is a solid.

In one embodiment of the invention, there are provided compositions that when cured at room temperature for seven days, has less than 75% loss, or less than 50% loss, or less than 25% loss, or less than 20% loss, or less than 10% loss in 180 degree peel strength after further aging at 80° C. for seven days.

In one embodiment of the invention, there are provided compositions useful in the invention wherein Component (III) is present in an amount from about 0.5 to about 10 phr, or from about 0.5 to about 8 phr, or from about 1 to about 8 phr, or from about 1.5 phr to about 7 phr, based on the total weight of Component (I), the resin.

In one embodiment of the invention, there are provided compositions useful in this invention comprising a fourth component, Component (IV), which is at least one additive comprising at least one adhesion promoter, at least one green strength enhancer, or combinations thereof, or wherein said at least one additive is both an adhesion promoter and a green strength enhancer.

In one embodiment of the invention, there are provided compositions useful in the invention wherein Component (IV) is present in an amount from about 1 phr to about 70 phr, or from about 1 phr to about 60 phr, or from about 1 phr to about 50 phr, or from about 1 phr to about 40 phr, or from about 1 phr to about 30 phr, or from about 1 phr to about 25 phr, or from about 4 phr to about 56 phr, or from about 5 phr to about 50 phr, or from about 5 phr to about 40 phr, or from about 5 phr to about 30 phr, or from about 5 phr to about 25 phr, or from about 10 phr to about 50 phr, or from about 10 phr to about 40 phr, or from about 10 phr to about 30 phr, or from about 10 phr to about 25 phr, or from about 10 phr to about 20 phr, based on the total weight of Component (I), the resin.

In one embodiment of the invention, there are provided compositions useful in the invention wherein Component (IV) is present from about 10 phr to about 25 phr, based on the total weight of Component (I), the resin.

In one embodiment of the invention, there are provided compositions useful in the invention wherein the green bond strength of the cured adhesive composition is increased by addition of Component (IV). Alternatively, the green bond strength of the composition which includes Component (IV) is greater than the green bond strength of the composition which does not include Component (IV). Component (III) levels can contribute to green bond strength.

"Green bond strength" or "green strength" is defined herein as the ability of a composition to hold two surfaces together when brought into contact and before the composition develops its ultimate bond properties when fully cured and as defined in ASTM 907. Good green strength is desirable, in some instances, because it can relate to a composition's resistance to deformation and fracture before curing. In addition, good green strength, in some instances, can indicate that a composition will withstand mechanical operations or other processing techniques before fully curing.

Tackifying resins (tackifiers) may be added to the curable compositions useful in the invention to modify the adhesive or coating properties, including but not limited to the green strength, viscosity, wetting behavior, adhesion, particularly to low energy surfaces, and viscoelastic behavior of the finished composition. The tackifier resin selected may vary depending on the exact curable composition and the balance of properties needed in an application, such as peel strength, shear strength, and tack. These properties are important to adhesive compositions and the best advantages are achieved where the overall balance of these properties, both initially and over time in different environmental conditions, have been optimized.

Tackifier resins that may be present in the curable compositions include, without limitation, cycloaliphatic hydrocarbon resins, C5 hydrocarbon resins, C5/C9 hydrocarbon resins, aliphatic-aromatic hydrocarbon resins, aromatically modified C5 resins (commercially available as Piccotac™ resins, Eastman Chemical Company, TN, US), C9 hydrocarbon resins, C9 hydrocarbon resins (commercially available as Picco™ resins, Eastman), pure monomer resins, e.g. copolymers of styrene with alpha-methyl styrene, vinyl toluene, para-methyl styrene, indene, and methyl indene (commercially available as Kristalex™ resins, Eastman), dicyclopentadiene (DCPD) resins, dicyclopentadiene based/containing resins, cyclopentadiene based/containing resins, terpene resins (commercially available as Sylvares™ resins, AZ Chem Holdings, LP, Jacksonville, Fla., US), terpene phenolic resins, terpene styrene resins, rosin acid resin, esters of rosin (commercially available as Permalyn™ resins, Eastman), esters of modified rosins, liquid resins of fully or partially hydrogenated rosins, fully or partially hydrogenated rosin esters (commercially available as Foral™ E and Foralyn™ resins, Eastman), fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated DCPD resins (commercially available as Escorez® 5000-series resin), fully or partially hydrogenated modified DCPD resins (commercially available as Escorez® 5600-series resin), both Escorez® resins available from ExxonMobil Chemical Company, Texas, US), fully or partially hydrogenated modified dicyclopentadiene based/containing resins, aromatically modified C5 resins (commercially available as Piccotac™ resins, Eastman Chemical Company, Tennessee, US), fully or partially hydrogenated aromatically modified C5 resins, fully or partially hydrogenated C9 resins (commercially available as Regalite™ resins, Eastman), fully or partially hydrogenated pure monomer resins (e.g., copolymers or styrene with alpha-methyl styrene, vinyl toluene, para-methyl styrene, indene, and methyl indene) (commercially available as Regalrez™ resins, Eastman), fully or partially hydrogenated C5/cycloaliphatic resins (commercially available as Eastotac™ resins, Eastman), fully or partially hydrogenated C5/cycloaliphatic/styrene/C9 resins, fully or partially hydrogenated cycloaliphatic resins, and/or combinations thereof.

In one embodiment of the invention, there are provided compositions useful in the invention wherein said Component (IV) can be selected from C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene based/containing resins, partially hydrogenated rosin esters, partially hydrogenated dicyclopentadiene based/containing resins, partially hydrogenated modified dicyclopentadiene based/containing resins, partially hydrogenated aromatically modified C5 resins, partially hydrogenated C9 resins, partially hydrogenated pure monomer resins, partially hydrogenated aromatic-modified cycloaliphatic resins, partially hydrogenated cycloaliphatic resins, and/or combinations thereof.

In one embodiment of the invention, there are provided compositions useful in the invention wherein said tackifiers can be selected from C5 hydrocarbon resins, C9 hydrocarbon resins, aliphatic-aromatic hydrocarbon resins, aromatic hydrocarbon resins, pure monomer hydrocarbon resins, aliphatic-aromatic hydrocarbon resins, fully or partially hydrogenated C9 resins, rosin ester resins, and/or combinations thereof.

The compositions useful in the invention can be useful as a "warm" melt adhesive for those applications where hot melt adhesives are currently employed and applied by techniques known to those skilled in the art. The melting point and/or ring and ball softening point (RBSP) of one or more tackifier resins in the curable composition can be selected to suit the intended end use for the curable composition, where RBSP is measured by ASTM D6493-11 "Standard Test Methods for Softening Point of Hydrocarbon Resins and Rosin Based Resins by Automated Ring-and-Ball Apparatus." In various embodiments, the tackifier resin has a RBSP from −10° C. to 160° C. In some embodiments, the tackifier resin has an acid number in the range of 0 to 170, 0 to 30, 0 to 25, or 0 to 11 mg KOH/g. In some embodiments, tackifier resins with zero or low acid numbers are preferred to reduce interference with the base catalyst. In some embodiments, tackifier resins can have moderate or high acid numbers, for example, where the primary and/or secondary amine is buffered.

In other embodiments, tackifier resins with RBSP above the expected application temperature and with acid numbers of about 5 to about 10, or of about 11 to about 22, or of about 145 to about 165 mg KOH/g, can be added in amounts up to an equimolar amount of base catalyst in order to act as a base scavenger at high temperatures and improve thermal stability of the cured composition as well as to provide improved adhesion. Non-limiting examples of tackifier resins that may be used include Poly-Pale™ (AN 155, RBSP 103° C.), Dymerex™ (AN 145, RBSP 144° C.), Foral™ AX-E (AN 165, RBSP 8° C.), Permalyn™ 6110 (AN 13, RBSP 103° C.), and Foralyn™ 90 (AN 8, RBSP 82° C.) (Eastman).

Any conventionally known wax which is suitable for use in formulating adhesives can be used in the practice of the invention. Suitable waxes can include, for example, microcrystalline wax, paraffin wax, waxes produced by Fischer-Tropsch processes, functionalized waxes (maleated, fumerated, silanated, or wax with functional groups etc.), polyolefin waxes, petroleum waxes, polypropylene waxes, polyethylene waxes, ethylene vinyl acetate waxes, and vegetable waxes.

Non-limiting examples of commercially available waxes that can be suitable for this invention include A-C™ 9 and A-C™ 810, available from Honeywell International Inc. Morristown, N.J., US; POLYWAX™ 400, 850, 1000, and 3000 from Baker Hughes Inc., Sugar Land, Tex., US; Licocene™ PE4201 from Clariant International LTD, Muttenz, Switzerland; Epolene™ N-15, Epolene™ C-10, Epolene™ C-17 and Epolene™ C-18 from Westlake Polymers, LLC, Houston, Tex., US; Sasolwax™ 3279 microcrystalline wax from Sasol Chemical Industries Limited, South Africa; and microcrystalline wax Be Square™ 195 (Baker Hughes).

In various embodiments, adhesives comprising the curable compositions useful in the inventions can comprise at least 1, 2, 5, 8, or 10 and/or not more than 40, 30, 25, 20, or 15 weight percent of at least one tackifier based on the total weight of the final composition equaling 100 weight %. Moreover, said adhesives can comprise in the range of 1 to 40, 5 to 30, 8 to 25, or 10 to 20 weight percent of at least one tackifier.

Furthermore, a functionalized wax can be used as adhesion promoters and may react with the curable composition, reducing the amount of material that may potentially migrate from the adhesive or coating. Suitable functionalized waxes include but are not limited to Honeywell A-C™ 596; Clariant Licocene™ MA6252 and Licocene™ MA6452; and Westlake Epolene™ E-43.

In one embodiment of this invention, there is provided a curable composition useful in the invention having initial green strength and cured bond strength wherein:
(a) Component (I) comprises at least two functional groups selected from the group consisting of β-ketoacetate and malonate functional groups;
(b) Component (H) comprises at least one curing agent having at least two aldehyde functional groups;
(c) The equivalent ratio of the acetoacetate (AcAc) functional group of Component (I) to the aldehyde functional group is from about 3 to 0.25, or from about 3 to 0.5, or from about 2.5 to 0.25, or from about 2.5 to 0.5, or from about 2.5 to 0.6, or from about 2 to 0.25, or from about 2 to 0.5, or from about 2 to 0.6, or from about 1.2 to about 0.8;
(d) Component (III) is at least one amine having primary and/or secondary, amine functionality, or combinations thereof;
(e) Component (IV) is at least one tackifier resin, wherein:
  a. the tackifier resin can be present in an amount from about 1 phr to about 70 phr, or from about 10 phr to about 60 phr, or from about 10 phr to about 25 phr, based on the total weight of Component (I), the resin; and,
  b. the tackifier resin can be selected from cycloaliphatic hydrocarbon resins, C5 hydrocarbon resins, C5/C9 hydrocarbon resins, aliphatic-aromatic hydrocarbon resins, aromatically modified C5 resins, C9 hydrocarbon resins, pure monomer resins, dicyclopentadiene resins, dicyclopentadiene based/containing resins, cyclopentadiene based/containing resins, rosin acid resins, esters of rosin, esters of modified rosins, liquid resins of fully or partially hydrogenated rosins, fully or partially hydrogenated rosin esters, fully or partially hydrogenated modified rosin resins, hydrogenated or partially hydrogenated rosin acid resins, fully or partially hydrogenated rosin alcohols, fully or partially hydrogenated C5 resins, fully or partially hydrogenated C5/C9 resins, fully or partially hydrogenated dicyclopentadiene resins, fully or partially hydrogenated modified dicyclopentadiene based/containing resins, fully or partially hydrogenated aromatically modified C5 resins, fully or partially hydrogenated C9 resins, fully or partially hydrogenated pure monomer resins, fully or partially hydrogenated C5/cycloaliphatic resins, fully or partially hydrogenated C5/cycloaliphatic/styrene/C9 resins, fully or partially hydrogenated cycloaliphatic resins, and/or combinations thereof; and
  c. wherein the 180-degree peel strength and/or T-peel strength of the composition is greater than when a tackifier resin or other adhesion promoter is not present in the same composition.

In one embodiment of the invention, there are provided compositions useful in this invention comprising adhesion promoters and/or green strength enhancers, for example, tackifiers, wherein the composition is cured.

In one embodiment of the invention, there are provided compositions useful in the invention wherein the 180-degree peel adhesion and/or T-peel strength of the composition is greater than when a tackifier resin or other adhesion promoter is not present in the same composition.

In one embodiment of the invention, there are provided compositions useful in the invention wherein the 180-degree peel adhesion and/or T-peel strength of the composition is at least 100 percent greater than when tackifier or other adhesion promoter is not present in the same composition.

In one embodiment of the invention, there are provided compositions useful in the invention wherein the tackifier resin can be present in an amount up to about 65 parts per hundred acetoacetylated polyester and/or polyether [Component (I)]; and wherein the 180-degree peel adhesion of the composition is greater than when tackifier or other adhesion promoter is not present.

In one embodiment of the invention, there are provided compositions useful in the invention wherein at least one additive to promote adhesion is first combined with (a) Component (I), Component (II), or Component (III); or (b) Component (I) and Component (II); or (c) Component (II) and Component (III); or (d) Component (I) and Component (III) or (e) any order of combination of Components (I)-(IV) can be used.

In various embodiments, the curable adhesive compositions can be applied in the range of about 0.5 gsm to about 200 gsm (gsm=grams per square meter). In embodiments where the curable composition will be used to bond substrates to each other, the add-on rate used will be suitable for generating assembly components, or laminates, or composites with the desired bond strength. The curable composition can be applied to one or both substrates before the substrates are brought into contact to form a composite, laminate or article. The article so formed may be optionally contacted with additional substrates, additional curable compositions, adhesives, and/or may be subjected to applied pressure and/or applied heat, in any order or combination without limitation.

A "solid" is defined herein as not a liquid or gas at room temperature and/or at application temperature and can include but is not limited to waxy and/or semi-crystalline materials.

In one embodiment of the invention, there is provided a process for maintaining the temperature of Components (I)-(III) of any of the compositions useful in the invention such that spontaneous polymerization is not induced until activation, e.g., thermal activation.

In one embodiment of the invention, there is provided a process for preparing and curing a reactive adhesive comprising preparing a composition useful in the invention for a reactive adhesive and applying heat from an external source at a temperature above or at ambient temperature to said composition, whereby polymerization is initiated.

In one embodiment of the invention, there is provided a process for forming a laminate structure or an assembly component, comprising the following steps: (1) forming an adhesive composition by combining the three Components of any of the compositions useful in the invention; and (2) applying the adhesive composition to a surface of a first substrate; thereby forming the laminate structure or the assembly component.

In one embodiment, an assembly component is provided comprising at least one substrate coated with at least one compositions useful in the invention.

In one embodiment, an assembly component is provided comprising at least two substrates wherein between said substrates is at least one of the compositions useful in the invention which has cured.

In one embodiment of the invention, the assembly component of the invention which can comprise a laminated structure or can be a laminated structure.

In one embodiment of the invention, there is provided any of the processes of the invention wherein at least one of the adhesive compositions useful in the invention is then cured, for example, at or near room temperature.

In one embodiment of the invention, there is provided a process wherein at least one composition useful in the invention can be applied to a first substrate or, optionally, can be applied to two or more substrates, wherein each substrate can be independently selected from the group consisting of a wood material, a metallic material, a plastic material, an elastomeric material, a composite material, a paper material, a fabric material, a glass material, a foamed material, a metal, a mesh material, a wood material, a particle board material, an oriented strand board (OSB) material, a leather material, a synthetic leather material, a vinyl material, poly(acrylonitrile butadiene styrene) (ABS), polypropylene (PP), glass filled PP, talc filled PP, impact-modified PP, polycarbonate (PC), PC-ABS, urethane elastomers, thermoplastic polyolefin (TPO) compounds, pigmented TPO compounds, filled TPO compounds, rubber-modified TPO compounds, a primed (painted) material, thus forming a laminate or an assembly component.

In one embodiment of this invention, there is provided a process for preparing an assembly component wherein at least one composition useful in the invention can be applied to a first substrate or, optionally, can be applied to two or more substrates wherein the first substrate and the second substrate can be each independently selected from the group consisting of poly(acrylonitrile butadiene styrene) (ABS); polycarbonate (PC); PC-ABS blends; thermoplastic polyolefins such as polypropylene (PP); textiles, e.g., fabric materials, mesh, wovens, and/or nonwovens; foam materials; leather materials; vinyl materials; and/or others that would be apparent to one of ordinary skill in the art. These materials can be used with or without fillers such as talc, glass, etc. as described herein.

In one embodiment of the invention, there is provided a process for preparing an assembly component wherein at least one adhesive composition useful in the invention can be applied to a first substrate and, optionally, can be applied to a second substrate and can be each independently selected from a polyester composite, a glass composite, or a wood-plastic composite.

In one embodiment of the invention, there is provided a process for preparing an assembly component wherein at least one composition useful in the invention can be applied to a first substrate or, optionally, can be applied to two or more substrates, wherein each substrate can be independently selected from the group consisting of cast polypropylene, metallized polypropylene, foil laminated polypropylene, polyethylene terephthalate (PET), metallized PET, foil laminated PET, oriented PET, biaxially oriented PET, extruded PET, low density polyethylene (LOPE), oriented polypropylene, biaxially oriented polypropylene (BOPP), nylon, ethylene vinyl alcohol, and extruded films.

In one embodiment, there is provided a process for preparing an assembly component comprising: (1) applying at least one of Components (I)-(III) of claim 1 on the surface of a first substrate, (2) applying the remaining component(s) of said Components (I)-(III) on the surface of a second substrate, and (3) combining said substrates and then curing said combined components, thus forming a cured composition In one embodiment, there is provided an assembly component comprising at least one composition useful in the invention and/or processed by any of the processes of the invention.

In one embodiment, there is provided an assembly component comprising at least one composition useful in the invention and further comprising one or more substrates or two or more substrates, e.g., flexible substrates, assembly part substrates, automobile interior substrates, woodworking substrates, furniture part substrates, etc. "Flexible substrate" is defined herein as a substrate that is less than 10 mil thick. "Flexible film substrate" or "flexible film" is defined herein as a substrate that can be less than 10 mil thick.

In one embodiment, there is provided an assembly component comprising at least two substrates wherein at least one composition useful in the invention is applied to the first substrate and wherein the second substrate can be contacted with said composition.

In one embodiment, there is provided an assembly component which is layered with multiple substrates wherein at least one composition useful in the invention is layered between at least two of said substrates.

In one embodiment, there is provided an assembly component comprising at least one composition useful in the invention which is a laminate structure.

In one embodiment, there is provided an assembly component wherein at least one composition useful in the invention is applied to at least one surface of a multi-laminated structure.

In one embodiment, there is provided an assembly component comprising at least one compositions useful in the invention selected from the group consisting of: an adhesive, a laminate or laminated part, a tape, a label, a tag, a radio frequency identification (RFD) tag, a coating, a sealant, a film (whether or not flexible), a foam, a potting compound, a disposable hygiene article, a polyester composite, a glass composite, a fiberglass reinforced plastic, a wood-plastic composite, an extruded compound, a polyacrylic blended compound, a potting compound, a rubber compound, a motor vehicle molded part, a motor vehicle extruded part, a motor vehicle laminated part, a furniture part, sheet molding compound (SMC), dough molding compound (DMC), textiles (e.g. fabric materials, mesh, wovens and/or nonwovens) and/or a film multilayer.

In one embodiment, the substrates in the assembly components of the invention can comprise at least one composition useful in the invention. These assembly components can be used in various articles of manufacture.

In one embodiment, there is provided a process for preparing a assembly component comprising: (1) applying at least one of Components (I)-(III) of the compositions useful in the invention on the surface of a first assembly component substrate, (2) applying the remaining component(s) of said Components (I)-(III) on the surface of a second assembly component substrate, and (3) combining said substrates and then curing said combined components, thus forming a cured composition.

In one embodiment, the articles of manufacture of the invention can be or can comprise assembly components or parts including but not limited to automobile parts, woodworking parts, and/or furniture parts comprising at least one composition useful in the invention.

In one embodiment, the assembly components of the invention can comprise an adhesive composition. The adhesive compositions useful in the invention can comprise any one of the compositions useful in the invention. In one embodiment, the adhesive compositions useful in the invention can be reactive adhesives. In one embodiment, the adhesive compositions useful in the invention can be curable or cured.

In one embodiment, any of the adhesive compositions useful in the invention can be applied to a substrate at any thickness known in the art for a particular application, for example, from about 0.5 microns to about 50 microns, or from about 0.5 microns to 5 microns.

In one embodiment, any of the adhesive compositions useful in the invention can be applied to a substrate at any thickness known in the art for a particular application, including but not limited to 50 to 200 microns or 50 to 150 microns or 75 to 125 microns, for example, for some assembly applications such as auto assembly or woodworking assembly.

The compositions useful in this invention can provide desirable properties for a variety of applications. In certain embodiments, the compositions useful in this invention are suitable for applications in the adhesives area, for example, automotive adhesives, structural adhesives, wood adhesives, and laminating adhesives, and applications in the coatings area, for example, automotive, industrial maintenance, marine craft, field-applied coatings, and furniture.

In one embodiment, any of the adhesive compositions useful in the invention can be selected from at least one of the following: automotive interior adhesive, flexible laminating adhesive, rigid laminating adhesive, assembly adhesive, labelling adhesive, nonwoven adhesive, tape adhesive, structural adhesive, hygiene nonwoven construction adhesive, hygiene elastic attachment adhesive, home repair adhesive, industrial adhesive, construction adhesive, furniture adhesive, medical adhesive, contact adhesive, hot melt adhesive, solvent-based adhesive, packaging adhesive, product assembly adhesive, woodworking adhesive, flooring adhesive, automotive assembly adhesive, structural adhesive, pressure sensitive adhesive (PSA), PSA tape, PSA label, PSA protective film, laminating adhesive, flexible film adhesive, hygiene core integrity adhesive, packaging adhesive, and hygiene core integrity adhesive.

In some embodiments, such as pressure sensitive adhesives, the curable compositions of the present invention can be characterized by adhesive strength by 180-degree peel test e.g. according to ISO 8510-2-2006 Part 2 at 5 mm/sec or PSTC-101, cohesive strength and/or temperature resistance by static shear hold power testing (room temperature or elevated temperature, e.g., 40° C. or 70° C.) by PSTC-107 and/or by shear adhesion failure temperature (SAFT) by PSTC-17.

In one embodiment, the assembly component of the invention can comprise a cured composition wherein the bond is maintained after cure and/or post-cure at or above about 23° C.; at or above about 60° C.; or at or above about 120° C.

In one embodiment of the invention, acrylates are not included within the compositions useful in the invention and/or adhesives made therefrom and/or articles of manufacture of the invention made therefrom.

Formulations based on such acetoacetylated compounds, e.g., polyesters and aldehyde compounds, are especially suitable for low-temperature curing adhesive applications without the use of isocyanates. Primary and secondary amines can offer options for improved thermal stability.

The compositions of the present invention may be prepared according to any suitable method, techniques and equipment. For example, the components of the composition may be blended in a mixer, an extruder, an aluminum can, and/or at the point of application, e.g. a head mixing system. In some cases, the components of the composition may be blended, optionally with a solvent, to form a mixture, which can then be cast onto a backing or other substrate and dried or partially cured to form an article comprising the curable composition.

Furthermore, the composition may be shaped into a desired form, such as a tape or sheet, by an appropriate technique including casting, extrusion, or roll coating techniques (gravure, reverse roll, etc.). Alternatively, the composition may be applied to a substrate using conventional adhesive application equipment recognized in the art, e.g. curtain coating, slot-die coating, wire-wound rod coating, gravure coating, roll coating, knife coating, hot or "warm" melt coating. The composition may be applied as either a continuous or discontinuous coating or film or layer or sprayed through different nozzle and/or head configurations at different speeds using typical application equipment. The application may be followed by drying or heat treatment.

After formulation, the curable adhesive included in the assembly component can be applied to a substrate and subsequently laminated to another substrate. Suitable substrates include but are not limited to textile, fabric, wood, particle board, oriented strand board (OSB), mesh, film, poly(acrylonitrile butadiene styrene) (ABS), polypropylene (PP), glass-filled PP, talc-filled PP, impact-modified PP, polycarbonate (PC), PC-ABS, biaxially oriented polypropylene (BOPP), thermoplastic polyolefin (TPO) compounds, pigmented TPO compounds, filled TPO compounds, rubber-modified TPO compounds, paper, glass, plastic, metal, PVC (polyvinyl chloride), PET (polyethylene terephthalate), modified PET such as PETG (PET modified with 1,4-cyclohexanedimethanol) and PCTG, Mylar™ plastic, aluminum, leather, synthetic leather, vinyl, nonwoven materials, foams, painted surfaces, printed surfaces, thermosets, thermoplastics, polymer films such as polyethylene, polypropylene, oriented polyethylene, oriented polypropylene; metallized plastic films; aluminum foil; wood; metals such as aluminum, steel or galvanized sheeting; glass; urethane elastomers; primed (painted) substrates, and laminates, blends or coated substrates comprising at least one of these materials. Any of these substrates may be untreated, corona treated, chemically treated, plasma treated, flame treated, rubber-modified, impact-modified, filled with e.g. talc or glass, pigmented with e.g. carbon black, chromium oxide or titanium oxide, or otherwise modified as known by those skilled in the art to provide improved properties to the substrate.

The curable adhesive can be coated onto a substrate using techniques known in the art, for example, by spraying, draw-down, roll-coating, brushing, nozzle dispensing, printing, etc. and subsequently laminated to another substrate manually or by a roll-to-roll laminating machine. The coating and laminating process may be done at room temperature or elevated temperatures. The laminated films may be cured at room temperature or elevated temperatures. In various embodiments, the curable mixture of the present invention can cure at 20° C. in various amounts of time. In one embodiment, the curable mixture of the present invention can cure at 20° C. or higher in six days or less.

In certain embodiments of the invention, the compositions useful in the invention can be prepared by a process comprising: (a) mixing at least one component having two or more β-ketoester functional groups, and at least one component having two or more aldehyde functional groups with at least one primary or secondary amine, and (b) after optional activation, curing the composition at 20° C. or higher, for example, in six days or less, and (c) optionally, post-curing the composition at or above 20° C.

In certain embodiments of the invention, the compositions useful in the invention can be prepared by a process comprising: (a) mixing at least one component having two or more β-ketoester functional groups, and at least one component having two or more aldehyde functional groups with at least one primary or secondary amine, and (b) after optional activation, curing the composition at or above 20° C., or above 35° C., or above 50° C., or above 55° C., or above 70° C., or above 80° C., or above 100° C., or from 20° C. to 130° C., or from 50° C. to 130° C., or from 50° C. to 80° C., in any time known to one of ordinary skill in the art, for example, in six days or less, and (c) optionally, post-curing the composition at or above 20° C., or above 35° C., or above 55° C., or above 70° C., or above 80° C., or above 100° C., or from 20° C. to 110° C., or from 50° C. to 110° C.

In some embodiments, the curable compositions useful in this invention can be cured at temperatures above 20° C., or above 35° C., or above 50° C. or above 55° C., or above 70° C., or above 80° C., or above 100° C., and can then be post-cured at a higher temperature(s) above 20° C., or above 35° C., or above 55° C., or above 70° C. or above 80° C., or above 100° C.

In some embodiments, the curable compositions useful in this invention can be partially cured before being applied to an assembly component substrate, used in a laminate, molded or otherwise incorporated into an article.

In some embodiments, the curable compositions useful in the present invention can be characterized by lap shear testing: ASTM 03163-01(2014) Standard Test Method for Determining Strength of Adhesively Bonded Rigid Plastic Lap-Shear Joints in Shear by Tension Loading. Impact strength can also be measured by any method known in the art, for example, by pendulum or ball drop impact tests.

In some embodiments, the curable compositions useful in the present invention can be characterized by tests such as DIN ISO 53357 Internal Adhesion, DIN ISO 55529 Sealed Seam Strength, DIN 53357 Bonding Adhesion, DIN 53504 Elongation at Tear and Tearing Tension, ASTM 01003 Transparency of film, ASTM D2578 Wetting Tension of Film Surface, ASTM F1249 Water Vapor Transmission Rate, and/or ASTM F2622 or D3985 Oxygen Transmission Rate The compositions useful in the invention can exhibit improved heat resistance and/or improved adhesion over time, particularly after heat aging, as evidenced by tests such as elevated temperature aging of the adhered articles comprising the compositions, followed by lap shear testing, by fiber tear testing, by peel testing, by peel adhesion failure temperature (PAFT) testing, by shear adhesion failure temperature (SAFT) testing, and/or by shear hold power testing at elevated temperatures such as 40° C., 60° C., 70° C., 85° C., 95° C., 105° C., 120° C. The adhered articles comprising the compositions useful in the invention can also exhibit improved humidity resistance as evidenced, for example, by aging at 95 to 100% relative humidity at 40° C. for 24 to 144 hours followed by any of the above listed adhesion and cohesion tests at room temperature and/or at elevated temperature.

In all embodiments of the invention, the primary and/or secondary amines useful in the invention can act as catalyst or activating agent.

Unpredictably, the compositions useful in this invention have a good combination of properties including but not limited to good thermal stability, the ability to cure and/or crosslink, good aging resistance, good cure rate, good green strength, good peel strength, and ability to adhere to various substrates.

The following examples further illustrate how the polyesters useful in the invention can be made and evaluated, and how the curable compositions useful in this invention can be made and evaluated and are intended to be purely exemplary of the invention and are not intended to limit the scope thereof. Unless indicated otherwise, parts are parts by weight, temperature is in degrees C. (Celsius) or is at room temperature, and pressure is at or near atmospheric.

EXAMPLES

Table 1 below provides the following abbreviations which apply throughout the working examples and specification:

TABLE 1

| Abbreviations, Substrates, and Coverstocks | |
|---|---|
| Aldehyde abbreviations: | |
| TPAL | Terephthalaldehyde |
| IPAL | Isophthalaldehyde |
| CHDAL | Paraloid Edge XL-195 (Dow) - mixture of 1,3- and 1,4-CHDAL |
| TCDDAL | Tricyclodecane dialdehyde |
| Curing agent amount is reported in equivalents (moles aldehyde functional groups to moles AcAc functional groups in the resin), e.g., 1.0 equiv means that there is one mole of aldehyde functional groups on the curing agent per mole AcAc functional groups in the resin. | |
| Amine abbreviations: | |
| MPMDA | 2-Methylpentamethylenediamine |
| TETA | Triethylenetetramine (mixture of isomers) |
| DMAPA | 3-Dimethylaminopropylamine |
| HMDA | 1,6-Hexanediamine (hexamethylenediamine) |
| TMSPA | 3-(Trimethoxysilyl)-propylamine |
| DBU | 2,3,4,6,7,8,9,10-Octahydropyrimido[1,2-a]azepine |
| DBN | 2,3,4,6,7,8-Hexahydropyrrolo[1,2-a]pyrimidine |
| TMG | 1,1,3,3-Tetramethylguanidine |
| Cyclam | 1,4,8,11-Tetraazacyclotetradecane |
| DOA | Dioctylamine |
| Amine amount is reported in parts per hundred resin (phr), e.g., 1.5 phr means 1.5 g amine per 100 g AcAc resin. | |
| Rigid substrates for 180 degree peel test: | |
| ABS - Magnum™ 3325 | Trinseo Magnum™ 3325 ABS, 0.125" thickness, from Standard Plaque Inc. (Melvindale, MI) |
| ABS - Magnum™ 3904 | Trinseo Magnum™ 3904 ABS, 0.125" thickness, from Standard Plaque Inc. (Melvindale, MI) |
| ABS - white | 1/16" thickness, part #52419751 from MSC Industrial Supply |
| ABS - Cyclolac™ | 0.125" thickness, from Standard Plaque Inc. (Melvindale, MI) |
| PP | Polypropylene (Dow Inspire C702-200), 0.125" thickness, from Standard Plaque Inc. (Melvindale, MI) |
| PC - Lexan™ | Lexan™ 141 polycarbonate, 0.125" thickness, from Standard Plaque Inc. (Melvindale, MI) |
| Coverstock for 180 degree peel test: | |
| CGT brown PVC | P1NEAC Longitude 704S obtained from CGT Limited (Cambridge, ON) |
| Blue marine vinyl | Marine vinyl fabric purchased from Jo-Ann Fabrics |
| Mueller 3-mesh fabric | Teflon-coated 3-mesh spacer fabric (T5977-0370-1480-01T1), obtained from Mueller Textiles |
| Substrates for lamination and T-peel test: | |
| PET1 | Polyethylene terephthalate, 1 mil (Mitsubishi), surface treated by supplier, used for hand laminations |
| PET2 | Polyethylene terephthalate, 1 mil (Neologic Solutions), corona treated prior to use, used for machine laminations |
| CPP1 | Cast polypropylene, 2 mil (Neologic Solutions), corona treated prior to use, used for hand and machine laminations |
| CPP2 | Cast polypropylene, 2 mil (Berry), corona treated prior to use, used for machine laminations |

TABLE 1-continued

| Abbreviations, Substrates, and Coverstocks | |
|---|---|
| PET-Al | Aluminum foil/PET laminate, 32 micron (Neologic solutions), corona treated prior to use, used for machine laminations |
| BOPP | Biaxially oriented polypropylene, 0.72 mil (Neologic solutions), corona treated prior to use, used for machine laminations |
| LDPE | Low density polyethylene, 3 mil (Berry), corona treated prior to use, used for machine laminations |
| Abbreviations for monomers used to make polyester resins: | |
| AD | Adipic acid |
| IPA | Isophthalic acid |
| TPA | Terephthalic acid |
| HHPA | Hexahydrophthalic anhydride |
| TMP | Trimethylolpropane |
| NPG | Neopentyl glycol |
| MPD | 2-Methyl-1,3-propanediol |
| HD | 1,6-Hexanediol |
| TMCD | 2,2,4,4-Tetramethyl-1,3-cyclobutanediol |
| PEG | Polyethylene glycol |
| BDO | 1,4-Butanediol |
| CHDM | 1,4-Cyclohexanedimethanol |

Experimental Procedures

Procedure for Determination of DHR Gel Time

Rheological properties of the composition were measured on a TA Instruments (New Castle, Del., USA) Discovery Hybrid Rheometer 3 (DHR) in a parallel plate geometry. The diameter of the disposable aluminum plates was 25 mm, and the gap was 1.0 mm. Temperature studies were run in auto-strain mode with the initial strain set at 5.0% and at a frequency of 2 rad/sec.

Curable compositions were prepared by adding 5.0 g of acetoacetylated resin to a vial and then adding the required amount of curing agent with stirring. The amine was then added with stirring, and the sample was placed in a Discovery Hybrid Rheometer 3 (DHR). Upon loading the sample onto the DHR, the spindle is brought down to geometry gap. The sample is trimmed, and the oven doors closed.

Methods of measuring gelation point herein can include but are not limited to: (1) Method DHR1: 20 minute hold at 25° C., 20 minute hold at 35° C., a temperature ramp at 1.75° C./min to 70° C. and a final temperature ramp at 5° C./min to 120° C.; (2) Method DHR2: 20 minute hold at 25° C., 20 min time hold at 35° C., a temperature ramp at 2.5° C./min to 85° C., and a temperature ramp at 3.5° C./min to 140° C.; (3) Method DHR3: 20 minute hold at 40° C. and a temperature ramp at 10° C./min to 140° C. over the next 10 mins; (4) Method DHR4: a 14 h hold at 50° C.; and (5) Method DHR5: logarithmic frequency sweep was done at 25° C. from 0.2 to 20.0 rad/sec with two points per decade, and the strain was set to 2.0%. Duration was a maximum of three hours. For the Examples herein, Method DHR5 was used to measure gelation point.

Any mixing or blending methods known in the art or described herein can be used.

Preparation of Solventless Compositions

Mixing Method 1 (MM1) (Premix resin and amine): In a small jar, the resin was mixed with the amine and stored for about 3 days. The resulting mixture remained a viscous material over the course of 3 days. Then the dialdehyde curing agent was mixed in.

Mixing Method 2 (MM2) (Add amine last): In a small jar, the resin (Component I) was mixed with the dialdehyde curing agent (Component (II)). In the event the curing agent was a solid at room temperature, e.g. terephthalaldehyde (TPAL), the resin/aldehyde mixture was heated to about 90° C. to melt and mix the aldehyde in with the resin. The mixture was then cooled to room temperature. The amine was then added. Some resins were very viscous or nearly solid at room temperature; these were heated (maximum about 90° C.) for mixing the composition and preparing samples.

Preparation of Laminates Consisting of Solid and Flexible Substrates for 180-Degree Peel Testing A 10 mil drawdown bar was used to form a film (target thickness: 4 mil) of the composition on solid substrates (1"×6"). A flexible coverstock was placed over the composition, and a 2-lb. handheld roller was rolled over the sample twice to laminate the sample. Unless otherwise noted, the samples were cured at ambient conditions for 7 days. Peel testing was done either after 7 days cure or after an additional 7 day post-cure at 80° C.

The samples were tested for 180-degree peel strength following ISO 8510-2-2006 Part 2 at 5 mm/s (12 inch/minute) crosshead displacement rate using either an MTS Criterion Universal Tensile Tester model C43-104E, 500 Newton load cell (MTS Systems Corporation, Eden Prairie, Minn., US) or an Instron Model 4201. A minimum of three samples of each composition were tested and the average and standard deviation reported.

Experimental Details for Tensile Testing

The composition was poured into a rectangular mold (about 6"×6") to a depth of ~2 mm. Unless otherwise noted, the sample was cured at ambient conditions for 7 days. The cured sheet of material was removed from the mold, and dogbones were cut from the sheet. One set of dogbones was tested and a second set of dogbones was placed in an oven for an additional 7 day post-cure at 80° C. and then tested.

Tensile testing of the dogbones was done according to ASTM 0638B type V at a rate of 5 in/min, using either an MTS Criterion Universal Tensile Tester model C43-104E, 500 Newton load cell (MTS Systems Corporation, Eden Prairie, Minn., US) or an Instron Model 4201. A minimum of three samples of each composition were tested and the average and standard deviation reported.

Experimental Details for Dynamic Mechanical Analysis (DMA) Testing

Samples were cut from the cured sheets made for tensile testing. DMA analysis was done using a Q-800, TA instruments. A temperature sweep was done, typically starting at −40° C. or lower and going to 120° C. or higher, at a ramp rate of 3° C./min. The tan delta peak temperature was taken as the glass transition temperature (Tg) of the material.

Experimental Details for Hand Lamination and T-Peel Testing (Solvent-Based Compositions)

Compositions were prepared in two different ways as follows:

Mixing method 3 (MM3) (Premix resin and amine): In a small jar, the resin, amine, and ethyl acetate were mixed and stored for 1 or more days. The curing agent (component (II)) was mixed in shortly before use.

Mixing method 4 (MM4) (Add amine last): In a small jar, the resin, ethyl acetate, curing agent, and amine were mixed together, with the amine catalyst added last.

Hand laminations were prepared as follows: The composition was coated onto the substrate using a TMI Automatic Drawdown Machine, Model KCC-101 and a Meyer rod #1. The coated substrate was placed in an oven at for 1 minute. The second film was then placed on top of the coated substrate, and the structure was laminated using a laminator (Scotch® TL906 Smart Thermal Laminator, Office Depot). The laminated film had a (dry) coat weight of ~1-2 gsm (grams per square meter).

T-peel testing was done according to ASTM F904-16 "Standard Test Method for Comparison of Bond Strength or Ply Adhesion of Similar Laminates Made from Flexible Materials" using an MTS Criterion Model 42, 100 Newton load cell. A minimum of three samples of each composition were tested and the average and standard deviation reported.

Experimental Details for Machine Lamination

Machine laminations were done using either a TecMaster™ R&D Coater/Laminator or a LabMaster™ Pilot Line, both from Faustel.

Using the TecMaster™, the curable composition was coated onto the first flexible film substrate with a 200 LPI/8.2 BCM gravure roll at a line speed of 2 ft/min. The coated film passed through a 3 ft dryer heated to 60° C. The coated film was laminated with the second film using an unheated nip roll.

Using the LabMaster™, the curable composition was coated onto the first flexible film substrate with a 120 LPI/15 BCM gravure coating roll at a line speed of 50 ft/min. The coated film passed through a 10 ft dryer heated to 175° F. The coated film was laminated to a second film using a laminating roll heated to 170° F. and under 87 psi of pressure.

Measurement of Viscosity/Pot Life with Zahn #2 Cup for Solvent-Based Compositions Using ASTM D4212 "Standard Test Method for Viscosity by Dip-Type Viscosity Cups".

The pot life of solvent-based compositions was measured by pouring 100-150 mL of the composition solution into a glass jar, and at various time intervals measuring the viscosity with a Zahn #2 cup following ASTM D4212. The time when the solution viscosity reaches 24.0 Zahn-seconds was set as the pot life of the solvent-based composition.

Procedure for Determination of Acetoacetate Number

In the Examples herein, analysis of the acetoacetate (AcAc) number of the resin employs a potentiometric titration method based on the titration of the proton in the AcAc group with a strong base, tetrabutylammonium hydroxide solution (TBAOH) in methanol. The titration was conducted on a titrator (904 Titrando, Metrohm AG, US) equipped with Tiamo™ software and a pH electrode (DG116-solvent, Mettler Toledo, US) as sensing probe. Depending on the expected AcAc number of the sample, 0.05 to 0.5 grams sample was weighed to a titration cell and stirred to dissolve in 35 mL pyridine at room temperature. The sample solution was titrated to the endpoint at pH around 16, which was determined by Tiamo™ software or manually. The AcAc number, reported as mg KOH/g sample, was calculated from the volume of TBAOH used at the titration endpoint, its normality, and weight of sample.

Example 1

Synthesis of Acetoacetate Functional Polyester 1 (AcAc Resin or Polyester 1)

Hydroxyl Functional Polyester 1:

A 2-L kettle with a four-neck lid was equipped with a mechanical stirrer, a thermocouple, a heated partial condenser (115° C.), a Dean-Stark trap, and a chilled condenser (15° C.). To the flask were charged neopentyl glycol (NPG) (255.9 g), 2-methyl-1,3-propanediol (MPD) (221.4 g), trimethylolpropane (TMP) (48.84 g), isophthalic acid (IPA) (348.9 g), adipic acid (AD) (306.9 g), and the acid catalyst, Fascat-4100 (Arkema Inc.) (1.31 g). The reaction was reacted under nitrogen at 170° C. for one hour, at 190° C. for one hour, and at 220° C. for about 3 hours to yield a clear, viscous mixture. A total of 148.8 g of the distillate was collected in the Dean-Stark trap. The resulting mixture was cooled to room temperature and subsequently collected (1005 g). Acid number: <1.0 mg KOH/g; hydroxyl number: 102.4 mg KOH/g; glass transition temperature (Tg): −25.1° C.; number average molecular weight (Mn): 1797 g/mole; weight average molecular weight (Mw): 3791 g/mole.

Acetoacetate Functional Polyester 1:

To a 500 mL, three-neck, round-bottom flask equipped with a mechanical stirrer, a heated partial condenser, a Dean-Stark trap, and a water condenser were added the above hydroxyl-functional polyester 1 (100.0 g) and t-butyl acetoacetate (28.16 g). The mixture was gradually heated and allowed to react at 120° C. for 20 minutes and at 140° C. for two hours. A total of 15.5 mL of the condensate (t-butanol) was collected in the Dean-Stark adapter. The resulting viscous resin was cooled and subsequently collected. Glass transition temperature (Tg): −28.5° C.; number average molecular weight (Mn): 1767 g/mole; weight average molecular weight (Mw): 3843 g/mole.

The resins in Examples 2-9 were prepared and tested as in Example 1 and the compositions and properties are as shown in Tables 2 and 3, respectively. The hydroxyl polyesters of Examples 2-9 were then acetoacetylated and tested as in Example 1 and the respective compositions and properties are as shown in Table 3.

TABLE 2

Compositions of Hydroxyl Functional Polyesters

| Ex. # | NPG (g) | MPD (g) | TMP (g) | Adipic Acid (g) | IPA (g) | Other Monomer | Other Monomer, (g) | Catalyst-n-butylstannoic acid (g) |
|---|---|---|---|---|---|---|---|---|
| 1 | 255.9 (2.46 moles) | 221.4 (2.46 moles) | 48.84 (0.36 moles) | 348.9 (2.39 moles) | 348.9 (2.10 moles) | 0 | 0 | 1.31 |
| 2 | 43.2 (0.41 moles) | 37.3 (0.41 moles) | 13.08 (0.10 moles) | 54.8 (0.37 moles) | 62.3 (0.37 moles) | 0 | 0 | 0.21 |
| 3 | 55.3 (0.53 moles) | 47.9 (0.53 moles) | 16.77 (0.12 moles) | 83.1 (0.57 moles) | 94.5 (0.57 moles) | 0 | 0 | 0.28 |
| 4 | 115.5 (1.11 moles) | 0 | 17.44 (0.13 moles) | 73.1 (0.50 moles) | 83.1 (0.50 moles) | 0 | 0 | 0.29 |
| 5 | 255.9 (2.46 moles) | 221.4 (2.46 moles) | 48.84 (0.36 moles) | 429.7 (2.94 moles) | 209.3 (1.26 moles) | 0 | 0 | 1.10 |
| 6 | 0 | 221.4 (2.46 moles) | 48.84 (0.36 moles) | 613.8 (4.20 moles) | 0 | 1,6-hexanediol | 290.4 (2.46 moles) | 0.84 |
| 7 | 246.1 (2.36 moles) | 212.9 (2.36 moles) | 46.96 (0.35 moles) | 548 (3.75 moles) | 0 | | | 0.29 |
| 8 | 246.1 (2.36 moles) | 0 | 46.96 (0.35 moles) | 548 (3.75 moles) | 0 | 1,6-hexanediol | 279.2 (2.36 moles) | 0.29 |
| 9 | 0 | 52.7 (0.58 moles) | 11.63 (0.09 moles) | 146.1 (1.00 moles) | 0 | PEG | 117 | 0.33 |

TABLE 3

Properties of Hydroxyl Polyesters of Table 2 and of Corresponding Subsequently Acetoacetyl-Functionalized Polyesters

| Ex. # | Hydroxyl Functional Polyester (g) | t-Butyl Acetoacetate (g) | Tg (° C.) | Mw | Mn | Acid # (mg KOH/g) | Hydroxyl # (mg KOH/g) | Ac-Ac # (mg KOH/g) |
|---|---|---|---|---|---|---|---|---|
| Hydroxyl Polyester of Ex. 1 | | | −25 | 3791 | 1797 | less than 1.0 | 102 | |
| Ac-Ac Polyester of Ex. 1 | 100.00 | 28.16 | −29 | 3843 | 1767 | | | 100 |
| Hydroxyl Polyester of Ex. 2 | | | −12 | 7816 | 2657 | less than 1.0 | | |
| Ac-Ac Polyester of Ex. 2 | 100.00 | 28.16 | −24 | 8077 | 2698 | | | 100 |
| Hydroxyl Polyester of Ex. 3 | | | −13 | 9724 | 2962 | 2.3 | | |
| Ac-Ac Polyester of Ex. 3 | 150.00 | 42.25 | −24 | 9938 | 2951 | | | 100 |
| Hydroxyl Polyester of Ex. 4 | | | −9 | 7808 | 2385 | 3.9 | | |
| Ac-Ac Polyester of Ex. 4 | 150.00 | 42.25 | −23 | 8125 | 2478 | | | 100 |
| Hydroxyl Polyester of Ex. 5 | | | −38 | 4048 | 1868 | less than 1.0 | 122 | |
| Ac-Ac Polyester of Ex. 5 | 100.00 | 28.16 | −42 | 4800 | 1922 | | | 100 |
| Hydroxyl Polyester of Ex. 6 | | | −67 | 4047 | 1865 | less than 1.0 | 129 | |
| Ac-Ac Polyester of Ex. 6 | 100.00 | 28.16 | −65 | 3933 | 1667 | less than 1.0 | | 86 |
| Hydroxyl Polyester of Ex. 7 | | | | | | 1.5 | | |
| Ac-Ac Polyester of Ex. 7 | 919* | 259.11 | −60 | 2588 | 1169 | | | 100 |
| Hydroxyl Polyester of Ex. 8 | | | | | | 1.9 | | |
| Ac-Ac Polyester of Ex. 8 | 989* | 277.80 | −65 | 3011 | 1404 | | | 100 |
| Hydroxyl Polyester of Ex. 9 | | | | | | | | |
| Ac-Ac Polyester of Ex. 9 | 292* | 82.18 | −55 | 4984 | 2017 | | | 100 |

*estimates from one pot syntheses

Example 10

Synthesis of Acetoacetate Functional Polyester 10 using Diketene (AcAc Resin or Polyester 10)

Hydroxyl Functional Polyester 10:

A 500 mL three-neck round-bottom flask was equipped with a mechanical stirrer, a thermocouple, a heated partial condenser (100° C.), a Dean-Stark trap, and a water condenser. Adipic acid (109.61 g), isophthalic acid (41.54 g), 2,2-dimethylpropane-1,3-diol (59.71 g), 2-methylpropane-1,3-diol (51.61 g), trimethylolpropane (27.24 g), and Fascat 4100 catalyst (0.29 g) were charged into the flask, which was then purged with nitrogen. The flask was heated under slow nitrogen sweep at 170° C. for 1 hour, 190° C. for 1 hour, 200° C. for 2.5 hour, 210° C. for about 0.75 hour to complete the reaction. The product was poured into a glass jar while it was still hot. The number average molecular weight Mn was 2000, and the weight average molecular weight Mw was 5000. The glass transition temperature Tg was −41° C. The hydroxyl value was 141 mg KOH/g, and the acid value was 0.5 mg KOH/g.

Acetoacetate Functional Resin or Polyester 10:

A 500 mL, three-neck, round-bottom flask was equipped with a magnetic stir bar, a condenser, a thermocouple. To the dry flask were added the polyol resin above (100.27 g, OH number 141 mg KOH/g), dichloromethane (200 mL) and N,N-dimethylaminopyridine (2.50 mg). After complete dissolution, diketene (22.9 g) was charged dropwise using a syringe, while keeping the internal temperature below 30° C. using a cold water bath. Once the addition was complete, the mixture was stirred at room temperature overnight then refluxed for 4 hours. Dichloromethane was stripped off and the resulting viscous liquid dried under high vacuum. Glass transition temperature (Tg): −45° C.; number average molecular weight (Mn): 1962; weight average molecular weight (Mw): 5301. The hydroxyl value was 1 mg KOH/g, and the acid value was 0.3 mg KOH/g. AcAc number was determined to be 120 mg KOH/g.

Example 11

Synthesis of Triacetoacetate Adduct of Trimethylolpropane (TMP TriAcAc)

A 500 mL three-neck round-bottom flask was equipped with a mechanical stirrer, a thermocouple, a heated partial condenser (105° C.), a Dean-Stark trap, and a water condenser. To the flask were charged trimethylolpropane (50.0 g), t-butyl acetoacetate (167.8 g), and the catalyst, Fascat 4100 (022 g). The mixture was heated and allowed to react at 120° C. for 20 minutes and then at 140° C. for two hours. A total of 103 mL of the condensate (t-butanol) was collected in the Dean-Stark adapter. The resulting mixture was cooled and the liquid product (TMP TriAcAc) collected.

Example 12

Synthesis of Acetoacetate Functional Resin or Polyester 12

Hydroxyl Functional Polyester 12:

A 2-L kettle with a four-neck lid was equipped with a mechanical stirrer, a thermocouple, a heated partial condenser (115° C.), a Dean-Stark trap, and a chilled condenser (15° C.). To the flask were charged neopentyl glycol (NPG) (178.6 g), 2-methyl-1,3-propanediol (MPD) (154.6 g), trimethylolpropane (TMP) (131.5 g), adipic acid (AD) (511.5 g), and the acid catalyst, Fascat-4100 (Arkema Inc.) (0.98 g). The reaction was reacted under nitrogen at 170° C. for one hour, at 200° C. for one hour, and at 230° C. for about 3 hours to yield a clear, viscous mixture. A total of 126 g of the distillate was collected in the Dean-Stark trap. The resulting mixture was cooled to 120° C. for the reaction with t-butyl acetoacetate below. Acid number: <1.0 mg KOH/g; hydroxyl number: 165.5 mg KOH/g; glass transition temperature (Tg): −49.6° C.; number average molecular weight (Mn): 2050 g/mole; weight average molecular weight (Mw): 5921 g/mole.

Acetoacetate Functional Resin or Polyester 12:

To the above Hydroxyl-Functional Polyester 1 (850 g) was added t-butyl acetoacetate (359 g). The mixture was gradually heated and allowed to react at 120° C. for 20 minutes and at 140° C. for two hours. A total of 144 g of the condensate (t-butanol) was collected in the Dean-Stark adapter. The resulting viscous resin was cooled and subsequently collected. Glass transition temperature (Tg): −50.9° C.; number average molecular weight (Mn): 1873 g/mole; weight average molecular weight (Mw): 6004 g/mole; AcAc number 124 mgKOH/g.

Example 13

Synthesis of Acetoacetate Functional Resin or Polyester 13

Hydroxyl Functional Polyester 13:

A 2-L kettle with a four-neck lid was equipped with a mechanical stirrer, a thermocouple, a heated partial condenser (115° C.), a Dean-Stark trap, and a chilled condenser (15° C.). To the flask were charged neopentyl glycol (NPG) (178.6 g), 2-methyl-1,3-propanediol (MPD) (154.6 g), trimethylolpropane (TMP) (131.5 g), isophthalic acid (IPA) (290.7 g), adipic acid (AD) (255.7 g), and the acid catalyst, Fascat-4100 (Arkema Inc.) (1.01 g). The reaction was reacted under nitrogen at 170° C. for one hour, at 200° C. for one hour, and at 230° C. for about 3 hours to yield a clear, viscous mixture. A total of 126 g of the distillate was collected in the Dean-Stark trap. The resulting mixture was cooled to 120° C. for the reaction with t-butyl acetoacetate below. Acid number: <1.0 mg KOH/g; hydroxyl number: 148.5 mg KOH/g; glass transition temperature (Tg): −17.5° C.; number average molecular weight (Mn): 1916 g/mole; weight average molecular weight (Mw): 5972 g/mole.

Acetoacetate Functional Resin or Polyester 13:

To the above hydroxyl-functional polyester 2 (886 g) was added t-butyl acetoacetate (374 g). The mixture was gradually heated and allowed to react at 120° C. for 20 minutes and at 140° C. for two hours. A total of 157 g of the condensate (t-butanol) was collected in the Dean-Stark adapter. The resulting viscous resin was cooled and subsequently collected. Glass transition temperature (Tg): −32.6° C.; number average molecular weight (Mn): 2003 g/mole; weight average molecular weight (Mw): 6390 g/mole; AcAc number 123 mgKOH/g.

The resins in Examples 14-38 were prepared and tested as in Examples 12 and 13 and the respective compositions and properties are as shown in Tables 4 and 5. The resins in Example 14-38 were then acetoacetylated and tested as in Examples 12 and 13 and the respective compositions and properties are as shown in Tables 4 and 5.

TABLE 4

Resins 12-38.

| Resin # | Diacid (equivalent %) | | | Diol/triol (equivalent %) | | | | | | | OH/COOH ratio |
|---|---|---|---|---|---|---|---|---|---|---|---|
| | AD | IPA | Other diacid | NPG | MPD | HD | TMCD | CHDM | Other diol | TMP | |
| 12 | 100 | 0 | 0 | 35 | 35 | 0 | 0 | 0 | 0 | 30 | 1.4 |
| 13 | 50 | 50 | 0 | 35 | 35 | 0 | 0 | 0 | 0 | 30 | 1.4 |
| 14 | 100 | 0 | 0 | 0 | 70 | 0 | 0 | 0 | 0 | 30 | 1.4 |
| 15 | 50 | 50 | 0 | 0 | 70 | 0 | 0 | 0 | 0 | 30 | 1.4 |
| 16 | 100 | 0 | 0 | 0 | 0 | 85 | 0 | 0 | 0 | 15 | 1.3 |
| 17 | 100 | 0 | 0 | 0 | 0 | 75 | 0 | 0 | 0 | 25 | 1.38 |
| 18 | 100 | 0 | 0 | 0 | 0 | 82 | 0 | 0 | 0 | 18 | 1.35 |
| 19 | 100 | 0 | 0 | 0 | 0 | 84 | 0 | 0 | 0 | 16 | 1.35 |
| 20 | 100 | 0 | 0 | 0 | 0 | 0 | 0 | 80 | 0 | 20 | 1.39 |
| 21 | 100 | 0 | 0 | 43 | 43 | 0 | 0 | 0 | 0 | 14 | 1.35 |
| 22 | 100 | 0 | 0 | 0 | 0 | 39 | 0 | 39 | 0 | 22 | 1.4 |
| 23 | 100 | 0 | 0 | 0 | 0 | 0 | 0 | 20 | 60 (BDO) | 20 | 1.36 |
| 24 | 90 | 0 | 10 (TPA) | 0 | 0 | 80 | 0 | 0 | 0 | 20 | 1.39 |
| 25 | 100 | 0 | 0 | 0 | 0 | 15 | 0 | 65 | 0 | 20 | 1.42 |
| 26 | 100 | 0 | 0 | 0 | 0 | 5 | 0 | 75 | 0 | 20 | 1.43 |
| 27 | 100 | 0 | 0 | 0 | 5 | 0 | 0 | 75 | 0 | 20 | 1.43 |
| 28 | 100 | 0 | 0 | 0 | 45 | 45 | 0 | 0 | 0 | 10 | 1.3 |
| 29 | 75 | 25 | 0 | 0 | 79 | 0 | 0 | 0 | 0 | 21 | 1.4 |
| 30 | 50 | 50 | 0 | 0 | 86 | 0 | 0 | 0 | 0 | 14 | 1.36 |
| 31 | 75 | 25 | 0 | 39.5 | 39.5 | 0 | 0 | 0 | 0 | 21 | |
| 32 | 100 | 0 | 0 | 0 | 80 | 0 | 0 | 0 | 0 | 20 | 1.34 |
| 33 | 100 | 0 | 0 | 0 | 90 | 0 | 0 | 0 | 0 | 10 | 1.16 |
| 34 | 0 | 0 | 100 (HHPA) | 42 | 0 | 0 | 42 | 0 | 0 | 15 | 1.41 |
| 35 | 50 | 50 | 0 | 0 | 39 | 0 | 0 | 39 | 0 | 22 | 1.42 |
| 36 | 50 | 50 | 0 | 0 | 39 | 0 | 39 | 0 | 0 | 22 | 1.4 |
| 37 | 75 | 25 | 0 | 0 | 39 | 0 | 39 | 0 | 0 | 22 | 1.39 |
| 38 | 0 | 100 | 0 | 0 | 0 | 0 | 0 | 0 | 81 (DEG) | 19 | 1.36 |

TABLE 5

Properties of Hydroxyl Polyesters of Table 4 and Subsequently Acetoacetyl-Functionalized Polyesters.

| Resin # | Polyester polyol | | | | AcAc polyester | | | | | Viscosity @ 60° C. (cP) |
|---|---|---|---|---|---|---|---|---|---|---|
| | AN (mg KOH/g) | OHN (mg KOH/g) | Tg (° C.) | Mn (g/mol) | OHN (mg KOH/g) | AcAc# (mg KOH/g) | Tg (° C.) | Mn (g/mol) | Tm (° C.) | |
| 12 | <1.0 | 166 | −50 | 2050 | — | 124 | −51 | 1873 | — | — |
| 13 | <1.0 | 149 | −18 | 1916 | — | 123 | −33 | 2003 | — | 5058 |
| 14 | <1.0 | 180 | −53 | 2076 | — | 126 | −54 | 1842 | — | 595 |
| 15 | — | — | −20 | 1923 | — | 126 | −34 | 1995 | — | — |
| 16 | — | — | — | — | — | 91 | −69, −35 | 1877 | 33 | — |
| 17 | <0.5 | 157 | −58 | 2014 | 3 | 129 | −63 | 2234 | 17 | 585 |
| 18 | — | 150 | — | — | 4 | 118 | −65 | 1664 | 14, 25 | 470 |
| 19 | — | 150 | — | — | 3 | 118 | −67 | 1917 | 15, 26 | 430 |
| 20 | <0.5 | 150 | — | — | 6 | 121 | −40 | 2026 | 55, 70 | — |
| 21 | <0.5 | 165 | — | — | 5 | 125 | −57 | 1739 | — | 520 |
| 22 | <0.5 | 165 | — | — | 6 | 120 | −53 | 1930 | — | 860 |
| 23 | <0.5 | 165 | — | — | 5 | 134 | −55 | 1954 | — | 815 |
| 24 | <0.5 | 165 | — | — | 8 | 128 | −60 | 2103 | 2, 15 | 650 |
| 25 | <0.5 | 165 | — | — | 17 | 124 | −45 | 1935 | 45 | 2610 |
| 26 | <0.5 | 165 | — | — | 30 | 124 | −45 | 1868 | 52, 71 | — |
| 27 | <0.5 | 165 | — | — | 28 | 125 | −44 | 1880 | 47, 62 | — |
| 28 | <1.0 | 112 | −22 | 2003 | — | 91 | −33 | 1958 | — | — |
| 29 | <0.5 | 185 | — | — | 7 | 139 | −45 | 1804 | — | 1215 |
| 30 | 0.5 | 165 | — | — | 4 | 128 | −39 | 1821 | — | 2400 |
| 31 | — | 174 | −40 | 1463 | — | 137 | −46 | 1586 | — | — |
| 32 | <0.5 | 165 | — | — | 7 | 127 | −52 | 1947 | — | 710 |
| 33 | 0.9 | 84 | — | — | 1 | 68 | −54 | 3499 | — | 5541 |
| 34 | — | — | — | — | — | 100 | −1 | 1479 | — | 95,600 |
| 35 | <0.5 | 170 | — | — | 4 | 129 | −32 | 1995 | — | 7190 |
| 36 | <0.5 | 165 | — | — | 5 | 128 | −30 | 2081 | — | 8800 |
| 37 | <0.5 | 165 | — | — | 6 | 130 | −39 | 1861 | — | 1905 |
| 38 | 1 | 150 | — | — | — | 115 | −20 | 2227 | — | 13,520 |

Example 39

Synthesis of Acetoacetate Functional Polyether Resin 39

A 4-neck, 250 mL round bottom flask was equipped with magnetic stirring, a thermocouple and a short-path distillation apparatus with a chilled condenser (22° C.). To the flask was charged Voranol™ 230-112 (100 g) (Dow Chemical, USA) and t-butyl acetoacetate (31.6 g). The mixture was heated to 130° C. and t-butanol (18 mL theoretical) was removed at a head temperature of ca. 50° C. When the head temperature dropped and removal of t-butanol slowed, the temperature was increased to 145° C. and held for 1 hour. The reaction mixture was cooled to 85° C. and vacuum was applied (125 torr). The vacuum was slowly reduced to 3 torr over the course of several hours. The resulting viscous resin was cooled and subsequently collected. Glass transition temperature (Tg): −65° C.; acetoacetate number: 83 mg KOH/g; number average molecular weight (Mn): 2206 g/mole; weight average molecular weight (Mw): 2535 g/mole.

Example 40

Synthesis of Acetoacetate Functional Polyether Resin 40

In a manner similar to Example 39, Example 40 was prepared using Voranol™ 230-238 (100 g) (Dow Chemical, USA) and t-butyl acetoacetate (68.8 g). Glass transition temperature (Tg): −61° C.; acetoacetate number: 171 mg KOH/g; number average molecular weight (Mn): 1145 g/mole; weight average molecular weight (Mw): 1177 g/mole.

Example 41

Synthesis of Acetoacetate Functional Polyether Resin 41

In a manner similar to Example 39, Example 41 was prepared using Voranol™ 240-360 (100 g) (Dow Chemical, USA) and t-butyl acetoacetate (101.1 g). Glass transition temperature (Tg): −50° C.; acetoacetate number: 224 mg KOH/g; number average molecular weight (Mn): 1328 g/mole; weight average molecular weight (Mw): 1634 g/mole.

Examples 42-69

Peel Strength of Acetoacetyl-Functionalized Polyester Resins vs. Polyurethanes Laminates with about 4 mil of curable composition were prepared as previously described using ABS-Magnum™ 3325 substrate and COT brown PVC coverstock and inventive compositions as described in Table 6. The inventive AcAc-polyester/curing agent composition not only unexpectedly cured using primary and/or secondary amines; the maximum peel strength of these non-optimized compositions after a seven day room temperature (RT) cure was an unanticipated 55 N/25 mm (Example 43), which is more than 100% greater than the values obtained with polyurethanes in Comparative Examples 1 and 2 prepared using a polyol equivalent to hydroxyl Resin 12 before adding AcAc functionality, and crosslinked with either methylene diphenyl diisocyanate (MDI) or hexamethylene diisocyanate (HDI) using dibutyltin dilaurate (DBTDL) catalyst. The peel strength of Example 43 was unchanged after heat aging at 80° C. for 7 days, indicating excellent thermal stability of the inventive composition.

Peel strength was measured following ISO 8510-2-2006 Part 2 at 5 mm/sec. Failure mode is indicated by "A" for adhesive failure, by "C" for cohesive failure, and "SF" for substrate failure. If the failure mode was mixed, the primary failure mode is given first with the secondary mode given after the primary mode, e.g. A(C) for adhesive failure with some cohesive failure.

TABLE 6

Peel strength of inventive compositions with ABS-Magnum™ 3325 substrate and CGT coverstock and cured under different conditions, compared to polyurethane and to AcAc resin composition catalyzed with tertiary amine DBU. All inventive compositions were prepared using Mixing Method 2.

| Ex. # | Resin | Curing agent | Amine or Catalyst | Cure | After 7 day RT cure | | After 7 day RT cure + 7 days at 80° C. | |
|---|---|---|---|---|---|---|---|---|
| | | | | | Peel strength (N/25 mm) | failure mode | Peel strength (N/25 mm) | failure mode |
| Comparative Example 1 | Polyurethane-Hydroxyl Resin 12 + MDI (1.0 equiv) + DBTDL catalyst (0.02%) | | | RT 7 day | 22 (3) | A | 25 (6) | A |
| Comparative Example 2 | Polyurethane-Hydroxyl Resin 12 + HDI (1.0 equiv) + DBTDL catalyst (0.02%) | | | RT 7 day | 7 (1) | A | 4 (1) | A(C) |
| Comparative Example 3 | Resin 12 | CHDAL 1.0 equiv | DBU 1.5 phr | RT 7 day | 15 (2) | A(C) | 12 (7) | A |
| Example 42 | Resin 16 | TPAL 1.0 equiv | MPMDA 1.5 phr | RT 7 day | 4 (2) | A | 3 (2) | A(C) |
| Example 43 | Resin 28 | CHDAL 1.0 equiv | MPMDA 1.0 phr | RT 7 day | 55 (6) | C | 53 (5) | C |
| Example 44 | Resin 28 | TPAL 1.0 equiv | TETA 1.0 phr | RT 7 day | 40 (3) | A(C) | 35 (4) | A(C) |
| Example 45 | Resin 12 | CHDAL 1.0 equiv | MPMDA 1.5 phr | RT 7 day | 14 (2) | C | 21 (2) | C |
| Example 46 | Resin 12 | CHDAL 1.0 equiv | TETA 1.5 phr | RT 7 day | 2.1 (0.3) | C | 5 (1) | A |

TABLE 6-continued

Peel strength of inventive compositions with ABS-Magnum™ 3325 substrate and CGT coverstock and cured under different conditions, compared to polyurethane and to AcAc resin composition catalyzed with tertiary amine DBU. All inventive compositions were prepared using Mixing Method 2.

| Ex. # | Resin | Curing agent | Amine or Catalyst | Cure | After 7 day RT cure Peel strength (N/25 mm) | failure mode | After 7 day RT cure + 7 days at 80° C. Peel strength (N/25 mm) | failure mode |
|---|---|---|---|---|---|---|---|---|
| Example 47 | Resin 12 | TCDDAL 1.0 equiv | MPMDA 1.5 phr | RT 7 day | 18 (2) | A | 21 (1) | A |
| Example 48 | Resin 12 | TCDDAL 1.0 equiv | Morpholine 1.5 phr | RT 7 day | 14 (3) | C | 7 (4) | C |
| Example 49 | Resin 12 | TCDDAL 1.0 equiv | TETA 1.5 phr | RT 7 day | 2 (1) | A | 6 (3) | A |
| Example 50 | Resin 12 | TPAL 1.0 equiv | MPMDA 1.5 phr | RT 7 day | 9 (1) | C | 9 (2) | A |
| Example 51 | Resin 12 | TPAL 1.0 equiv | Morpholine 1.5 phr | RT 7 day | 5 (1) | C | 19 (4) | A(C) |
| Example 52 | Resin 12 | TPAL 1.0 equiv | TETA 1.5 phr | RT 7 day | 15 (1) | C | 14 (1) | A |
| Example 53 | Resin 12/Resin 28 (50:50 blend) | CHDAL 1.0 equiv | MPMDA 1.0 phr | RT 7 day | 29 (1) | C | 33 (8) | C |
| Example 54 | Resin 12/Resin 28 (50:50 blend) | TPAL 1.0 equiv | TETA 1.0 phr | RT 7 day | 30 (8) | A(C) | 20 (2) | A(C) |
| Example 55 | Resin 30 | CHDAL 1.0 equiv | MPMDA 1.0 phr | RT 7 day | 33 (4) | C | 31 (3) | C(A) |
| Example 56 | Resin 30 | TPAL 1.0 equiv | TETA 1.0 phr | RT 7 day | 39 (4) | A(C) | 19 (3) | A |
| Example 57 | Resin 21 | TPAL 1.0 equiv | TETA 1.5 phr | RT 7 day | 26 (2) | C(A) | 14 (2) | C(A) |
| Example 58- | Resin 29 | CHDAL 1.0 equiv | MPMDA 1.5 phr | RT 7 day | 20 (2) | A | 24 (2) | C(A) |
| Example 59 | Resin 15/Resin 12 (75:25 blend) | CHDAL 1.0 equiv | dioctylamine 2.0 phr | RT 7 day | 30.6 (0.6) | C(A) | 19 (3) | A(C) |
| Example 60 | Resin 13 | CHDAL 1.0 equiv | MPMDA 1.0 phr | 75° C. 60 min, RT 7 day | 27 (2) | C(A) | NA | NA |
| Example 61 | Resin 16 | TPAL 1.0 equiv | MPMDA 1.5 phr | 70° C. 10 min, RT 7 day | 15 (9) | C | 1.4 (0.4) | C |
| Example 62 | Resin 23 | TPAL 1.0 equiv | MPMDA 1.5 phr | 70° C. 10 min, RT 7 day | 9 (1) | A | 19 (2) | A(C) |
| Example 63 | Resin 24 | TPAL 1.0 equiv | MPMDA 1.5 phr | 70° C. 10 min, RT 7 day | 11 (1) | A(C) | 20 (3) | A(C) |
| Example 64 | Resin 25 | TPAL 1.0 equiv | MPMDA 1.5 phr | 70° C. 10 min, RT 7 day | 25 (1) | A(C) | 24 (2) | A |
| Example 65 | Resin 26 | TPAL 1.0 equiv | MPMDA 1.5 phr | 70° C. 10 min, RT 7 day | 25 (1) | A(C) | 24 (2) | A |
| Example 66 | Resin 27 | TPAL 1.0 equiv | MPMDA 1.5 phr | 70° C. 10 min, RT 7 day | 27 (4) | A(C) | 23 (2) | A |
| Example 67 | Resin 17 | TPAL 1.0 equiv | MPMDA 1.5 phr | 70° C. 10 min, RT 7 day | NA | NA | 18 (7) | A(C) |
| Example 68 | Resin 19 | TPAL 1.0 equiv | MPMDA 1.5 phr | 70° C. 10 min, RT 7 day | 9 (3) | C | 4 (2) | C |
| Example 69 | Resin 20 | TPAL 1.0 equiv | MPMDA 1.5 phr | 70° C. 10 min, RT 7 day | 26 (3) | C | 28 (2) | C |

Examples 70-77

Balance of Adhesion to Mueller 3-Mesh Fabric and Thermal Resistance Using Combination of Curing Agent and Amine Laminates were prepared as previously described using ABS-Magnum™ 3325 and Mueller 3-mesh fabric and inventive curable compositions using AcAc Resin 12, curing agent, and amine as described in Table 7. The peel strength of the inventive laminates after a seven day RT cure varied from about 7 to about 19 N/25 mm, with primarily cohesive failures. After an additional seven days at 80° C. the peel strength varied from about 6 to about 21 N/25 mm. Unpredictably, these ranges of peel values are comparable to the range obtained with the same hydroxyl resin cured with different isocyanates to form polyurethane adhesives. This indicates that the level of adhesion to a substrate and the level of thermal resistance of the inventive compositions are commercially significant, and these properties can be selected and balanced as desired by the choice of curable composition and cure conditions. Comparison of Comparative Example 6 using the tertiary amine DBU to the inventive curable composition Example 71 shows the inventive composition increases in peel strength with exposure to heat while Comparative Example 6 with DBU has a 34% decrease in peel strength.

TABLE 7

Balance of adhesion and thermal resistance using varied combinations of curing agent and amine compared to polyurethane using the hydroxyl resin used to prepare the AcAc resin. Laminates prepared using Mueller 3-mesh fabric coverstock and ABS-Magnum™ 3325 substrate.

| | | | | After 7 day RT cure | | | After 7 day RT cure + 7 days at 80° C. | | |
|---|---|---|---|---|---|---|---|---|---|
| Ex. # | Resin # | Curing agent or isocyanate at 1.0 equivalent | Amine (1.5 phr) or Catalyst | Peel strength (N/25 mm) | SD | failure mode | Peel strength (N/25 mm) | SD | failure mode |
| Example 70 | Resin 12 | CHDAL | MPMDA | 11.6 | 0.8 | C | n.d. | n.d. | n.d. |
| Example 71 | Resin 12 | CHDAL | TETA | 6.9 | 0.4 | C | 8 | 1 | A |
| Example 72 | Resin 12 | TCDDAL | MPMDA | 7 | 2 | A | 21 | 3 | A |
| Example 73 | Resin 12 | TCDDAL | Morpholine | 19 | 2 | A(C) | 15 | 3 | C |
| Example 74 | Resin 12 | TCDDAL | TETA | 12 | 2 | A | 6 | 2 | A |
| Example 75 | Resin 12 | TPAL | MPMDA | 14 | 2 | A(C) | 16 | 7 | A |
| Example 76 | Resin 12 | TPAL | Morpholine | 15 | 5 | A(C) | 10 | 2 | C |
| Example 77 | Resin 12 | TPAL | TETA | 11 | 2 | C | 14 | 11 | A |
| Comparative Example 4 | Hydroxyl Resin 12 | MDI | DBDTL 0.02% | 19 | 2 | A | 29 | 8 | A |
| Comparative Example 5 | Hydroxyl Resin 12 | HDI | DBDTL 0.02% | 8 | 2 | A(C) | 5.0 | 0.4 | A |
| Comparative Example 6 | Resin 12 | CHDAL | DBU | 8.7 | 0.9 | C | 6 | 1 | A |

Examples 78-80

Blending Polyesters to Achieved Desired Properties

Equal parts of AcAc Resin 12 and AcAc Resin 28 were combined with curing agent and amine as described in Table 8 and used to prepare laminates with ABS-Magnum™ 3325 and CGT brown PVC. Peel values obtained after curing at ambient temperature and after additional thermal exposure were unexpectedly close to the mean of the individual compositions instead of being dominated by the properties of one composition.

TABLE 8

Examples of blending AcAc-polyesters and choice of curing agents to achieve intermediate adhesion properties. Peel samples were made using Magnum™ 3325 ABS and CGT brown PVC coverstock, with a thickness ~4 mil. All compositions were prepared using Mixing Method 2.

| | | | | After 7 day RT cure | | After 7 day RT cure + 7 days at 80° C. | | Bulk Properties After 7 day RT cure | | | |
|---|---|---|---|---|---|---|---|---|---|---|---|
| Ex. # | Resin | Curing agent (1.0 equiv) | Amine | Peel strength (N/25 mm) | failure mode | Peel strength (N/25 mm) | failure mode | % elongation at break | tensile strength (MPa) | Peak Young's modulus (MPa) | Tg (° C.) |
| 78 | Resin 12 | TPAL | TETA 1.5 phr | 15 (1) | C | 14 (1) | A | 63 (12) | 1.7 (0.2) | 3.4 (0.3) | 13 |
| 79 | Resin 12/ Resin 28 (50:50 blend) | TPAL | TETA 1.0 phr | 30 (8) | C(A) | 20 (2) | C(A) | 125 (27) | 2.1 (0.5) | 2.0 (0.1) | 14 |
| 80 | Resin 28 | TPAL | TETA 1.0 phr | 40 (3) | C(A) | 35 (4) | C(A) | 369 (65) | 2.1 (0.9) | 0.78 (0.06) | 27 |

Examples 81-85

Adhesion to Different Substrates Using CGT Brown Coverstock

The composition Resin 13, CHDAL (1.0 equivalent), and MPMDA (1.0 phr) was used to laminate COT brown coverstock to a variety of untreated substrates. The laminates were cured at 75° C. for 60 minutes and post-cured at RT for seven days, and the 180-degree peel force measured (Table 9). The peel force range of 0.3 to 108 N/25 mm shows the unexpected potential to obtain the desired level of adhesion to a chosen substrate by selection of AcAc-polyester(s), curing agent(s), and amine(s).

TABLE 9

Examples of adhesion between CGT brown coverstock and different substrates using the same curable composition: Resin 13, CHDAL 1.0 equivalent and MPMDA at 1.0 phr using Mixing Method 2.

| Ex. # | Substrate | Cure condition | Peel strength (N/25 mm) | failure mode |
|---|---|---|---|---|
| 81 | ABS - Magnum ™ 3325 | 75° C. 60 min, RT 7 day | 27 (2) | C(A) |
| 82 | ABS - Cyclolac ™ | 75° C. 60 min, RT 7 day | 34 (6) | C(A + SF) |
| 83 | ABS - white | 75° C. 60 min, RT 7 day | 80 (5) | C(SF) |
| 84 | Polypropylene | 75° C. 60 min, RT 7 day | 0.3 (0.3) | A |
| 85 | PC - Lexan ™ | 75° C. 60 min, RT 7 day | 108 (8) | C(SF + A) |

Examples 86-93

Effect of Amine Level, Choice of Amine, Choice of Curing Agent and Choice of Acetoacetylated Polyester Resins on Thermal Stability and Balance of Properties Table 10 below illustrates the unexpected complexity of interactions between the acetoacetylated Component (I), curing agent Component (II), amine Component (III), and amine addition level on the adhesion results and thermal resistance of the adhesive bond.

Comparing Example 86 and Example 87, higher amine level (1.5 phr) gave a lower peel value with RT cure that was thermally resistant, yet the lower amine level yielded a higher peel value that decreased with thermal aging but remained higher than the stable value of Example 87.

Comparing Example 89 and Example 88, the higher (1.5 phr) amine level in this composition gave a higher peel value with RT cure, again thermally resistant, and the lower amine level Example 88 yielded a lower RT cure peel value that increased an unanticipated >300% after thermal aging.

Comparing Example 89 and Example 90, using a blend of a trifunctional acetoacetylated adduct (TMP TriAcAc) and acetoacetylated polymer as component (I) unpredictably did not affect the RT cure peel value, but it did increase adhesion after thermal aging as indicated by the peel value increasing about 185%.

Unlike Resin #13 used in Example 88 and Example 89, when Resin #15 is used in Example 92 and Example 93, the peel values (adhesion) is unpredictably not sensitive to changes in amine levels from 1.0 to 1.5 phr; however, the adhesion to these substrates is unexpectedly sensitive to the change in curing agent and amine, with the peel values for Example 91 after RT cure being among the highest in the table.

The combination of acetoacetylated polymer, CHDAL curing agent, and MPMDA at 1.0 phr gives the highest RT cure adhesion (peel values). Unexpectedly, using MPMDA at 1.5 phr gives lower but more thermally stable adhesion (peel values).

It appears that the use of amine (TETA and MPMDA) at 1.5 phr gives better thermal resistance than using amine at 1.0 phr, where phr is parts per hundred resin and resin is the sum of Component (I) acetoacetylated compounds.

TABLE 10

Effect of different acetoacetylated polyester resins using two curing agents and two levels of two different amines on adhesion (peel values). Laminates were made with ABS-Magnum ™ 3904 and blue marine vinyl coverstock, and were cured at room temperature for 7 days. Compositions were prepared using Mixing Method 2.

| Ex. # | Resin # | Curing agent (1.0 equiv) | Amine | Amine phr | After 7 day RT cure Peel strength (N/25 mm) | failure mode | After 7 day RT cure + 7 days at 80° C. Peel strength (N/25 mm) | failure mode |
|---|---|---|---|---|---|---|---|---|
| 86 | Resin 13 | CHDAL | MPMDA | 1.0 | 67 (7) | C | 49 (6) | A(C) |
| 87 | Resin 13 | CHDAL | MPMDA | 1.5 | 36 (6) | A(C) | 34 (5) | A(C) |
| 88 | Resin 13 | TPAL | TETA | 1.0 | 9 (6) | A | 38 (15) | A |
| 89 | Resin 13 | TPAL | TETA | 1.5 | 14 (6) | A | 13 (5) | A |
| 90 | Resin 13/11 TMP TriAcAc (80:20 blend by weight) | TPAL | TETA | 1.5 | 13 (4) | A | 37 (9) | A |
| 91 | Resin 15 | CHDAL | MPMDA | 1.0 | 70 (4) | A(C) | 55 (16) | A |
| 92 | Resin 15 | TPAL | TETA | 1.0 | 15 (4) | A | 18 (7) | A |
| 93 | Resin 15 | TPAL | TETA | 1.5 | 18 (11) | A | 33 (25) | A(C) |

Examples 94-96

Effect of Acetoacetylated Polymer Choice and Substrate Combination on Peel Values In Table 11, Example 94 and Example 95 use the same curable composition to adhere Mueller 3-mesh fabric to two different ABS substrates, with Example 95 having an unexpected 50% higher peel strength on ABS-Magnum™ 3325. Example 94 and Example 96 use different acetoacetylated polymers while maintaining the same 1.0 equivalent ratio of curing agent and 1.5 phr amine, yet Example 96 has an unexpectedly higher peel strength on the ABS-Magnum™ 3904, particularly after thermal aging. Selection of acetoacetylated polymer(s) significantly affects the balance of properties in the final adhesive and bonded article.

TABLE 11

Effect of acetoacetylated polymer choice and substrate combination on peel values.
Compositions were prepared using Mixing Method 2.
Samples were prepared using Mueller 3-mesh fabric and the substrate listed.

| Ex. # | Resin # | Resin Tg | Curing agent | Amine 1.5 phr | Substrate | After 7 day RT cure Peel strength (N/25 mm) | failure mode | After 7 day RT cure + 7 days at 80° C. Peel strength (N/25 mm) | failure mode |
|---|---|---|---|---|---|---|---|---|---|
| 94 | 12 | −51 | CHDAL 1.0 equiv | MPMDA 1.5 phr | ABS - Magnum ™ 3904 | 7.7 (0.2) | A(C) | 11 (1) | C(A) |
| 95 | 12 | −51 | CHDAL 1.0 equiv | MPMDA 1.5 phr | ABS - Magnum ™ 3325 | 12 (1) | C | n.d. | n.d. |
| 96 | 13 | −33 | CHDAL 1.0 equiv | MPMDA 1.5 phr | ABS - Magnum ™ 3904 | 17 (4) | A(C) | 29 (2) | C(A) |

Examples 97-105

Composition With Rapid Green Strength Development, Thermally Stable Bond, and Complete Cure Obtained at RT Within Six Hours Rapid development of green bond strength is also desired such that a bonded part, article, laminate and so forth can be moved in a relatively short period of time without slippage between the bonded substrates. Table 12 of the Examples gives the 180 degree peel strength values for the composition Resin 12, CHDAL 1.0 equivalent and MPMDA at 1.5 phr bonding various substrates, after varying times of curing at 3 different temperatures. Examples 97-105 were prepared bonding ABS-Magnum™ 3325 and CGC coverstock, and were cured at either room temperature or at 67° C.

Example 97 developed in 2 hours about 40% of the RT cure and peel strength that will be developed by 6 hours, indicating that green bond strength was developed before 2 hours. Example 101 indicates that the peel adhesion of this composition is stable after aging seven days. Curing this same composition at 67° C., Examples 102, 103, 104 and 105, show a stable bond strength (peel adhesion) that agrees with the final RT cure values obtained for Examples 99, 100, and 101, indicating that stable RT cure was achieved within 6 hours of bond formation.

Examples 106-109

Adhesive Stability and Bond Stability After Thermal Aging at 120° C.

The thermal stability of the same composition was tested at 120° C. using a polycarbonate substrate with CGT coverstock. Laminated Examples 106-108 were cured at 120° C. for 1 h, 2 h and 24 h, respectively. The 180 degree peel strengths measured for these three samples were statistically equivalent, indicating that the adhesive bond was formed and stable within the first hour at 120° C. These peel values were also statistically equivalent to the composition cured at RT and at 67° C.

Example 109 was cured for two days at RT and then aged at 120° C. for one hour. The peel strength unexpectedly increased above the other values in Table 12, indicating the potential to further refine the cure profile of this adhesive composition.

TABLE 12

Rapid green strength development, thermally stable bond, and complete cure obtained at RT within six hours using Resin 12, CHDAL 1.0 equivalent and MPMDA at 1.5 phr, using Mixing Method 2. All laminates were prepared with CGT coverstock and the listed substrate.

| Ex. # | Substrate | Cure condition | Peel strength (N/25 mm) | failure mode |
|---|---|---|---|---|
| 97 | ABS-Magnum ™ 3325 | RT 2 h | 5.2 (0.7) | C |
| 98 | ABS-Magnum ™ 3325 | RT 6 h | 12 (1) | C |
| 99 | ABS-Magnum ™ 3325 | RT 1 day | 11.5 (0.8) | C |
| 100 | ABS-Magnum ™ 3325 | RT 2 day | 15 (1) | C |
| 101 | ABS-Magnum ™ 3325 | RT 7 day | 14 (2) | C(A) |
| 102 | ABS-Magnum ™ 3325 | 67° C. 2 h | 14 (3) | C |
| 103 | ABS-Magnum ™ 3325 | 67° C. 6 h | 19 (3) | C |
| 104 | ABS-Magnum ™ 3325 | 67° C. 24 h | 20 (2) | C |
| 105 | ABS-Magnum ™ 3325 | 67° C. 48 h | 21 (3) | C |
| 106 | PC | 120° C. 1 h | 10 (5) | C |
| 107 | PC | 120° C. 2 h | 18 (4) | C |

TABLE 12-continued

Rapid green strength development, thermally stable bond, and complete cure obtained at RT within six hours using Resin 12, CHDAL 1.0 equivalent and MPMDA at 1.5 phr, using Mixing Method 2. All laminates were prepared with CGT coverstock and the listed substrate.

| Ex. # | Substrate | Cure condition | Peel strength (N/25 mm) | failure mode |
|---|---|---|---|---|
| 108 | PC | 120° C. 1 day | 14 (3) | C(A) |
| 109 | PC | RT 2 day, 120° C. 1 h | 26 (1) | C |

Examples 110-117 Indicating the Compositions Cure when Various AcAc/CHO Mole Ratios are Used The examples in Table 13 were prepared using Resin 12, CHDAL (amounts as listed in Table 16) and MPMDA (1.5 phr), cast in a 6"×6" PTFE mold and allowed to cure for 7 days at ambient temperature. Dogbones were die cut and tested. Unpredictably, the compositions cured at all AcAc/CHO mol ratios listed. The range of % elongation, tensile strength, and Young's modulus allows the formulator to achieve the desired balance of final cured physical properties and bond performance.

TABLE 13

Compositions cure at different AcAc/CHO mol ratios, resulting in a range of physical properties. Compositions were prepared using Resin 12, CHDAL as listed in the table, and MPMDA (1.5 phr), using Mixing Method 2.

| Ex. # | AcAc/CHO mol ratio | Elongation (%) | Peak tensile strength (MPa) | Young's modulus (MPa) |
|---|---|---|---|---|
| 110 | 4.0 | 30 | 0.3 | 1.2 |
| 111 | 2.0 | 26 | 0.6 | 2.6 |
| 112 | 1.5 | 30 | 0.8 | 3.2 |
| 113 | 1.2 | 37 | 0.9 | 3.1 |
| 114 | 1.0 | 45 | 1.0 | 2.7 |
| 115 | 0.8 | 88 | 1.2 | 1.9 |
| 116 | 0.7 | 115 | 0.9 | 1.1 |
| 117 | 0.5 | 238 | 0.4 | 0.2 |

Examples 118-123

DHR Gel Times and Green Bond Strength

Although unpredictable, the statistical agreement of peel values for Examples 98-108 are in agreement with the gel time of 16 minutes at RT in the DHR for this composition (Example 118), as indicated by the tan delta being independent of frequency, and indicates that a level of green bond strength that prevents random slippage of the two bonded materials could likely be achieved after a relatively short time period at 67° C. or lower.

Curable compositions such as Example 120 with an 8-minute DHR gel time and Example 122 with a 2-minute DHR gel time should develop useful green bond strength about twice as quickly and about four times as quickly, respectively, as the curable composition used in Examples 97-108. Such fast development of green bond strength is highly desirable to increase production speed on many product assembly and lamination manufacturing lines.

TABLE 14

Curable compositions and measured DHR5 gel times at 25° C., indicated by frequency independent tan delta. Compositions were prepared using Mixing Method 2.

| Ex. # | Resin # | Curing agent (1.0 equiv) | Amine | DHR gel time (min) |
|---|---|---|---|---|
| 118 | 12 | CHDAL | MPMDA (1.5 phr) | 16 |
| 119 | 12 | TPAL | TETA (1.0 phr) | 2 |
| 120 | 13 | CHDAL | MPMDA (1.0 phr) | 8 |
| 121 | 13 | CHDAL | MPMDA (1.5 phr) | 25 |
| 122 | 15 | CHDAL | MPMDA (1.0 phr) | 2 |
| 123 | 15 | TPAL | TETA (1.0 phr) | 42 |

Examples 124-131

Curable Compositions (Evaluation of Different Amines)

In a vial, the AcAc polyester in Example 6 (50 g) was mixed with CHDAL (5 g) and an amine (0.83 g), as listed in Table 15. The material was directly poured onto a 2 mil untreated oriented PET sheet and then covered with a second 2 mil untreated oriented PET sheet and pressed to 2-4 mil thickness for 20 seconds at 100° C. The laminate was cured for 24 hours at room temperature (RT).

Unpredictably, curable compositions comprising primary and/or secondary amines resulted in bond strength comparable to compositions with the tertiary amine 2,3,4,6,7,8,9,10-octahydropyrimido[1,2-a]azepine (DBU). Bond strength was measured in Newtons/meter after 24 hours using a T-peel test at 12 inch/minute crosshead displacement. Some of the secondary amines that performed not as well were added as solids (e.g. piperazine) with no attempt to solubilize them, which may have influenced their reactivity. In the case of morpholine, it was later determined that 24 h is insufficient time to lead to full cure; hence the low bond strength values reflect incomplete curing of the composition in Example 130. Secondary and primary amines have the additional benefit of potentially reacting in with the polymer composition, ensuring that they cannot exude from the cured composition.

TABLE 15

Compositions and Bond strength of curable compositions comprising primary and/or secondary amines and compositions containing tertiary amines DBU and DBN

| Ex. # | Amine | Bond Strength (N/m), 2 mil untreated oriented PET sheets cured 24 h at RT |
|---|---|---|
| 124 | 2,3,4,6,7,8,9,10-octahydro-pyrimido[1,2-a]azepine (DBU) | 25-67 |
| 125 | 2,3,4,6,7,8-hexahydropyrrolo[1,2-a]pyrimidine (DBN) | 22-38 |
| 126 | Tetramethyl guanidine (TMG) | 27-29 |
| 127 | triethylenetetramine (TETA) | 26-30 |
| 128 | 1,4,8,11-Tetraazacyclotetra-decane (cyclam) | 23-37 |
| 129 | Piperidine | 32-34 |
| 130 | Morpholine | 6.5-7.5 |
| 131 | Piperazine | 15-43 |

Example 132-133

Evaluation of Different Amines

Example 132

In a vial, the AcAc polyester of Example 6 (5 g) was mixed with TCDDAL (0.57 g) and an amine (DBU, TMG, TETA, or morpholine, 0.08 g). The adhesive was used to glue together two wooden substrates to evaluate adhesion. All compositions cured equivalently after 48 h at room temperature (DBU, TMG, TETA, morpholine), but compositions with DBU or TMG softened significantly upon heating for 24 hours at 60° C. Unpredictably, the primary and secondary amines gave superior stability at 60 The composition with morpholine resulted in substrate breakage after 24 h at 60° C., while the compositions with DBU or TMG exhibited cohesive failure of the significantly softened composition.

Example 133

In a vial, the AcAc polyester in Example 6 (5 g) was mixed with CHDAL (0.41 g) and an amine (DBU, TMG, or TETA, 0.08 g). The adhesive was used to glue together two wooden substrates to evaluate adhesion. After curing at room temperature for 40 h, the compositions containing DBU or TMG were rubbery and not tacky, whereas the composition containing TETA was rubbery but tacky, indicating slower cure. Unpredictably, when these compositions were heated for 24 hours at 60° C., compositions with DBU or TMG softened significantly, whereas the composition with TETA further cured into a rubbery, not tacky adhesive.

Examples 134-137

Evaluation of Different Curing Agents Using TETA as Amine

In a vial, the AcAc polyester in Example 6 (5 g) was mixed with various dialdehydes as listed in Table 16. Isophthalaldehyde (IPAL) and terephthalaldehyde (TPAL) are solids at room temperature; and these two polyester/aldehyde mixtures were heated to 90 to melt and mix the aldehydes in with the polyester. The mixtures were then cooled back to room temperature. Then the amine TETA (0.08 g) was added and the composition mixed. The degree of cure was estimated by viscosity build. Unpredictably, all tested curing agents resulted in cured compositions. Additionally, the inventive compositions unpredictably bonded together two wooden substrates with 16-48 hour cure at room temperature, as well as after additional 24 hour cure at 60° C. This demonstrates that a wide range of curing agents exist that can be used to attain a desired balance of cure rate and overall final performance properties for a range of applications.

TABLE 16

Inventive compositions demonstrating effectiveness of TETA amine with various aldehyde curing agents as Component II.

| | Example Number | | | |
|---|---|---|---|---|
| | 134 | 135 | 136 | 137 |
| Curing agent used | CHDAL | IPAL | TCDDAL | TPAL |
| Amount of curing agent | 0.41 g | 0.39 g | 0.57 g | 0.39 g |
| mol AcAc/mol CHO | 1.31 | 1.32 | 1.29 | 1.32 |

TABLE 16-continued

Inventive compositions demonstrating effectiveness of TETA amine with various aldehyde curing agents as Component II.

| | Example Number | | | |
|---|---|---|---|---|
| | 134 | 135 | 136 | 137 |
| Cure evauation | | | | |
| Cure 16-20 h @ RT | Viscous | Cured | Cured | Cured |
| Cure 40-48 h @ RT | Cured | Cured | Cured | Cured |
| Cure 40-48 h @ RT, then 24 h @ 60° C. | Cured | Cured | Cured | Cured |

Example 138

Lap Shear Testing Demonstrates Variable AcAc/CHO Ratio

Curable compositions were prepared using different AcAc/CHO ratios of the AcAc polyester from Example 6 and TCDDAL with 1.6 phr TETA, and compositions were also prepared using different AcAc/CHO ratios of the AcAc polyester from Example 10 and TCDDAL with 1.6 phr TETA. Immediately after mixing, a small amount of adhesive was used to bond together two ABS sheets (1"×6") with an overlap of 1" to create a bonded area of 1 in$^2$. The samples were cured at ambient conditions for at least 2 days. Lap shear testing was done using an MTS Criterion Universal Tensile Tester model C43-104E. Unpredictably, samples prepared with the polyester from Example 6 demonstrated adhesive, not cohesive, failure for all tested AcAc/CHO ratios from 0.61 to 1.33, and samples prepared with the polyester from Example 10 demonstrated adhesive, not cohesive, failure for all tested AcAc/CHO ratios from 0.48 to 1.59. Measured lap shear values of the cured inventive compositions varied 1% to 35% from values obtained using AcAc/CHO ratio of about 1, illustrating that a wide range of ratios exist that can be used to attain a particular overall balance of composition properties needed for a particular application.

Examples 139-145

Applicability of AcAc/CHO Curing With Primary or Secondary Amines With Functionalized Polyethers Examples 139 through 142 show that AcAc polyether resins can be used to form curable compositions. Some compositions were used to bond two materials together, and some of these had useful 180 degree peel strength values. Furthermore, Examples 143 through 155 show that the AcAc polyether resins can be blended with AcAc polyester resins. The curable compositions can be used as adhesives; bulk properties of the cured compositions are provided in Table 17, and 180 degree peel strengths are listed in Table 18.

TABLE 17

Applicability of AcAc functionalized polyethers. All compositions were prepared using Mixing Method 2.

| | | | | After 7 day RT cure | | | | After 7 day RT cure + 7 days at 80° C. | | | |
|---|---|---|---|---|---|---|---|---|---|---|---|
| Ex. # | Resin | Curing agent | Amine | % elongation at break | Peak tensile strength (MPa) | Young's modulus (MPa) | Tg (° C.) | % elongation at break | Peak tensile strength (MPa) | Young's modulus (MPa) | Tg (° C.) |
| 139 | Polyether resin 40 | CHDAL 1.0 equiv | MPMDA 1.5 phr | 38 (1) | 0.8 (0.1) | 2.2 (0.3) | −7 | 59 (4) | 0.81 (0.05) | 1.59 (0.06) | 2 |
| 140 | Polyether resin 41 | CHDAL 1.0 equiv | MPMDA 1.5 phr | 52 (10) | 11 (2) | 126 (26) | 39 | 3 (0) | 15 (1) | 557 (88) | 60 |
| 141 | Polyether resin 39 | TPAL 1.0 equiv | TETA 1.5 phr | 22 (10) | 0.5 (0.2) | 2.8 (0.1) | NA | 17 (4) | 0.7 (0.2) | 4.7 (0.3) | −25 |
| 142 | Polyether resin 40 | TPAL 1.0 equiv | TETA 1.5 phr | 41 (2) | 1.3 (0.1) | 3.8 (0.1) | 11 | 34 (1) | 2.2 (0.1) | 7.5 (0.5) | 15 |
| 143 | Polyether resin 41/ Polyester resin 15 (25:75 blend) | CHDAL 1.0 equiv | MPMDA 1.0 phr | 157 (67) | 5 (3) | 3.7 (0.3) | 32 | 93 (8) | 9 (1) | 61.4 (0.1) | 39 |
| 144 | Polyether resin 39/ Polyester resin 12 (50:50 blend) | TPAL 1.0 equiv | TETA 1.5 phr | 41 (1) | 0.74 (0.02) | 2.3 (0.1) | −4 | 30 (1) | 1.3 (0.1) | 5.1 (0.1) | −4 |
| 145 | Polyether resin 40/ Polyester resin 15 (25:75 blend) | CHDAL 1.0 equiv | MPMDA 1.0 phr | 133 (0) | 2.3 (0.1) | 2.1 (0.1) | 23 | — | — | — | 25 |

TABLE 18

| | | | | | After 7 day RT cure | | After 7 day RT cure + 7 days at 80° C. | |
|---|---|---|---|---|---|---|---|---|
| Ex. # | Resin | Curing agent | Amine | Substrate for peel test (with CGT coverstock) | Peel strength (N/25 mm) | failure mode | Peel strength (N/25 mm) | failure mode |
| 139 | Polyether resin 40 | CHDAL 1.0 equiv | MPMDA 1.5 phr | | — | — | — | — |
| 140 | Polyether resin 41 | CHDAL 1.0 equiv | MPMDA 1.5 phr | ABS - white | 11 (4) | A(C) | 0.9 (0.3) | A(C) |
| 141 | Polyether resin 39 | TPAL 1.0 equiv | TETA 1.5 phr | ABS - white | 0.11 (0.05) | A | — | — |
| 142 | Polyether resin 40 | TPAL 1.0 equiv | TETA 1.5 phr | ABS - white | 0.4 (0.6) | A | 0.04 (0.07) | A(C) |
| 143 | Polyether resin 41/ Polyester resin 15 (25:75 blend) | CHDAL 1.0 equiv | MPMDA 1.0 phr | ABS - Magnum™ 3325 | 28 (2) | A | 23.1 (0.5) | A(C) |
| 144 | Polyether resin 39/ Polyester resin 12 (50:50 blend) | TPAL 1.0 equiv | TETA 1.5 phr | ABS - Magnum™ 3325 | 3.9 (0.6) | A(C) | 0.4 (0.2) | A |
| 145 | Polyether resin 40/ Polyester resin 15 (25:75 blend) | CHDAL 1.0 equiv | MPMDA 1.0 phr | ABS - Magnum™ 3325 | 22 (1) | A(C) | 19 (2) | A(C) |

Examples 146-155

Addition of Solid Tackifier Resins With Varying Polarity; Separation and Testing of Laminates Comprising Tackifier Resin Tackifier resin was ground with mortar and pestle and the specified amount was mixed with 6.2 g of the dialdehyde curing agent CHDAL. AcAc Resin 12 (40 g) was mixed with the tackifier/curing agent mixture, 0.60 g of the amine was added, and the final composition was mixed approximately 60 seconds in a Speedmixer™ by FlackTec Inc., model DAC 400.2 VAC, and used immediately. The AcAc/CHO ratio was 1.0, and 1.5 phr of amine was added based on the polyester resin. Either 36.5 phr or 10.25 phr tackifier resin was added based on Component (I) (Resin 12), corresponding to about 14.6 weight percent or about 4.1 weight percent of the entire composition, respectively.

Substrates were wiped clean with isopropyl alcohol and air dried for at least ten minutes. A 10 mil drawdown bar was used to form a film of the composition (target thickness: 4 mil) on an array of six 1"×6" substrates, either Lexan™ 141 polycarbonate (PC) or polypropylene (PP). A coverstock approximately 6"×12" was placed over the adhesive, and a handheld 2-lb roller was rolled over the sample twice to laminate the sample. The samples were cured as described in Table 19. After the prescribed cure cycle was completed, the coverstock was cut to separate the laminated samples, and the outer two samples were discarded.

Two levels of the tackifier resin were tested as adhesion promoters on PC and PP substrates and cured in an oven for two hours at 120° C. All laminates prepared with PC substrates exhibited cohesive failure within the cured composition, so no effect on adhesion could be determined. Unpredictably, the cohesive strength measured by the peel test did not exhibit statistically significant variation, indicating that the composition cured even with over 14 weight % additive.

In contrast, samples with CGT coverstock adhered to PP exhibited 20%, 5% or zero cohesive failure of the cured composition and over 80 percent adhesive failure to the PP surface. The composition without tackifier resin had 100% adhesive failure to the PP. Unpredictably, the addition of only about four weight percent or about 10 phr of tackifier resin (Examples 147-149) resulted in about a three-fold improvement in 180-degree peel adhesion to PP, compared to Example 146 with no tackifier resin added. Unpredictably, about a six-fold increase in peel strength was obtained by adding 14.6 weight percent or about 36.5 phr of Kristalex™ 3070 tackifier resin, Example 150.

TABLE 19

Increase in adhesion with addition of tackifier resin to the composition AcAc Resin 12, CHDAL 1.0 equiv. and 1.5 phr MPMDA. Coverstock was CGT brown PVC. Samples were cured at 120° C. for 2 hours.

| Ex. # | Additive | wt % additive | Substrate | 180 degree peel (N/25 mm) | % adhesive failure to substrate |
|---|---|---|---|---|---|
| 146 | None | 0 | PP | 0.19 (0.02) | 100 |
| 147 | Kristalex™ 3070 | 4.1 | PP | 0.6 (0.3) | 95 |
| 148 | Regalite™ S5090 | 4.1 | PP | 0.6 (0.2) | 95 |
| 149 | Eastman™ Ester gum 8 | 4.1 | PP | 0.5 (0.2) | 95 |
| 150 | Kristalex™ 3070 | 14.6 | PP | 1.2 (0.3) | 95 |
| 151 | Regalite™ S5090 | 14.6 | PP | 0.62 (0.04) | 80 |
| 152 | None | 0 | PC | 18 (4) | 0 (100% cohesive) |
| 153 | Kristalex™ 3070 | 4.1 | PC | 16 (2) | 0 (100% cohesive) |
| 154 | Regalite™ S5090 | 4.1 | PC | 14 (1) | 0 (100% cohesive) |
| 155 | Eastman™ Ester gum 8 | 4.1 | PC | 17 (1) | 0 (100% cohesive) |

Examples 156-168

Green Strength Evaluation

AcAc Resin 12 and the curing agent, CHDAL, were combined in a 2 oz glass jar at a 1.55 AcAc/CHO equivalent ratio and 1.55 phr of MPMDA was added and mixed. A portion was transferred to an aluminum weighing dish and cryoground tackifier resin was added as specified in the Table 20 below. The composition was mixed thoroughly with a wooden tongue depressor, and approximately 0.5 inch at the end of two wooden tongue depressors was bonded with the composition at about 0.005" to about 0.01" thickness.

The bonded substrates were placed in an 80° C. oven for about 90 min (Examples 156-162) or 60 minutes (Examples 163-168), removed and immediately evaluated for green strength while warm. Unexpectedly, about 11 phr to about 23 phr tackifier resin provided sufficient green strength when hot/warm to prevent lengthwise sliding of the substrates and most rotation about the bonded end, and about 33 phr to about 56 phr tackifier resin provided sufficient green strength when warm to prevent all or almost all movement of the substrates. Similar results were obtained with Piccotac™ 7590 and Kristalex™ 3070 tackifier resins. Examples 163-168 bonded substrates were placed in a −36° C. chest freezer overnight and all samples with tackifier resin exhibited cohesive failure. Additionally, the cured compositions could not be removed from the aluminum pans they were mixed in.

TABLE 20

Evaluation of green strength between tongue depressors evaluated immediately after removal from 80° C. oven. Composition is AcAc/CHO = 1.55; AcAc Resin 12, CHDAL, and 1.55 phr MPMDA amine with various levels of Piccotac™ 7590 or Kristalex™ 3070 tackifier.

| Ex. # | Kristalex™ 3070 wt % (phr) | 10 min 80° C. | slides with slight effort | slides with effort | slight movement | 93 min at 80° C. | RT failure mode |
|---|---|---|---|---|---|---|---|
| 156 | 33 (56) | slides hot | | | 3 min | with effort | C |
| 157 | 29 (45) | slides hot | | | 3 min | slides hot | C |
| 158 | 23 (33) | slides hot | | | 3 min | | C |
| 159 | 17 (22) | slides hot | | 3 min | | some effort | C |
| 160 | 9 (11) | slides hot | | 3 min | | slides hot | C |
| 161 | 7 (8) | slides hot | | | | slight effort slides hot | C |
| 162 | 0 | slides hot | 3 min | | | slides hot | C |

| | evaluated immediately out of 80° C. oven | Piccotac™ 7590 wt % (phr) | slides freely | some wiggle | no or slight movement |
|---|---|---|---|---|---|
| 163 | | 33 (56) | | | X |
| 164 | | 29 (45) | | | X |
| 165 | | 23 (33) | | | X |
| 166 | | 17 (23) | | X | |
| 167 | | 9 (11) | | X | |
| 168 | | 0 | X | when cooled RT | |

Examples 169-173

Preparation and Testing of Laminates Comprising Tackifier Resin Demonstrating Improved Adhesion to Untreated PET and Green Strength Tackifier resin was cryogenically ground and added to a mixture of Components (I), (II) and (III) of the invention, more specifically described in the tables herein. Approximately 0.5 inch at the end of two wooden tongue depressors was bonded with the composition at about 0.005" to about 0.01" thickness. The resistance to sliding in the lengthwise direction of the tongue depressor and the resistance to rotation or "wiggle" about the bonded end were evaluated by applying finger pressure to the top substrate. Build of green strength was determined by the time between bond formation and observation of resistance to sliding and subsequent resistance to rotation/wiggle at the bonded end of the wooden tongue depressors. Untreated 2 mil PET film from ChemInstruments, USA, was used to prepare laminates. Compositions were drawn down by hand using a wound wire rod on the PET to obtain about a 0.01" film. The end of a tongue depressor was laid in one edge of the composition, and a second piece of PET was laid on the composition and smoothed with the edge of a different tongue depressor to ensure contact between the composition and the second PET substrate.

The bonded wooden tongue depressors, the PET/PET laminates and the tongue depressor/PET laminates were placed in a 108° C. oven for five minutes, removed, and the green strength while hot (ability to slide the wooden tongue depressors) was evaluated. The samples were cured at ambient temperature for about 2.5 h and then placed in a −36° C. freezer overnight. The green strength and adhesion while cold were then evaluated.

Unpredictably, compositions with 42 phr (26 wt %) and higher tackifier levels had sufficient green strength within three minutes of removal from a 108° C. oven that the bonded tongue depressors did not slide under finger pressure while the control without tackifier resin and the sample with 15 phr (11 wt %) tackifier resin slid easily. After curing at ambient temperature overnight, compositions with 35 phr tackifier resin and higher exhibited cohesive failure for the PET/PET bonds. The bonded tongue depressors exhibited no movement under finger pressure and had cohesive failure when pulled apart after >8 h at −36° C. while the control sample had slight movement and cohesive failure.

TABLE 21

Addition of tackifier resins as Component (IV) of the compositions of the invention provided hot green strength and adhesion to untreated PET film. The composition was AcAc/CHO = 1 with AcAc Resin 12, CHDAL, 1.55 phr MPMDA with the specified tackifier resin in the specified amount.

| Ex. # | wt % tackifier | Tackifier wt % (phr) | 5 min 108° C. - hot td/td | 5 min 108° C. - hot td/PET | RT 2.5 h plus - 36° C. overnight- td/td | RT overnight cure td/PET | RT overnight cure PET/PET |
|---|---|---|---|---|---|---|---|
| 169 | Piccotac™ 7590 | 26 (42) | no movement | no movement | C - difficult to pull | n.d. | C |
| 170 | Piccotac™ 1095 | 33 (59) | no movement | no movement | C | no movement | C |
| 171 | Piccotac™ 1095 | 23 (35) | — | no movement | C | no movement | C |
| 172 | Piccotac™ 1095 | 11 (15) | Slide | no movement | wood broke, cohesive | no movement | A |
| 173 | — | 0 | Slide | no movement | wiggles; C | no movement | A |

Examples 174-180

Fast Green Strength Development With Increased Component (III) Level

AcAc Resin 12 and curing agent CHDAL were combined in a 2 oz glass jar at a 1.55 AcAc/CHO equivalent ratio and mixed. The specified amount of MPMDA was added; the composition was mixed thoroughly with a wooden tongue depressor, and approximately 0.5 inch at the end of two wooden tongue depressors was bonded with the composition at about 0.005" to about 0.01" thickness. Finger pressure was used to evaluate the development of green strength as previously described. After about three hours ambient cure, the bonded tongue depressors were placed in a −36 freezer overnight and pulled apart by hand. All wooden laminates with greater than 1.9 phr Component (III) exhibited substrate failure except the sample with 1.9 phr Component (III) that had cohesive failure.

TABLE 22

Time in minutes to develop green strength between tongue depressors for composition with AcAc/CHO = 1.55, AcAc Resin 12, CHDAL with varying amounts of MPMDA at ambient cure.

| Ex. # | MPMDA (phr) | slides easily | slides with effort | does not slide | does not slide; some wiggle | no or slight movement |
|---|---|---|---|---|---|---|
| 174 | 1.9 | 360 | 427 | — | — | — |
| 175 | 2.4 | 53 | >60 | — | — | — |
| 176 | 3.3 | 26 | 58 | ~70 | 80 | n.d. |
| 177 | 4.5 | 24 | 26 | ~49 | 56 | 76 |
| 178 | 5.9 | 22 | 24 | 47 | n.d. | 54 |
| 179 | 7.3 | 20 | 22 | ~45 | 52 | 72 |
| 180 | 8.8 | 19 | — | ~42 | 49 | 69 |

Examples 181-183

Thermal Stability: Primary/Secondary Amine vs. Tertiary Amine

Table 23 shows compositions containing the same AcAc Resin 12 and curing agent (CHDAL 1.0 equiv) but with 1.5 phr MPMDA, TETA or DBU amines. After curing for seven days at room temperature (RT), the samples were subjected to seven days of 80° C. heat aging/post-cure. Example 183 with the tertiary amine DBU had a 19% decrease in peel value after the post-cure/aging at 80° C. while the primary amine used in Example 181 yielded a surprising 50% increase in peel strength after post-cure/aging at 80° C. The post-cured peel strength of Example 181 was an unexpected 75% higher than the peel strength of the sample comprising the tertiary amine. The combined primary/secondary amine used in Example 182 resulted in an unexpected 138% increase in peel strength after post-cure/aging at 80° C.

TABLE 23

Comparison of thermal resistance using tertiary amine DBU versus primary and secondary amines. Laminates were prepared using ABS-Magnum™ 3325 substrate and brown CGT coverstock. Compositions were prepared using Mixing Method 2.

| Ex. # | Resin # | Curing agent (1.0 equiv) | Amine (1.5 phr) | Peel strength at 7 day RT cure (N/25 mm) | failure mode | Peel strength at 7 day RT cure + 7 day 80° C. aging/post-cure (N/25 mm) | failure mode |
|---|---|---|---|---|---|---|---|
| 181 | Resin 12 | CHDAL | MPMDA | 14 (2) | C | 21 (2) | C |
| 182 | Resin 12 | CHDAL | TETA | 2.1 (0.3) | C | 5 (1) | A |
| 183 | Resin 12 | CHDAL | DBU | 15 (2) | A(C) | 12 (7) | A |

Examples 184-192

Comparison of Mixing Methods

Table 24 provides the bulk properties of cured compositions. Examples 184 and 185 were prepared by first mixing the resin with the amine. After 3 days, the resin/amine remained a viscous liquid. At that point, the curing agent (CHDAL) was added. Example 184 was not gelled 5 h after addition of CHDAL but cured to a rubbery solid 22 h after addition of CHDAL. Example 185 cured to a rubbery solid 5 h after addition of CHDAL.

Additional compositions were made, comparing bulk properties when using Mixing Method 1 versus Mixing Method 2: Samples prepared using Mixing Method 1 (wherein the AcAc resin and amine were premixed) took longer to cure (remaining a viscous material for hours), whereas those made using Mixing Method 2 (wherein the amine was added last) cured more quickly (often forming a gel within minutes). Unpredictably, the bulk properties of the cured samples made using Mixing Method 1 were comparable to those made using Mixing Method 2 with the same components, as shown in Table 24.

TABLE 24

Bulk properties of cured compositions, indicating that premixing the amine (Component (III)) with the AcAc resin has negligible impact on the final properties of the cured compositions.

| Ex. # | Resin # | Curing agent (1.0 equiv) | Amine | Mixing method | Data after curing at RT for 7 days | | | | Data after curing at RT for 7 days + 7 days at 80° C. | | | |
|---|---|---|---|---|---|---|---|---|---|---|---|---|
| | | | | | % elongation at break | Peak tensile strength (MPa) | Young's modulus (MPa) | Tg (° C.) | % elongation at break | Peak tensile strength (MPa) | Young's modulus (MPa) | Tg (° C.) |
| 184 | Resin 14 | CHDAL | MPMDA 1.5 phr | MM1 | 36 (3) | 1.0 (0.1) | 3.4 (0.2) | −2 | 47 (3) | 1.2 (0.1) | 3.2 (0.3) | 3 |
| 185 | Resin 14 | CHDAL | TETA 1.5 phr | MM1 | 36 (3) | 1.1 (0.2) | 3.8 (0.3) | 2 | 50 (4) | 0.80 (0.08) | 2.0 (0.1) | −1 |
| 186 | Resin 15 | CHDAL | MPMDA 1.5 phr | MM1 | 171 (23) | 5 (1) | 4.0 (0.2) | 29 | 108 (12) | 19 (4) | 146 (35) | 39 |
| 187 | Resin 15 | CHDAL | MPMDA 1.5 phr | MM2 | 151 (41) | 4 (1) | 3.5 (0.2) | 29 | 104 (16) | 17 (2) | 161 (18) | 37 |
| 188 | Resin 15 | CHDAL | DMAPA 1.5 phr | MM1 | 215 (32) | 11 (3) | 6.1 (0.5) | 36 | 64 (3) | 4.1 (0.2) | 63 (28) | 36 |
| 189 | Resin 15 | CHDAL | DMAPA 1.5 phr | MM2 | 219 (16) | 8.4 (0.9) | 4.9 (0.7) | 35 | 56 (5) | 3.1 (0.4) | 48 (3) | 35 |

TABLE 24-continued

Bulk properties of cured compositions, indicating that premixing the amine (Component (III))
with the AcAc resin has negligible impact on the final properties of the cured compositions.

| | | | | Data after curing at RT for 7 days | | | | Data after curing at RT for 7 days + 7 days at 80° C. | | | |
|---|---|---|---|---|---|---|---|---|---|---|---|
| Ex. # | Resin # | Curing agent (1.0 equiv) | Amine | Mixing method | % elongation at break | Peak tensile strength (MPa) | Young's modulus (MPa) | Tg (° C.) | % elongation at break | Peak tensile strength (MPa) | Young's modulus (MPa) | Tg (° C.) |
| 190 | Resin 15 | CHDAL | HMDA 1.0 phr | MM1 | 205 (41) | 4 (1) | 2.3 (0.1) | 27 | 53 (6) | 6 (1) | 59 (17) | 37 |
| 191 | Resin 15 | CHDAL | HMDA 1.0 phr | MM2 | 236 (7) | 5.0 (0.3) | 2.7 (0.2) | 28 | 44 (1) | 4.7 (0.4) | 63 (21) | 37 |
| 192 | Resin 15 | CHDAL | TETA 1.0 phr | MM1 | 267 (20) | 13 (2) | 6.1 (0.6) | 33 | 165 (22) | 18 (3) | 52.8 (0.8) | 35 |

Examples 193-211

Hand Laminations and T-Peel Using Curable Compositions

Mixing Method 3, in which the amine and resin were premixed (along with solvent), was used in solvent-based laminations of PET to PET or PET to CPP as shown in Table 25. Mixing Method 3 was used to make the composition as described in Example 193 containing the resin, the amine, and the solvent, but to which the CHDAL crosslinker had not yet been added. Two days after preparation, Example 193 (with CHDAL crosslinker not yet added) had a viscosity of 16.9 seconds, as measured by a Zahn #2 cup. Twelve days after preparation, the solution viscosity of Example 193 was unchanged.

Table 25 tabulates T-peel results of cured adhesives. There is some variability in the data. However, it can be seen that a given formulation yields roughly comparable T-peel strengths, regardless of whether it is premixed or not, e.g., Examples 193, 194, 199, 200, 204 and 205. However, the premixed compositions are less prone to zippering in the T-peel tests.

The amount of curing agent can be adjusted to obtain the desired balance of properties. The amount of CHDAL curing agent was varied from 1.0 to 0.6 equivalents using Mixing Method 3, (see Examples 208 and 209) and Mixing Method 4 (see Examples 195-197). In both cases, decreasing the amount of curing agent resulted in lower T-peel strength. The amount of amine can also be adjusted to obtain the desired balance of properties. Amines with two primary amine functionalities (e.g. MPMDA, HMDA, and TETA) can react with two AcAc groups on two different resin molecules to crosslink them. DMAPA, on the other hand, has only one primary amine functionality (as well as one tertiary amine functionality), and can be added in larger quantities, because it does not result in crosslinking of the resin (Examples 198-203).

The examples in Table 25 further illustrate the use of a variety of amines to obtain a cured bond. Primary diamines such as MPMDA, HMDA, and TETA; amines with both primary and tertiary amine functionality such as DMAPA; as well as amines that contain primary amine functionality as well as alkoxysilane functionality such as TMSPA (Example 211) are all able to form useful cured adhesives.

TABLE 25

T-peel test results of various curable compositions, indicating that both methods of preparing
the composition (Mixing Methods 3 and 4) result in cured adhesives with useful bond strengths.
All examples were made using AcAc Resin Example 15 and CHDAL as the curing agent.

| | | | | | | T-peel, g/in (std. dev.) | | | |
|---|---|---|---|---|---|---|---|---|---|
| Ex. # | Curing agent | Amine | Mixing method | % Solids in EtOAc | Substrates | RT-1 day | Failure mode | RT-1 week | Failure mode |
| 193 | CHDAL (1.0 equiv) | MPMDA 1.5 phr | MM3 | 47% | PET/PET PET/CPP | 170 (56) 226 (62) | c a | 192 (73) 96 (30) | c(zip/sf) a(zip) |
| 194 | CHDAL (1.0 equiv) | MPMDA 1.5 phr | MM4 | 57% | PET/PET PET/CPP | 548 (20) 137 (34) | c(sf) zip | 258 (32) 83 (7) | c(sf) zip |
| 195 | CHDAL (1.0 equiv) | MPMDA 1.0 phr | MM4 | 57% | PET/PET PET/CPP | 315 (28) 380 (34) | c c | 240 (29) 182 (23) | sf c(a) |
| 196 | CHDAL (0.8 equiv) | MPMDA 1.0 phr | MM4 | 57% | PET/PET PET/CPP | 248 (58) 333 (6) | c c | 295 (61) 106 (7) | c(sf) c |
| 197 | CHDAL (0.6 equiv) | MPMDA 1.0 phr | MM4 | 57% | PET/PET PET/CPP | 265 (29) 97 (10) | c(sf) zip | 212 (42) 91 (19) | c(sf) zip |
| 198 | CHDAL (1.0 equiv) | DMAPA 1.0 phr | MM3 | 57% | PET/PET PET/CPP | 342 (21) 268 (27) | c c | 225 (11) 134 (24) | c(sf) zip |
| 199 | CHDAL (1.0 equiv) | DMAPA 1.5 phr | MM3 | 57% | PET/PET PET/CPP | 291 (51) 198 (28) | c a | 308 (46) 41 (3) | sf zip |
| 200 | CHDAL (1.0 equiv) | DMAPA 1.5 phr | MM4 | 57% | PET/PET PET/CPP | 255 (35) 98 (40) | c(zip) zip | 182 (17) 38 (3) | sf Zip |
| 201 | CHDAL (1.0 equiv) | DMAPA 2.0 phr | MM3 | 57% | PET/PET PET/CPP | 241 (56) 206 (49) | c c | 471 (85) 23 (1) | sf(zip) c |

TABLE 25-continued

T-peel test results of various curable compositions, indicating that both methods of preparing the composition (Mixing Methods 3 and 4) result in cured adhesives with useful bond strengths. All examples were made using AcAc Resin Example 15 and CHDAL as the curing agent.

| Ex. # | Curing agent | Amine | Mixing method | % Solids in EtOAc | Substrates | RT-1 day | Failure mode | RT-1 week | Failure mode |
|---|---|---|---|---|---|---|---|---|---|
| 202 | CHDAL (1.0 equiv) | DMAPA 7.0 phr | MM3 | 57% | PET/PET | 336 (50) | c(zip) | 317 (39) | sf |
|  |  |  |  |  | PET/CPP | 154 (28) | zip | 24 (2) | c(sf) |
| 203 | CHDAL (1.0 equiv) | DMAPA 9.5 phr | MM3 | 57% | PET/PET | 299 (52) | sf | 171 (37) | c(sf) |
|  |  |  |  |  | PET/CPP | 313 (14) | zip | 56 (8) | zip |
| 204 | CHDAL (1.0 equiv) | HMDA 1.0 phr | MM3 | 57% | PET/PET | 166 (7) | c | 232 (38) | Sf |
|  |  |  |  |  | PET/CPP | 303 (14) | c | 165 (37) | c(a) |
| 205 | CHDAL (1.0 equiv) | HMDA 1.0 phr | MM4 | 57% | PET/PET | 354 (15) | c | 216 (38) | c(sf) |
|  |  |  |  |  | PET/CPP | 356 (51) | zip | 162 (36) | zip |
| 206 | CHDAL (1.0 equiv) | HMDA 1.5 phr | MM3 | 57% | PET/PET | 279 (35) | c | 199 (29) | c(sf) |
|  |  |  |  |  | PET/CPP | 325 (13) | a | 199 (60) | zip(sf) |
| 207 | CHDAL (1.0 equiv) | HMDA 2.0 phr | MM3 | 57% | PET/PET | 342 (47) | c | 202 (6) | C |
|  |  |  |  |  | PET/CPP | 83 (6) | a | — | — |
| 208 | CHDAL (1.0 equiv) | TETA 1.0 phr | MM3 | 57% | PET/PET | 334 (24) | c | 297 (8) | Sf |
|  |  |  |  |  | PET/CPP | 301 (25) | c | 283 (33) | c(a) |
| 209 | CHDAL (0.6 equiv) | TETA 1.0 phr | MM3 | 57% | PET/PET | 148 (16) | c | 234 (10) | c |
|  |  |  |  |  | PET/CPP | 152 (31) | c | 113 (15) | c |
| 210 | CHDAL (1.0 equiv) | TETA 3.0 phr | MM3 | 47% | PET/PET | 220 (37) | c(sf) | 172 (18) | sf |
|  |  |  |  |  | PET/CPP | 93 (14) | zip | 40 (6) | zip |
| 211 | CHDAL (1.0 equiv) | TMSPA 1.0 phr | MM3 | 57% | PET/PET | 85 (14) | c | 227 (40) | c |
|  |  |  |  |  | PET/CPP | 20 (1.5) | c | 56 (11) | c | c = cohesive;
a = adhesive;
sf = substrate failure;
zip = zippering;
second notation in parentheses is secondary/minor failure mode Examples 212-225

Hand Laminations and Pot Life Using Various Resins, Curing Agents, and Amines

Curable compositions were used to laminate two sheets of PET film. At 57% solids in ethyl acetate, the compositions had pot life (time to reach 24 sec viscosity using a #2 Zahn cup) of 15-220 min as shown in Tables 26 and 27. Hence, the pot life can be adjusted by choice of resin, curing agent, amine, and amine level.

In Examples 212-216, AcAc Resin 12 with lower Tg (−51° C.) was used. T-peel tests of hand lamination samples of PET/PET indicated that the adhesive bonded the PET together quickly and stably. In Example 212, the T-peel value is greater than 120 g/in, and remains stable from 1 day to 16 weeks cured at room temperature, as well as at higher temperatures, which is consistent with the no or little bulk property changes in Tg, elongation and tensile strength observed between room temperature cure for one week, and additional aging at 80° C. for 1 week.

Examples 217-220 were prepared using AcAc Resin 13 which has aromatic moieties in the polyester resin and has a higher Tg (−33° C.) than some of the other resins. T-peel strengths of Examples 218-220 showed generally higher T-peel strengths than Examples 212-216. In all cases, the T-peel strength was >120 g/in, and after 4 weeks or more at RT, the T-peel strength was >200 g/in.

Examples 213 and 214 contain aliphatic curing agent CHDAL. Example 214 generally showed lower T-peel strength than Examples 215-216 that contain the aromatic curing agent TPAL.

In Examples 215-216, T-peel strength increased with cure time. This is consistent with the observed increase in Tg and tensile strength after post-cure at higher temperature (80° C.).

Examples 213, 214, 217, and 218 contain same curing agent CHDAL and the amine, MPMDA. However, Examples 217 and 218 comprise AcAc Resin 13 which comprises 50% aromatic isophthalic acid as the diacid, whereas Examples 213 and 214 comprise Ac—Ac Resin 12 with no aromatic content. After curing for 1 week at room temperature, Example 217 exhibited a much higher Tg (30° C.) than that of Example 214 (−3° C.), and after an additional post-cure at 80° C. for one week, Example 218 displayed tensile strength approximately 8 times higher than Example 214 while being able to keep surprising elongation at break, e.g., 88%. All of these factors are believed to have contributed to Example 218 having T-peel strength notably higher than Example 214; the T-peel strength increased fast with time and remained stable after aging at 40° C.

Examples 217-218 contained an aromatic-moiety-containing AcAc Resin 13 and aliphatic curing agent while Examples 229-220 contained both aromatic-moiety-containing AcAc Resin 13 and aromatic curing agent TPAL. Examples 219-220 showed higher PET/PET peel strength and bulk tensile strength than Examples 217-218 in the early cure period from 1 day to 4 weeks. As the cure continued, the tensile strength of Examples 219-220 increased significantly, while the elongation at break decreased to about 5%. Hence, the T-peel strength for Examples 219-220 decreased to about 50-65 g/in after aging at 80° C. for one week.

Examples 222-223 and Examples 217-218 are comparable in performance and properties such as T-peel strength, Tg, tensile strength and elongation at break. Examples 224-225 and Examples 219-220 are comparable in performance and properties such as T-peel strength, Tg, tensile strength and elongation at break. These examples unpredictably demonstrated that the compositions of the invention can give equivalent properties without the use of neopentyl glycol in the resin.

Example 221 exhibited an unpredictably longer pot life of 145 minutes to attain a viscosity of 24 sec using a #2 Zahn cup (at 57% solids and 1.5 phr amine) compared to Example 214 (45 minutes) and Example 218 (30 minutes) at the same level of amine addition. Generally, a longer pot life is desirable in certain applications.

TABLE 26

Pot life (time to reach 24 sec viscosity using a #2 Zahn cup), T-peel, and bulk properties of a variety of curable compositions used to prepare hand laminations of PET to PET. (different resins, curing agents, amines). All compositions were made by adding the amine(s) last (MM2 and MM4).

| Ex. # | Resin | Curing agent (1.0 equiv) | Amine | Pot Life at 57% solids (min) | % solids for lamination (in ethyl acetate) | T-peel Strength (g/in), PET/PET | | | | | | | |
|---|---|---|---|---|---|---|---|---|---|---|---|---|---|
| | | | | | | RT, 1 d | RT, 1 wk | RT, 4 wk | RT, 8 wk | RT, 12 wk | RT, 16 wk | 1 wk RT + 40° C., 3 wk | 1 wk RT + 80° C., 1 wk |
| 212 | 12 | TCDDAL | Morpholine (1.5 phr) | 20 | 57% | 144 (15) | 163 (13) | 146 (8) | 123 (15) | 120 (12) | 148 (33) | 156 (14) | |
| 213 | 12 | CHDAL | MPMDA (1.0 phr) | 220 | — | | | | | | | | |
| 214 | 12 | CHDAL | MPMDA (1.5 phr) | 45 | 50% | 84 (20) | 91 (7) | 81 (25) | 129 (10) | — | — | 82 (17) | — |
| 215 | 12 | TPAL | TETA (1.0 phr) | 80 | 57% | 117 (7) | 127 (14) | 81 (14) | 79 (23) | 92 (7) | — | 72 (3) | 162 (7) |
| 216 | 12 | TPAL | TETA (1.5 phr) | 30 | 57% | 90 (20) | 70 (6) | 121 (18) | 136 (35) | 209 (16) | — | 191 (10) | 143 (32) |
| 217 | 13 | CHDAL | MPMDA (1.0 phr) | 200 | — | | | | | | | | |
| 218 | 13 | CHDAL | MPMDA (1.5 phr) | 30 | 50% | 132 (32) | 173 (13) | 201 (36) | 391 (59) | 275 (7) | 278 (68) | 314 (44) | — |
| 219 | 13 | TPAL | TETA (1.0 phr) | 25 | 57% | 293 (59) | 237 (29) | 280 (38) | | | | 206 (40) | 64 (19) |
| 220 | 13 | TPAL | TETA (1.5 phr) | 15 | 57% | 173 (16) | 298 (68) | 254 (7) | 255 (37) | | | 55 (14) | 51 (31) |
| 221 | 31 | CHDAL | MPMDA (1.5 phr) | 145 | 50% | 171 (32) | 167 (23) | 142 (21) | 167 (12) | 220 (23) | 226 (90) | 216 (45) | |
| 222 | 15 | CHDAL | MPMDA (1.0 phr) | >50 | — | | | | | | | | |
| 223 | 15 | CHDAL | MPMDA (1.5 phr) | — | 50% | 201 (34) | 146 (23) | 246 (12) | 435 (69) | — | 214 (10) | 381 (65) | 389 (66) |
| 224 | 15 | TPAL | TETA (1.0 phr) | 20 | — | | | | | | | | |
| 225 | 15 | TPAL | TETA (1.5 phr) | — | 50% | 174 (13) | 178 (3) | 207 (96) | 132 (7) | — | 137 (61) | — | 30 (3) |

TABLE 27

| Ex. # | Resin | Curing agent (1.0 equiv) | Amine | Pot Life at 57% solids (min) | % solids for lamination (in ethyl acetate) | Cured adhesive Tg (° C.) | | Elongation (%) | | Peak Tensile Strength (MPa) | |
|---|---|---|---|---|---|---|---|---|---|---|---|
| | | | | | | RT 1 wk | RT 1 wk + 80° C. 1 wk | RT 1 wk | RT 1 wk + 80° C. 1 wk | RT 1 wk | RT 1 wk + 80° C. 1 wk |
| 212 | 12 | TCDDAL | Morpholine (1.5 phr) | 20 | 57% | 18 | 18 | 62 (14) | 73 (10) | 1.5 (.4) | 1.7 (0.2) |
| 213 | 12 | CHDAL | MPMDA (1.0 phr) | 220 | — | — | — | — | — | — | — |
| 214 | 12 | CHDAL | MPMDA (1.5 phr) | 45 | 50% | −3 | 8 | 77 (17) | 66 (13) | 1.2 (0.2) | 1.6 (0.3) |
| 215 | 12 | TPAL | TETA (1.0 phr) | 80 | 57% | 2 | 20 | 49 (9) | 64 (5) | 1.3 (0.2) | 2.9 (0.3) |
| 216 | 12 | TPAL | TETA (1.5 phr) | 30 | 57% | 1 | 25 | 63 (12) | 54 (9) | 1.7 (0.2) | 3.4 (0.7) |
| 217 | 13 | CHDAL | MPMDA (1.0 phr) | 200 | — | 30 | 35 | 225 (37) | 87 (12) | 3.2 (0.9) | 10.1 (1.4) |
| 218 | 13 | CHDAL | MPMDA (1.5 phr) | 30 | 50% | — | — | 285 (18) | 88 (11) | 10.1 (0.8) | 16.5 (1.1) |
| 219 | 13 | TPAL | TETA (1.0 phr) | 25 | 57% | 29 | 49 | 262 (47) | 5 (0) | 7.1 (2.2) | 44 (4) |
| 220 | 13 | TPAL | TETA (1.5 phr) | 15 | 57% | 36 | 51 | 185 (21) | 5 (1) | 13.2 (2.3) | 48 (8) |
| 221 | 31 | CHDAL | MPMDA (1.5 phr) | 145 | 50% | — | — | — | — | — | — |
| 222 | 15 | CHDAL | MPMDA (1.0 phr) | >50 | — | 26 | — | 281 (11) | 130 (30) | 6.2 (0.4) | 11.7 (2.4) |
| 223 | 15 | CHDAL | MPMDA (1.5 phr) | — | 50% | — | — | — | — | — | — |
| 224 | 15 | TPAL | TETA (1.0 phr) | 20 | — | 32 | 56 | 218 (51) | 13 (9) | 9.7 (3.1) | 40.2 (3.3) |
| 225 | 15 | TPAL | TETA (1.5 phr) | — | 50% | 38 | 49 | 136 (11) | 7 (0) | 11.8 (1.2) | (4.9) |

Examples 226-233

Examples 226-233 in Table 28 show that useful T-peel values can be obtained with a variety of different resins with varying properties (AcAc #, Tg, Mn). Additionally, the examples in Table 28 show that several different amines can be used.

TABLE 28

T-peel results and bulk properties for various resins and amines. The composition in Example 229 was prepared by MM3; all others were prepared by MM4 for T-peel testing and MM2 for bulk property data.

| Ex. # | Resin # | Curing agent (1.0 equiv) | Amine | % Solids in EtOAc | Substrates | T-peel, g/in (std. dev.) RT-1 day | Failure mode | T-peel, g/in (std. dev.) RT-1 week | Failure mode | Bulk properties (1 week RT cure) % elongation | Tensile Strength (MPa) | Young's Modulus (MPa) |
|---|---|---|---|---|---|---|---|---|---|---|---|---|
| 226 | Resin 32 | CHDAL | MPMDA 1.0 phr | 50 | PET/PET<br>PET/CPP | 125 (4)<br>152 (6) | c<br>a | 79 (5)<br>90 (5) | a<br>a | 47 (6) | 1.1 (0.1) | 3.3 (0.3) |
| 227 | Resin 33 | CHDAL | MPMDA 1.0 phr | 50 | PET/PET<br>PET/CPP | 81 (7)<br>153 (7) | a<br>c | 67 (6)<br>95 (7) | a<br>c | 43 (3) | 0.77 (0.03) | 2.5 (0.2) |
| 228 | Resin 15 | CHDAL | NPG diamine 1.0 phr | 57 | PET/PET<br>PET/CPP | 206 (13)<br>177 (10) | c<br>zip | 124 (26)<br>280 (77) | zip<br>zip | — | — | — |
| 229 | Resin 34 | CHDAL | HMDA 1.0 phr (premixed with resin) | 57 | PET/PET<br>PET/CPP | 14 (.25)<br>16 (1) | zip<br>zip | 10 (.1)<br>10 (.5) | a<br>a | — | — | — |
| 230 | Resin 35 | CHDAL | HMDA 1.0 phr | 50 | PET/PET<br>PET/CPP | 342 (126)<br>99 (21) | sf<br>zip | 248 (21)<br>35 (7) | af<br>zip | 248 (14) | 4.7 (0.3) | 4.1 (0.5) |
| 231 | Resin 36 | CHDAL | HMDA 1.0 phr | 57 | PET/PET<br>PET/CPP | 131 (11)<br>74 (7) | zip (sf)<br>zip | 67 (28)<br>45 (4) | c(sf)<br>zip | — | — | — |
| 232 | Resin 37 | CHDAL | HMDA 1.0 phr | 57 | PET/PET<br>PET/CPP | 257 (17)<br>226 (27) | c<br>c | 274 (48)<br>100 (14) | c<br>a(c) | — | — | — |
| 233 | Resin 38 | CHDAL | HMDA 1.0 phr | 50 | PET/PET<br>PET/CPP | 390 (49)<br>50 (4) | sf<br>zip | 459 (72)<br>25 (4) | sf<br>c | — | — | — | c = cohesive;
a = adhesive;
sf = substrate failure;
zip = zippering;
second notation in parentheses is secondary/minor failure mode

Examples 234-258

Machine Laminations of Curable Compositions

A number of curable compositions were used in machine laminations. Tables 29 and 30 show the T-peel results at various times and temperatures after making the laminates. The curable compositions listed in Tables 29 and 30 are the same. Most laminates resulted in T-peel values above 300 g/in; some reached considerably higher values. Laminates with good T-peel values could be made with both Mixing Methods 3 and 4. A number of formulations resulted in the T-peel values remaining substantially the same over the course of 8 or more weeks at room temperature (e.g. Examples 234, 235, 237, 238, 242, 243). Other compositions resulted in higher T-peel values after 8 weeks at room temperature (e.g. Examples 236, 239, 241, 244, 246, 247).

TABLE 29

Machine lamination of flexible films with curable compositions. The coat weights for these films were 2-6 gsm. All compositions were prepared using ethyl acetate as solvent.

| Ex. # | Resin/curing agent (1.0 equiv)/amine | Mixing method | % solids | Machine | Substrates | T-Peel Cure RT/1 day g/in | Failure mode | T-Peel Cure RT/1 wk g/in | Failure mode | T-Peel Cure RT/2 wk g/in | Failure mode | T-Peel RT/5 wk g/in | Failure mode |
|---|---|---|---|---|---|---|---|---|---|---|---|---|---|
| 234 | Resin 12//TPAL/TETA (1.0 phr) | MM4 | 57 | TecMaster | PET2/CPP1 | 367 (12) | c | 378 (22) | a | | | | |
| 235 | Resin 12/TPAL/TETA (1.0 phr) | MM4 | 57 | TecMaster | PET-Al/CPP1 | 520 (18) | a | 522 (23) | a | | | | |
| 236 | Resin 12/TPAL/TETA (1.0 phr) | MM4 | 57 | TecMaster | PET-Al/BOPP | 242 (23) | a | 317 (15) | a(sf) | | | | |
| 237 | Resin 15/CHDAL/MPMDA (1.5 phr) | MM4 | 47 | TecMaster | PET-Al/LDPE | 436 (175) | c(a) | 462 (51) | zip | | | | |
| 238 | Resin 15/CHDAL/MPMDA (1.0 phr) | MM4 | 47 | TecMaster | PET2/CPP1 | 517 | c | 441 (20) | a | | | 388 (14) | a |
| 239 | Resin 15/CHDAL/MPMDA (1.0 phr) | MM4 | 47 | TecMaster | PET2/CPP2 | 493 | c | 525 (36) | c | | | 659 (11) | c |

TABLE 29-continued

Machine lamination of flexible films with curable compositions. The coat weights for these films were 2-6 gsm. All compositions were prepared using ethyl acetate as solvent.

| | Composition | | | | | T-Peel Cure RT/1 day | | T-Peel Cure RT/1 wk | | T-Peel Cure RT/2 wk | | T-Peel RT/5 wk | |
|---|---|---|---|---|---|---|---|---|---|---|---|---|---|
| Ex. # | Resin/curing agent (1.0 equiv)/amine | Mixing method | % solids | Machine | Substrates | g/in | Failure mode | g/in | Failure mode | g/in | Failure mode | g/in | Failure mode |
| 240 | Resin 15/CHDAL/ MPMDA (1.0 phr) | MM4 | 47 | TecMaster | PET2/ LDPE | 427 | c | 482 (1) | c | | | 392 (17) | zip |
| 241 | Resin 15/CHDAL/ MPMDA (1.0 phr) | MM4 | 47 | TecMaster | PET-Al/ CPP1 | 431 (38) | c | 466 (26) | c | | | | |
| 242 | Resin 15/CHDAL/ MPMDA (1.0 phr) | MM4 | 47 | TecMaster | PET-Al/ LDPE | 670 (33) | c | 647 (36) | c | | | | |
| 243 | Resin 15/CHDAL/ MPMDA (1.0 phr) | MM4 | 47 | TecMaster | PET-Al/ CPP2 | 679 (41) | c | 613 (26) | c | | | | |
| 244 | Resin 15/CHDAL/ MPMDA (1.0 phr) | MM4 | 47 | LabMaster | PET-Al/ CPP2 | 600 (22) | a(c) | 589 (62) | c | 799 (30) | c | | |
| 245 | Resin 15/CHDAL/ MPMDA (1.0 phr) | MM4 | 47 | LabMaster | PET-Al/ LDPE | 601 (48) | c | 460 (22) | c | 501 (22) | c | | |
| 246 | Resin 15/CHDAL/ MPMDA (1.0 phr) | MM4 | 47 | LabMaster | PET2/ CPP2 | 498 (36) | c | 561 (25) | c | 618 (37) | c | | |
| 247 | Resin 15/CHDAL/ MPMDA (1.0 phr) | MM4 | 47 | LabMaster | PET2/ LDPE | 654 (23) | c | 479 (21) | c | 599 (22) | c | | |
| 248 | Resin 15/CHDAL/ MPMDA (1.5 phr) | MM3 | 47 | TecMaster | PET2/ LDPE | 374 (33) | c | 364 (56) | c | | | 421 (10) | c |
| 249 | Resin 15/CHDAL/ MPMDA (1.5 phr) | MM3 | 47 | TecMaster | PET2/ CPP1 | 469 (21) | c | 309 (13) | a | | | 234 (9) | a |
| 250 | Resin 15/CHDAL/ MPMDA (1.0 phr) | MM3 | 47 | TecMaster | PET2/ LDPE | 145 (14) | c | 266 (21) | c | | | 334 (30) | c |
| 251 | Resin 15/CHDAL/ MPMDA (1.0 phr) | MM3 | 47 | TecMaster | PET2/ CPP1 | 287 (33) | c | 441 (18) | c | | | 433 (43) | c |
| 252 | Resin 15/CHDAL/ TETA (1.0 phr) | MM3 | 47 | TecMaster | PET2/ LDPE | 198 (20) | c | 281 (10) | c | | | 402 (19) | c |
| 253 | Resin 15/CHDAL/ TETA (1.0 phr) | MM3 | 47 | TecMaster | PET2/ CPP1 | 421 (72) | c | 409 (10) | a | | | 330 (66) | c |
| 254 | Resin 15/CHDAL (0.6 equiv)/TETA (1.0 phr) | MM3 | 47 | TecMaster | PET2/ LDPE | 153 (5) | c | 362 (27) | c | | | | |
| 255 | Resin 15/CHDAL (0.6 equiv)/TETA (1.0 phr) | MM3 | 47 | TecMaster | PET2/ CPP1 | 204 (16) | c | 478 (41) | c | | | | |
| 256 | Resin 15/CHDAL/ HMDA (1.0 phr) | MM3 | 47 | TecMaster | PET2/ LDPE | 401 (21) | c | 392 (10) | c | | | | |
| 257 | Resin 15/CHDAL/ HMDA (1.0 phr) | MM3 | 47 | TecMaster | PET2/ CPP2 | 376 (19) | c | 511 (3) | c | | | | |
| 258 | Resin 15/CHDAL/ HMDA (1.0 phr) | MM3 | 47 | TecMaster | PET2/ CPP1 | 427 (61) | c | 581 (37) | c | | | | | c = cohesive;
a = adhesive;
sf = substrate failure;
zip = zippering; second notation in parentheses is secondary/minor failure mode

TABLE 30

Machine lamination of flexible films with the curable compositions of Table 29 tested with different T-peel conditions. The coat weights for these films were 2-6 gsm. All compositions were prepared in ethyl acetate.

| | Composition | | | | | T-Peel RT/8 wk | | T-Peel RT/12 week | | T-Peel Cure 50°/1 day | | T-Peel Cure 50°/1 wk | | T-Peel RT/1 wk + 40° C./3 wk | |
|---|---|---|---|---|---|---|---|---|---|---|---|---|---|---|---|
| Ex. # | Resin/curing agent (1.0 equiv)/amine | Mixing method | % solids | Machine | Substrates | g/in | Failure mode | g/in | Failure mode | g/in | Failure mode | g/in | Failure mode | g/in | Failure mode |
| 234 | Resin 12/TPAL/ TETA (1.0 phr) | MM4 | 57 | TecMaster | PET2/ CPP1 | | | | | 363 (27) | c (a) | | | | |
| 235 | Resin 12/TPAL/ TETA (1.0 phr) | MM4 | 57 | TecMaster | PET-Al/ CPP1 | 456 (12) | a | | | | | | | | |
| 236 | Resin 12/TPAL/ TETA (1.0 phr) | MM4 | 57 | TecMaster | PET-Al/ BOPP | 478 (24) | sf | | | | | | | | |
| 237 | Resin 15/CHDAL/ MPMDA (1.5 phr) | MM4 | 47 | TecMaster | PET-Al/ LDPE | 345 (21) | c | | | | | | | | |
| 238 | Resin 15/CHDAL/ MPMDA (1.0 Phr) | MM4 | 47 | TecMaster | PET2/ CPP1 | 419 (7) | a | | | | | | | 176 (20) | zip |
| 239 | Resin 15/CHDAL/ MPMDA (1.0 phr) | MM4 | 47 | TecMaster | PET2/ CPP2 | 686 (13) | a | | | | | | | 699 (51) | c |

TABLE 30-continued

Machine lamination of flexible films with the curable compositions of Table 29 tested with different T-peel conditions. The coat weights for these films were 2-6 gsm. All compositions were prepared in ethyl acetate.

| | Composition | | | | T-Peel RT/8 wk | | T-Peel RT/12 week | | T-Peel Cure 50°/1 day | | T-Peel Cure 50°/1 wk | | T-Peel RT/1 wk + 40° C./3 wk | |
|---|---|---|---|---|---|---|---|---|---|---|---|---|---|---|
| Ex. # | Resin/curing agent (1.0 equiv)/amine | Mixing method | % solids | Machine | Sub-strates | g/in | Failure mode | g/in | Failure mode | g/in | Failure mode | g/in | Failure mode | g/in | Failure mode |
| 240 | Resin 15/CHDAL/ MPMDA (1.0 phr) | MM4 | 47 | TecMaster | PET2/ LDPE | 327 (10) | zip | | | | | | | 386 (4) | — |
| 241 | Resin 15/CHDAL/ MPMDA (1.0 phr) | MM4 | 47 | TecMaster | PET-Al/ CPP1 | 608 (80) | c | | | | | | | | |
| 242 | Resin 15/CHDAL/ MPMDA (1.0 phr) | MM4 | 47 | TecMaster | PET-Al/ LDPE | 550 (49) | c(z) | | | | | | | | |
| 243 | Resin 15/CHDAL/ MPMDA (1.0 phr) | MM4 | 47 | TecMaster | PET-Al/ CPP2 | 657 (10) | c(z) | | | | | | | | |
| 244 | Resin 15/CHDAL/ MPMDA (1.0 phr) | MM4 | 47 | LabMaster | PET-Al/ CPP2 | 782 (22) | c | | | | | | | 847 (20) | c |
| 245 | Resin 15/CHDAL/ MPMDA (1.0 phr) | MM4 | 47 | LabMaster | PET-Al/ LDPE | 440 (34) | a | | | | | | | 1112 (87) | sf |
| 246 | Resin 15/CHDAL/ MPMDA (1.0 phr) | MM4 | 47 | LabMaster | PET2/ CPP2 | 749 (19) | c | | | | | | | 1303 (110) | sf |
| 247 | Resin 15/CHDAL/ MPMDA (1.0 phr) | MM4 | 47 | LabMaster | PET2/ LDPE | 1367 (151) | sf | | | | | | | 869 (192) | sf |
| 248 | Resin 15/CHDAL/ MPMDA (1.5 phr) | MM3 | 47 | TecMaster | PET2/ LDPE | | | | | 671 (6) | c(sf) | 682 (119) | sf | | |
| 249 | Resin 15/CHDAL/ MPMDA (1.5 Phr) | MM3 | 47 | TecMaster | PET2/ CPP1 | | | | | 406 (14) | a | 334 (43) | a | | |
| 250 | Resin 15/CHDAL/ MPMDA (1.0 phr) | MM3 | 47 | TecMaster | PET2/ LDPE | | | | | 453 (18) | c | 554 (23) | c | | |
| 251 | Resin 15/CHDAL/ MPMDA (1.0 phr) | MM3 | 47 | TecMaster | PET2/ CPP1 | | | | | 476 (23) | c | 506 (23) | c | | |
| 252 | Resin 15/CHDAL/ TETA (1.0 phr) | MM3 | 47 | TecMaster | PET2/ LDPE | | | | | | | | | | |
| 253 | Resin 15/CHDAL/ TETA (1.0 phr) | MM3 | 47 | TecMaster | PET2/ CPP1 | | | | | | | | | | |
| 254 | Resin 15/CHDAL (0.6 equiv)/ TETA (1.0 phr) | MM3 | 47 | TecMaster | PET2/ LDPE | | | | | | | | | | |
| 255 | Resin 15/CHDAL (0.6 equiv)/ TETA (1.0 phr) | MM3 | 47 | TecMaster | PET2/ CPP1 | | | | | | | | | | |
| 266 | Resin 15/CHDAL/ HMDA (1.0 phr) | MM3 | 47 | TecMaster | PET2/ LDPE | | | | | | | | | | |
| 257 | Resin 15/CHDAL/ HMDA (1.0 phr) | MM3 | 47 | TecMaster | PET2/ CPP2 | | | | | | | | | | |
| 258 | Resin 15/CHDAL/ HMDA (1.0 phr) | MM3 | 47 | TecMaster | PET2/ CPP1 | | | | | | | | | | |

The invention has been described in detail with reference to the embodiments described herein, but it will be understood that variations and modifications can be effected within the scope of the invention.

What is claimed is:

1. An assembly component comprising at least one substrate coated with at least one curable composition comprising:
   I. a first component (I) comprising a resin having at least one functional group selected from the group consisting of β-ketoester and malonate functional groups,
   II. a second component (II) comprising at least one curing agent having at least one aldehyde functional group, and
   III. a third component (III) comprising at least one compound having amine functionality, salts thereof, or combinations thereof;
   wherein the resin is either an amorphous polyester, a semi-crystalline polyester, or a polyether, or a combination thereof.

2. The assembly component of claim 1 wherein said polyester is an acetoacetate functional polyester comprising the residues of a. a hydroxyl component comprising:
      i. at least one diol in an amount ranging from 0 to 100 mole % or 50 to 100 mole %, based on the total moles of (i) and (ii) equaling 100 mole %; and
      ii. at least one polyol in an amount ranging from 0 to 100 mole % or 0 to 50 mole %, based on the total moles of (i) and (ii) equaling 100 mole %;
   b. at least one carboxyl component comprising a polycarboxylic acid compound, a derivative of a polycarboxylic acid compound, or a combination thereof; and
   c. at least one compound selected from an alkyl acetoacetate, a diketene, or a combination thereof.

3. The assembly component of claim 1 which is layered with multiple substrates wherein at least one said curable composition is layered between at least two of said substrates and is subsequently cured.

4. The assembly component of claim 1 wherein at least one said substrate is selected from at least one of the following: elastomeric material, a composite material, a paper material, a laminate structure, a fabric material, a glass material, a foamed material, a metal, a mesh material, a wood material, a particle board material, an oriented strand board material, a leather material, a synthetic leather material, a vinyl material, polyacrylonitrile butadiene styrene), polypropylene, glass filled polypropylene, talc filled polypropylene, impact-modified polypropylene, polycarbonate, polycarbonate-poly(acrylonitrile butadiene styrene) blends, urethane elastomers, thermoplastic polyolefin compounds, pigmented thermoplastic polyolefin compounds, filled thermoplastic polyolefin compounds, rubber-modified thermoplastic polyolefin compounds, a primed or painted material, or combinations thereof.

5. The assembly component of claim 1 wherein said curable composition, upon curing, releases essentially no volatile organic compounds, no volatile organic compounds, less than 5 weight % of volatile organic compounds, less than 4 weight % volatile organic compounds, less than 3 weight % volatile organic compounds, less than 2 weight % volatile organic compounds, or less than 1 weight % of volatile organic compounds; based on the total weight of the composition.

6. The assembly component of claim 1 wherein the curable composition is either solventless or contains at least one organic solvent.

7. The assembly component of claim 1 wherein the curable composition maintains at least 50%, or at least 80% of 180 degree peel strength after aging at 80° C. for seven days as measured according to ISO 8510-2-2006 Part 2 at 5 mm/sec.

8. The assembly component of claim 1 wherein the curable composition has a 180 degree peel strength of at least 8.9 N/25 mm (2 lb/in), or at least 13.3 N/25 mm (3 lb/in), or at least 17.8 N/25 mm (4 lb/in), or at least 22.25 N/25 mm (5 lb/in), according to ISO 8510-2-2006 Part 2 at 5 mm/sec.

9. The assembly component of claim 1 wherein said at least one amine has primary amine functionality or at least one amine has secondary amine functionality.

10. The assembly component of claim 9 wherein said at least one primary or at least one secondary amine are selected from at least one of: piperidine; piperazine; morpholine; pyrrolidine; ethylenediamine; diethylenetriamine; triethylenetetramine or isomers thereof; tetraethylenepentamine or isomers thereof; 2,2,4-trimethylhexamethylenediamine; 1,2-diaminopropane; 1,3-diaminopropane; 1-ethyl-1,3-propanediamine; 2,2-dimethylpropylenediamine; 1,4-diaminobutane; 2-methylpentamethylenediamine; 1,6-hexanediamine; 1,7-diaminoheptane; 1,8-diaminooctane; 1,9-diaminononane; 1,12-diaminododecane; 4-azaheptamethylenediamine; N,N-bis(3-aminopropyl)butane-1,4-diamine; N,N-bis(3-aminopropyl)ethylenediamine; 2,4-toluenediamine; 2,6-toluenediamine; 3-dimethylaminopropylamine; 3-diethylaminopropylamine; 3,3'-iminobispropylamine; 1,2-diaminocyclohexane; 1,3-diaminocyclohexane; 1,4-diamino-2,5-diethylcyclohexane; 1,4-diamino-3,6-diethylcyclohexane; 1,2-diamino-4-ethylcyclohexane; 1,2-diamino-4-cyclohexylcyclohexane; isophorone diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3-bis(aminomethyl)cyclohexane; 1,4-bis(aminomethyl)cyclohexane; 1-cyclohexyl-3,4-diamino-cyclohexane; m-xylylenediamine and its hydrogenation products; p-xylylenediamine and its hydrogenation products; 4,4'-methylenedianiline; 2,4-bis(p-aminobenzyl)aniline; diethyltoluenediamine; m-phenylenediamine; 1,2,4-triazole; alanine; proline; 1,4,8,11-tetraazacyclotetradecane; diphenylethylenediamine; 2,2,4,4-tetramethylcyclobutane-1,3-diamine; 2,2-dimethylpropane-1,3-diamine; 2,3-dimethylbutane-2,3-diamine; 1,2-diaminocyclopentane; 1,2,2-trimethylcyclopentane-1,3-diamine; 1,7,7-trimethylbicyclo[2.2.1]heptane-2,3-diamine; dioctyl amine; diisopropylamine; and polyetheramines; or any isomers or combinations thereof.

11. The assembly component of claim 10 wherein at least one said amine is selected from the group consisting of triethylenetetramine, 2-methylpentamethylenediamine, hexamethylene diamine, piperidine, piperazine, 1,4,8,11-tetraazacyclotetradecane, pyrrolidine, or mixtures thereof.

12. The assembly component of claim 1 wherein at least one aldehyde of said composition is selected from at least one of 1,3-cyclohexanedicarboxaldehyde; 1,4-cyclohexanedicarboxaldehyde; mixtures of 1,3- and 1,4-cyclohexanedicarboxaldehyde; 2,6-norbornanedicarboxaldehyde; 2,5-norbornanedicarboxaldehyde; cyclododecane-1,4,8-tricarbaldehyde; 3-(4-formylcyclohexyl)propanal; tricyclodecane dialdehyde; o-phthalaldehyde; terephthalaldehyde; isophthalaldehyde; cyclopentane-1,3-dicarbaldehyde; cyclopenta-3,5-diene-1,3-dicarbaldehyde; glutaraldehyde; 5-(hydroxymethyl)furan-2-carbaldehyde; benzenedipropanol; or any isomers thereof; or combinations thereof.

13. The assembly component of claim 1 wherein the equivalent ratio of the acetoacetate (AcAc) functional group in the resin to the aldehyde functional group in the composition is from about 4 to about 0.25, or from about 3 to about 0.5, or from about 2.5 to about 0.25, or from about 2.5 to about 0.5, or from about 2.5 to about 0.6, or from about 2 to about 0.25, or from about 2 to about 0.5, or from about 2 to about 0.6, or from about 1.2 to about 0.8.

14. The assembly component of claim 2 wherein Component (I) comprises residues of at least one polyol component selected from the group consisting of 1,1,1-trimethylol propane, 1,1,1-trimethylolethane, glycerin, pentaerythritol, threitol, or dipentaerythritol.

15. The assembly component of claim 2 wherein the polyester comprises residues of at least one diol selected from the group consisting of 2,2-dimethyl-1,3-propanediol, 2-methyl-1,3-propanediol, tricyclodecanedimethanol, 2-butyl-2-ethyl-1,3-propanediol, 1,4-butanediol, 1,6-hexanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2,2,4,4-tetramethylcyclobutane-1,3-diol, ethylene glycol, diethylene glycol, triethylene glycol, polyethylene glycol, or combinations thereof.

16. The assembly component of claim 2 wherein the polyester comprises at least one carboxyl component selected from the group consisting of adipic acid, isophthalic acid (or dimethyl isophthalate), terephthalic acid, dimethylterephthalate, 1,4-cyclohexanedicarboxylic acid, 1,3-cyclohexanedicarboxylic acid, tetrahydrophthalic anhydride, tetrahydrophthalic acid, hexahydrophthalic acid, hexahydrophthalic anhydride, maleic anhydride, succinic anhydride, phthalic acid, and phthalic anhydride, or mixtures thereof.

17. The assembly component of claim 1 wherein said Component (I) has a number average molecular weight of less than 30,000 g/mol.

18. A process for preparing an assembly component comprising
   a. applying the curable composition of claim 1 applied to the surface of at least one layer of a substrate,
   b. contacting the surfaces to be adhered each with the other, and
   c. curing said curable composition.

19. An article comprising said assembly component of claim 1 further comprising at least one of the following:
an adhesive, a laminate, a tape, a coating, a sealant, a flexible or non-flexible film, a foam, a potting compound, composite, a disposable hygiene article, a fiberglass reinforced plastic, a compound, an assembly part, a motor vehicle molded part, a motor vehicle extruded part, a motor vehicle laminated part, a furniture part, fabric, a woven textile, a nonwoven, a flexible film multilayer;
wherein the adhesive is selected from at least one of the following: automotive interior adhesive, flexible laminating adhesive, rigid laminating adhesive, assembly adhesive, nonwoven adhesive, tape adhesive, structural adhesive, hygiene nonwoven construction adhesive, hygiene elastic attachment adhesive, home repair adhesive, industrial adhesive, construction adhesive, furniture adhesive, medical adhesive, contact adhesive, hot melt adhesive, solvent-based adhesive, packaging adhesive, product assembly adhesive, woodworking adhesive, flooring adhesive, automotive assembly adhesive, assembly part adhesive, structural adhesive, pressure sensitive adhesive, pressure sensitive adhesive tape, pressure sensitive adhesive protective film, laminating adhesive, packaging adhesive, flexible film adhesive, flexible packaging adhesive, hygiene core integrity adhesive, and solvent-based adhesives;
wherein said composite is selected from at least one of a polyester composite, a glass composite, or a wood-plastic composite; and
wherein said compound is selected from at least one of an extruded compound, a polyacrylic blended compound, a potting compound, a rubber compound, a sheet molding compound or a dough molding compound.

* * * * *